(12) United States Patent
Zimring et al.

(10) Patent No.: US 11,077,364 B2
(45) Date of Patent: Aug. 3, 2021

(54) RESOLUTION-BASED SCALING OF REAL-TIME INTERACTIVE GRAPHICS

(71) Applicant: GOOGLE LLC, Mountain View, CA (US)

(72) Inventors: Dov Zimring, Belmont, CA (US); Paul Leventis, Toronto (CA); Benjamin Frenkel, Santa Clara, CA (US); Matthew Rodgers, San Jose, CA (US); Clinton Smullen, Sunnyvale, CA (US); Robert McCool, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/368,801

(22) Filed: Mar. 28, 2019

(65) Prior Publication Data
US 2019/0321725 A1  Oct. 24, 2019

Related U.S. Application Data

(60) Provisional application No. 62/651,662, filed on Apr. 2, 2018.

(51) Int. Cl.
*A63F 13/25* (2014.01)
*A63F 13/358* (2014.01)
(Continued)

(52) U.S. Cl.
CPC .......... *A63F 13/358* (2014.09); *A63F 13/323* (2014.09); *A63F 13/335* (2014.09);
(Continued)

(58) Field of Classification Search
CPC .......... A63F 13/25; A63F 13/30; A63F 13/32; A63F 13/323; A63F 13/327; A63F 13/33;
(Continued)

(56) References Cited

U.S. PATENT DOCUMENTS

| 6,855,058 B2 | 2/2005 | Kubota et al. |
| 7,401,150 B2 | 7/2008 | Shea et al. |

(Continued)

FOREIGN PATENT DOCUMENTS

| CN | 101068258 A | 11/2007 |
| CN | 106328855 A | 1/2017 |

(Continued)

OTHER PUBLICATIONS

Google LLC, International Search Report and Written Opinion, PCT/2019/025182, dated Apr. 10, 2019, 22 pgs.

(Continued)

*Primary Examiner* — Omkar A Deodhar

(57) ABSTRACT

An electronic game server receives a request from a client device to establish a real-time interactive gaming session, determines a device capability of an output device associated with the client device, determines a connection capability of the network connection, determines one or more target quality parameters for the real-time interactive gaming session based on the device capability and the connection capability, selects a first virtual machine of the plurality of virtual machines based on the one or more target quality parameters, establishes the real-time interactive gaming session with the client device, and provides to the real-time interactive gaming session, in accordance with the resource profile of the first virtual machine, resources for processing inputs from the client device and generating gameplay outputs in accordance with the processed inputs within the real-time interactive gaming session.

14 Claims, 23 Drawing Sheets

(51) Int. Cl.
    *A63F 13/323*    (2014.01)
    *A63F 13/335*    (2014.01)
    *A63F 13/40*     (2014.01)
    *G06F 9/455*     (2018.01)

(52) U.S. Cl.
    CPC .......... *A63F 13/40* (2014.09); *G06F 9/45558* (2013.01); *A63F 2300/534* (2013.01); *A63F 2300/535* (2013.01)

(58) Field of Classification Search
    CPC .... A63F 13/332; A63F 13/335; A63F 13/338; A63F 13/34; A63F 13/35; A63F 13/352; A63F 13/355; A63F 13/358; A63F 13/45; A63F 13/48; A63F 13/49; A63F 13/493; A63F 13/50; A63F 13/52; A63F 13/70; H04N 21/4384; H04M 2203/1066
    See application file for complete search history.

(56) References Cited

U.S. PATENT DOCUMENTS

| | | | |
|---|---|---|---|
| 8,171,145 B2 | 5/2012 | Allen et al. | |
| 8,621,585 B2 | 12/2013 | Danieli et al. | |
| 8,641,531 B2 | 2/2014 | Patil | |
| 9,339,733 B2 | 5/2016 | Boudville | |
| 9,393,486 B2 | 7/2016 | George | |
| 9,396,702 B2 | 7/2016 | Colenbrander | |
| 9,498,711 B2 | 11/2016 | Assa | |
| 9,526,989 B2 | 12/2016 | Oh | |
| 9,592,446 B2 | 3/2017 | Bono et al. | |
| 9,675,874 B1 | 6/2017 | Park | |
| 9,912,562 B2 | 3/2018 | Callahan et al. | |
| 10,166,471 B2 | 1/2019 | Vincent et al. | |
| 10,255,765 B2 | 4/2019 | Washington et al. | |
| 10,456,672 B2 | 10/2019 | Champy | |
| 10,486,066 B2 | 11/2019 | Perry et al. | |
| 2004/0198403 A1 | 10/2004 | Pedersen et al. | |
| 2005/0074063 A1 | 4/2005 | Nair et al. | |
| 2006/0154710 A1 | 7/2006 | Serafat | |
| 2006/0287096 A1 | 12/2006 | O'Kelley et al. | |
| 2006/0287099 A1 | 12/2006 | Shaw et al. | |
| 2007/0018980 A1 | 1/2007 | Berteig et al. | |
| 2007/0293319 A1 | 12/2007 | Stamper et al. | |
| 2008/0220878 A1 | 9/2008 | Michaelis | |
| 2009/0008404 A1 | 1/2009 | Kim et al. | |
| 2009/0125961 A1 | 5/2009 | Perlman et al. | |
| 2009/0271656 A1 | 10/2009 | Yokota et al. | |
| 2010/0167809 A1* | 7/2010 | Perlman | H04N 21/2343 463/24 |
| 2010/0203952 A1 | 8/2010 | Zalewski | |
| 2010/0306813 A1 | 12/2010 | Perry et al. | |
| 2011/0124417 A1 | 5/2011 | Baynes et al. | |
| 2011/0145635 A1 | 6/2011 | Buckler et al. | |
| 2012/0004042 A1 | 1/2012 | Perry et al. | |
| 2012/0079080 A1 | 3/2012 | Pishevar | |
| 2012/0209571 A1 | 8/2012 | Peterson et al. | |
| 2012/0270644 A1 | 10/2012 | Buhr | |
| 2012/0306877 A1 | 12/2012 | Rosasco | |
| 2013/0017443 A1 | 1/2013 | Yamazaki | |
| 2013/0034160 A1 | 2/2013 | Schmit | |
| 2013/0198642 A1 | 8/2013 | Carney et al. | |
| 2013/0221923 A1 | 8/2013 | Robertson | |
| 2013/0274000 A1 | 10/2013 | Novotny et al. | |
| 2014/0006517 A1 | 1/2014 | Hsiao et al. | |
| 2014/0019582 A1 | 1/2014 | Kim | |
| 2014/0032670 A1 | 1/2014 | Ellingson et al. | |
| 2014/0043333 A1 | 2/2014 | Narayanan et al. | |
| 2014/0179426 A1 | 6/2014 | Perry et al. | |
| 2014/0179434 A1 | 6/2014 | Xu | |
| 2014/0221087 A1 | 8/2014 | Huang et al. | |
| 2014/0274380 A1 | 9/2014 | Kazama | |
| 2014/0274384 A1 | 9/2014 | Boswell et al. | |
| 2014/0342819 A1 | 11/2014 | Bruno, Jr. et al. | |
| 2015/0009222 A1* | 1/2015 | Diard | G06F 9/45533 345/505 |
| 2015/0024842 A1 | 1/2015 | Imai et al. | |
| 2015/0087414 A1 | 3/2015 | Chen et al. | |
| 2015/0297998 A1 | 10/2015 | Karamfilov et al. | |
| 2016/0001184 A1 | 1/2016 | Sepulveda et al. | |
| 2016/0028854 A1 | 1/2016 | Leeb et al. | |
| 2016/0171757 A1 | 6/2016 | Panneer et al. | |
| 2016/0279523 A1 | 9/2016 | Altagar et al. | |
| 2016/0293134 A1 | 10/2016 | Fortin | |
| 2016/0317921 A1 | 11/2016 | Schmitz et al. | |
| 2017/0034234 A1 | 2/2017 | Zimring et al. | |
| 2017/0083396 A1 | 3/2017 | Bishop et al. | |
| 2017/0097816 A1 | 4/2017 | Joshi | |
| 2017/0124812 A1 | 5/2017 | Washington et al. | |
| 2017/0142201 A1 | 5/2017 | Holmes | |
| 2017/0185464 A1 | 6/2017 | Lipinski et al. | |
| 2017/0246544 A1 | 8/2017 | Agarwal et al. | |
| 2017/0354878 A1 | 12/2017 | Posin | |
| 2017/0354893 A1 | 12/2017 | Benedetto et al. | |
| 2018/0176282 A1 | 6/2018 | Benguerah | |
| 2018/0229128 A1 | 8/2018 | Chandrasekaran et al. | |
| 2018/0250591 A1 | 9/2018 | Prado Rojas et al. | |
| 2018/0256981 A1 | 9/2018 | Enomoto | |
| 2019/0199722 A1 | 6/2019 | Pennarun et al. | |
| 2019/0272707 A1 | 9/2019 | Washington et al. | |
| 2019/0308099 A1 | 10/2019 | Lalonde et al. | |
| 2019/0321727 A1 | 10/2019 | Rodgers | |
| 2019/0321732 A1 | 10/2019 | Zimring et al. | |
| 2020/0001177 A1 | 1/2020 | Champy | |
| 2020/0111317 A1 | 4/2020 | Oberberger et al. | |

FOREIGN PATENT DOCUMENTS

| | | |
|---|---|---|
| CN | 107050858 A | 8/2017 |
| CN | 107666943 A | 2/2018 |
| EP | 1374959 A2 | 1/2004 |
| EP | 2546811 A1 | 1/2013 |
| EP | 3610933 | 2/2020 |
| GB | 2525437 A | 10/2015 |
| JP | 2014130589 A | 7/2014 |
| JP | 2015139565 A | 8/2015 |
| KR | 20070082395 | 8/2007 |
| WO | 2005010680 A2 | 2/2005 |
| WO | 2007044908 A2 | 4/2007 |
| WO | WO 2008/104221 A1 | 4/2008 |
| WO | 2012161102 A1 | 11/2012 |
| WO | 2012170437 A1 | 12/2012 |
| WO | 2014085717 A1 | 6/2014 |
| WO | 2014120369 A1 | 8/2014 |
| WO | WO 2014/186858 A1 | 11/2014 |
| WO | 2015191965 A2 | 12/2015 |
| WO | 2016183253 A1 | 11/2016 |
| WO | 2017007659 A1 | 1/2017 |
| WO | 2017201472 A1 | 11/2017 |
| WO | 2019074952 A2 | 4/2019 |
| WO | 2019182752 A1 | 9/2019 |
| WO | 2019195300 A2 | 10/2019 |
| WO | 2020102493 A1 | 5/2020 |

OTHER PUBLICATIONS

Ra-Qin: "Ra-Quin Review of the Activision Decathlon—Gamespot", Sep. 2, 2006, XP055625127, Retrieved from the Internet: URL https://www.gamespot.com/the-activision-decathlon/user-reviews/2200-128501/, retrieved on Sep. 23, 2019.

Slivar Ivan et al: "Empirical QoE Studay of in-home streaming of online games", 2014 13th Annual Workshop on Network and Systems Support for Games, IEEE, Dec. 4, 2014, Dec. 4, 2014, pp. 1-6.

Yahn W. Bernier: "Latency Compensating Methods in Client/Server In-game Protocol Design and Optimization", Game Developers Conference Proceedings, Mar. 20, 2001, pp. 1-13.

English Translation of Korean Office Action dated Aug. 18, 2018 for KR Application No. KR 10-2020-7002403, 5 pages.

Final Office Action dated Oct. 16, 2020 for U.S. Appl. No. 16/566,607, 18 pages.

Interational Preliminary Report on Patentability dated Oct. 15, 2020 for International Application No. PCT/US2019/025182, 18 pages.

(56) References Cited

OTHER PUBLICATIONS

International Preliminary Report on Patentability dated Oct. 15, 2020 for International Application No. PCT/US2019/025185, 7 pages.
International Preliminary Report on Patentability dated Oct. 15, 2020 for International Application No. PCT/US2019/022472, 8 pages.
Notice of Allowance dated Sep. 17, 2020 for U.S. Appl. No. 16/373,558, 9 pages.
First Action Interview Office Action dated Sep. 2, 2020 for U.S. Appl. No. 16/380,831, 4 pages.
Extended European Search Report dated Jan. 3, 2020 for EP Application No. EP 19199853.3, 10 pages.
Notice of Grant dated Nov. 5, 2019 for JP Application No. JP 2019220516, 7 pages. English machine translation included.
English Translation of Korean Notice of Allowance dated Jan. 28, 2020 for KR Application No. KR 10-2018-7023961, 3 pages.
English Translation of Korean Office Action dated Apr. 15, 2019 for KR Application No. KR 10-2018-7023961, 2 pages.
International Preliminary Report on Patentability dated May 9, 2018 for International Application No. PCT/US2017/033642, 13 pages.
International Search Report and Written Opinion dated Sep. 18, 2017 for International Application No. PCT/US2017/033642, 28 pages.
First Action Interview Office Action Summary dated Feb. 26, 2019 for U.S. Appl. No. 15/599,408, 3 pages.
First Action Interview Pilot Program Pre-Interview Communication dated Jan. 8, 2019 for U.S. Appl. No. 15/599,408, 4 pages.
Notice of Allowance dated Jun. 19, 2019 for U.S. Appl. No. 15/599,408, 6 pages.
Non-Final Office Action dated Jun. 12, 2020 for U.S. Appl. No. 16/566,607, 23 pages.
International Search Report and Written Opinion dated Feb. 26, 2019 for International Application No. PCT/US2018/066844, 13 pages.
Non-Final Office Action dated May 15, 2020 for U.S. Appl. No. 15/851,610, 15 pages.
International Search Report and Written Opinion dated Feb. 24, 2020 for International Application No. PCT/US2019/061407, 13 pages.
International Preliminary Report on Patentability dated Apr. 14, 2020 for International Application No. PCT/US2018/055055, 13 pages.
International Search Report and Written Opinion dated Apr. 26, 2019 for International Application No. PCT/US2018/055055, 21 pages.
International Search Report and Written Opinion dated Jun. 18, 2019 for International Application No. PCT/US2019/025185, 11 pages.
Notice of Allowance dated May 5, 2020 for U.S. Appl. No. 16/368,806, 8 pages.
International Search Report and Written Opinion dated Jun. 18, 2019 for International Application No. PCT/US2019/022472, 13 pages.
Non-Final Office Action dated Jun. 22, 2020 for U.S. Appl. No. 16/373,558, 6 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
International Search Report and Written Opinion dated Aug. 1, 2019 for International Application No. PCT/US2019/020935, 23 pages.
International Search Report and Written Opinion dated Oct. 27, 2019 for International Application No. PCT/US2019/025400, 13 pages.
Herrscher et al., "A Dynamic Network Scenario Emulation Tool", Proceedings of the IEEE Eleventh International Conference on Computer Communications and Networks, Oct. 16, 2002; pp. 262-267.
Noble et al., "Trace-Based Mobile Network Emulation", Proceedings of the ACM SIGCOMM'97 Conference on Applications, Technologies, Architectures, and Protocols for Computer Communication; Oct. 1, 1997; pp. 51-61.
Yoneda, Satoshi, "Completed Understanding of Windows 8 as a Game Environment (6) Windows Store App Version Game and Xbox Smart Glass," Oct. 30, 2012; 22 pages; accessed on Aug. 5, 2020 from https://www.4gamer.net/games/126/G012689/20121029010/.
Notice of Allowance dated Dec. 30, 2020 for U.S. Appl. No. 16/380,331, 2 pages.
Office Action dated Feb. 19, 2021 for European Patent Application No. 18797260.9, 6 pages.
Yadav, Himanshu, et al., "Adaptive GPU Resource Scheduling on Virtualized Servers in Cloud Gaming", Conference on Information and Communication Technology, Nov. 2017, 6 pages.
Non-Final Office Action dated Mar. 31, 2021 for U.S. Appl. No. 16/566,607, 31 pages.
English Translation of Japanese Office Action dated May 18, 2021 for JP Application No. 2019-220516, 7 pages.
English Translation of Chinese Office Action dated May 21, 2021 for CN Application No. 20198029685.3, 15 pages.
Extended European Search Report dated May 21, 2021 for EP Application No. EP 21169156.3, 9 pages.
IT Media News, "Google launches new "Chromecast" and "Chromecast Audio" in Japan for JPY4,980"], Feb. 18, 2016, search date Apr. 30, 2021, URL https://www.itmedia.co.jp/news/articles/1602/18/news101.html.
Weekly ASCII, "Angry Birds Friends, a smartphone game to compete for high score with Facebook friends", May 31, 2013, URL https://weekly.ascii.jp/elem/000/002/615/2615748/.

* cited by examiner

Latency Detection and Compensation Process 1300

1412

| Command Index | Exp. Lat. Type |
|---|---|
| Move | Type 2 |
| Run | Type 3 |
| Jump | Type 2 |
| Duck | Type 1 |
| Shoot | Type 1 |
| ⋮ | ⋮ |
| Pan Camera | Type 2 |

1414

| Latency Index | Exp. Latency |
|---|---|
| Type 1 | 20 ms |
| Type 2 | 40 ms |
| Type 3 | 60 ms |
| Type 4 | 80 ms |

| Command Index | Exp. Latency |
|---|---|
| Move | 40 ms |
| Run | 60 ms |
| Jump | 40 ms |
| Duck | 20 ms |
| Shoot | 20 ms |
| ⋮ | ⋮ |
| Pan Camera | 40 ms |

Figure 14B

| Device/Network Assessment 444 |
|---|
| User 1 RTT  1420-1 |
| User 2 RTT  1420-2 |
| ⋮ |
| User N RTT  1420-N |

Figure 14C

RESOLUTION-BASED SCALING OF REAL-TIME INTERACTIVE GRAPHICS

RELATED APPLICATIONS

This application claims priority to U.S. Provisional Application No. 62/651,662, filed Apr. 2, 2018, which is hereby incorporated by reference in its entirety.

This application is related to U.S. Provisional Patent Application No. 62/655,688, filed Apr. 10, 2018; U.S. Provisional Patent Application No. 62/651,665, filed Apr. 2, 2018; U.S. Provisional Patent Application No. 62/651,542, filed Apr. 2, 2018; U.S. Provisional Patent Application No. 62/646,824, filed Mar. 22, 2018; U.S. patent application Ser. No. 15/851,610, filed Dec. 21, 2017; U.S. Provisional Patent Application No. 62/570,648, filed Oct. 10, 2017; and U.S. patent application Ser. No. 15/599,408, filed May 18, 2017, which claims priority to U.S. Provisional Patent Application No. 62/339,052, filed May 19, 2016; each of which is incorporated by reference herein in its entirety.

TECHNICAL FIELD

This application relates generally to computer technology, including but not limited to methods and systems for managing a server system to support online interactive sessions corresponding to one or more real time user-interactive applications.

BACKGROUND

Internet-connected electronic devices can support a variety of cloud-based media and entertainment applications. These applications include media streaming applications in which a server streams content to user devices, gaming applications in which a user interacts from a user device with a game that executes on a server, and a variety of social media and communication applications that allow large numbers of users to interact concurrently with each other and with cloud-hosted content and applications via their Internet-connected devices. Among cloud-based applications, cloud gaming presents some unique challenges due to: the widely varying hardware demands of gaming titles; the diverse topologies in which cloud-based games can be played (e.g., by a single player, by multiple players in a single location, or by multiple players in multiple locations); the need to transmit reliably and without latency player inputs to a gaming server that executes a gaming session and gaming session outputs from the gaming server to the players' devices/displays; widely varying player expectations as to speed and responsiveness of gameplay; and the desire in some situations to provide near-real time gaming content to spectators. Other challenges of cloud based gaming relate to providing a consistent gameplay experience for players regardless of where they are located (e.g., close or far from the server), how they connect to the gaming service (e.g., via a fast or slow Internet connection), and what type of device(s) they use to play the game (e.g., a generic personal device or a dedicated game controller) and view gameplay outputs (e.g., a personal device or a media device connected to a media streaming device).

Specifically, there is a need for a cloud gaming system that supports multiple gaming sessions for multiple gaming titles, where the games can execute concurrently with acceptable latency and responsiveness, including for multiple players who are playing the same game title from the same or different locations, with a wide variety of input and output devices and network connections. In addition, there is a need for a cloud gaming system that, upon receiving a player input (e.g., a gaming input entered on an end user gaming device/controller) in a gaming session, processes the user input promptly and outputs high-definition images reflecting the outcome of the player input action for all of the game players simultaneously and with acceptable latency. There is also a need for a gaming system that, in some situations, provides a high definition video stream of gameplay activity to allow spectators to follow the gameplay in real time on the respective display devices. As such, it would be beneficial to provide a cloud gaming system with efficient game processing and output mechanisms to expand the gaming experience in a wide range of gaming settings, from spontaneous gameplay by users gathered in the same location to online interactive gameplay by multiple users from different locations.

SUMMARY

Implementations described in this specification are directed to providing a gaming application programming interface (API) and cloud platform to enable efficient, portable, and low latency hosting of third party gaming content. Some implementations dynamically allocate cloud gaming hardware resources, and monitor and utilize network bandwidth available to individual end users to provide an optimal cloud gaming experience. Some implementations provide multiple performance tiers, including a tier that supports high performance, real-time gaming sessions with high definition media output and end user streams. Some implementations support different subscription models and/or are configured to provide one or more concurrent real-time gameplay and/or review media streams that correspond with little or no latency to one or more actual gaming streams (e.g., a video stream output to a client device of a user participating in an online/cloud gaming session via either a mobile app or a browser-based program). In some implementations, concurrent gameplay and/or review videos are provided with little or no latency via a media streaming site, such as YouTube, to one or more users.

In one aspect of the application, a method of controlling a gameplay process is implemented at a server system that includes one or more processors and memory storing one or more programs for execution by the one or more processors. The method includes receiving, during a game session operating in a current game state, an input event from a game controller located at a remote site, wherein the input event includes a first command generated by a user interaction with the game controller during the game session; determining a first frame that was displayed at the remote site during the user interaction, wherein the first frame is one of a plurality of output frames sent by the server during the game session prior to the server receiving the input event; determining a first game state associated with the first frame, wherein the first game state is a game state prior to the current game state; processing a gameplay output in accordance with (i) the first command, and (ii) the first game state; rendering a response frame based on the gameplay output; and transmitting the response frame for display at the remote site.

In another aspect of the application, a method of rendering online interactive gaming sessions is implemented at a server system that includes one or more processing cores and memory storing programs for execution by the one or more processing cores. The method includes receiving a first command from a first client device associated with an online gaming session; determining a type of the first command and a first expected response latency associated with the type of the first command; determining a network latency; determining a first introduced latency based on a comparison of the network latency with the first expected latency; generating a first number of intermediate frames which, when transmitted at a predefined frame rate, occupy a transmission time corresponding to the first introduced latency; generating a first response frame reflecting an initial result of the first command; and transmitting, at the predefined frame rate, the first number of intermediate frames followed by the first response frame such that the first response frame is received at a first media device associated with the first client device at a time corresponding to the first expected response latency.

In another aspect of the application, a method is implemented at a server system that includes a plurality of virtual machines, each of the virtual machines having a respective resource profile. The method includes receiving a request from a client device to establish a real-time interactive gaming session, wherein the request is received through a network connection with the client device; determining a device capability of an output device associated with the client device; determining a connection capability of the network connection; determining one or more target quality parameters for the real-time interactive gaming session based on the device capability and the connection capability; selecting a first virtual machine of the plurality of virtual machines based on the one or more target quality parameters; establishing the real-time interactive gaming session with the client device; and providing to the real-time interactive gaming session, in accordance with the resource profile of the first virtual machine, resources for processing inputs from the client device and generating gameplay outputs in accordance with the processed inputs within the real-time interactive gaming session.

In another aspect of the application, a method is implemented at a server system that includes one or more processors and memory storing one or more programs for execution by the one or more processors. The method includes establishing a real-time interactive gaming session with a first client device, the gaming session being associated with a particular game type; monitoring in-game performance data associated with a user of the first client device during the gaming session; determining a gameplay experience tolerance level for the user of the first client device in accordance with the in-game performance data; and adjusting, based on the gameplay experience tolerance level, a gaming session resource, the gaming session resource including a frame rate, resolution, latency level, or streaming source.

In accordance with some aspects of this application, a server system includes memory storing instructions for causing the server system to perform any of the methods described above.

Further, in accordance with some aspects of this application, instructions stored in memory of a server system include instructions for causing the server system to perform any of the methods described above.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 14A and 14B are example tables of response time settings in accordance with some implementations.

FIG. 14C is an example device/network assessment module in accordance with some implementations.

FIG. 20A is an example online interactive gaming environment in accordance with some implementations.

Like reference numerals refer to corresponding parts throughout the drawings.

DESCRIPTION OF IMPLEMENTATIONS

Figure 1:
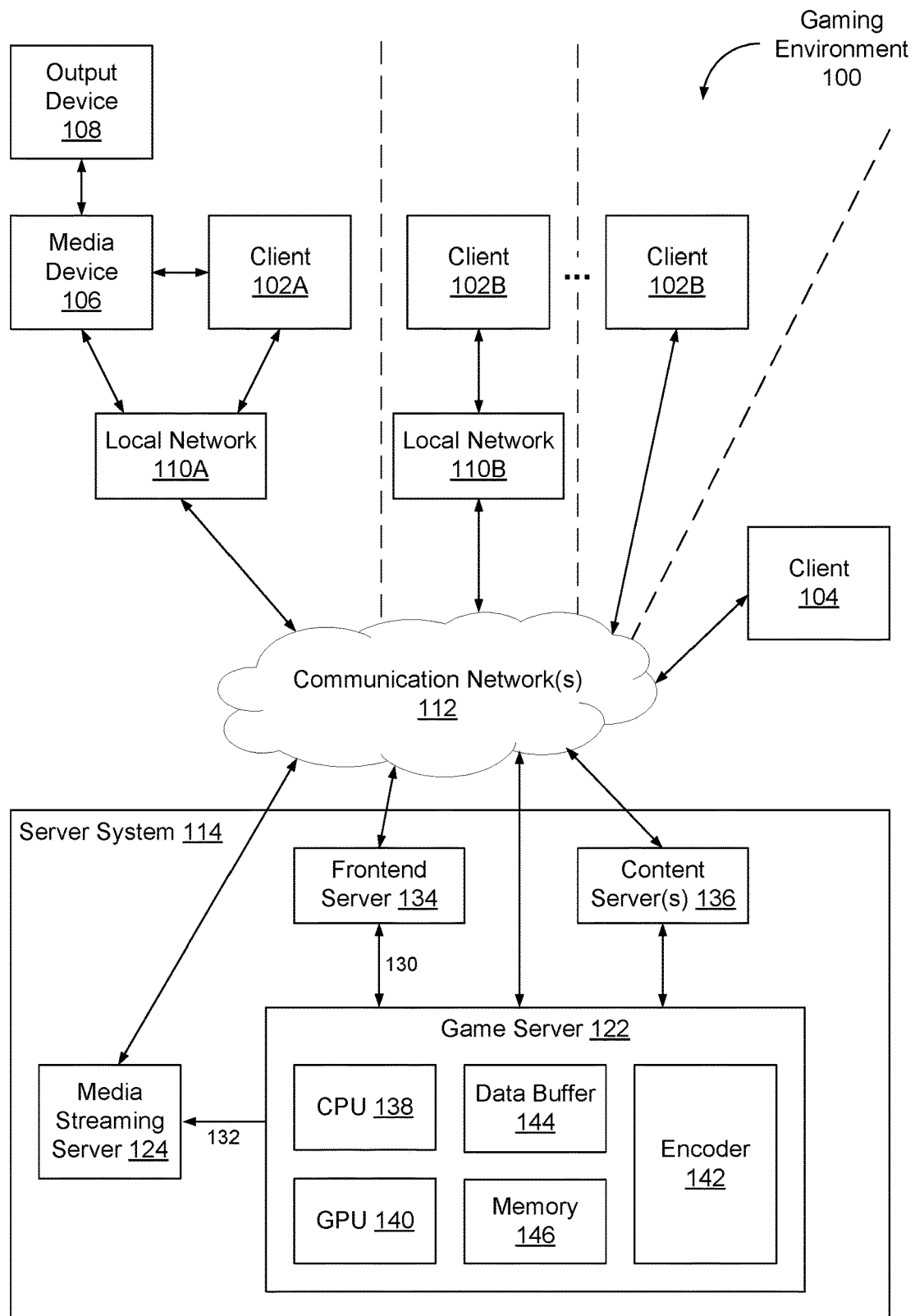
FIG. 1 is an example online interactive gaming environment in accordance with some implementations.

Implementations described in this specification are directed to providing a cloud platform and an API to enable efficient, portable, low latency hosting of cloud gaming content, including third party gaming content. Some implementations dynamically allocate cloud gaming hardware resources (e.g., CPUs, GPUs, memory, input/output, and video stream encoders) and monitor and utilize network bandwidth available to individual end users to provide an optimal online gaming experience concurrently to a community of game players. Some implementations provide multiple performance tiers, including a tier that supports high performance, real-time gaming sessions with high definition media streams for end users. Some implementations support different subscription models and/or are configured to provide one or more concurrent real time gameplay and/or review media streams that correspond with little or no latency to one or more actual gaming streams (e.g., a video stream output to a client device of a user participating in an online/cloud gaming session via either a mobile application or a browser-based program). In some implementations, the real-time gameplay and/or review media streams are provided with little or no latency via a media streaming site, such as YouTube, to one or more users.

In some implementations of a cloud gaming environment, a server system provides hardware resources for a real-time, interactive gaming session for processing player inputs and generating output streams for display to one or more players and, optionally, gaming spectators. In response to a request to establish the real-time interactive gaming session, the server system determines a device capability (e.g., hardware and/or software capabilities) of the requesting client device (i.e., the player's controller device), a connection capability (e.g., bandwidth, latency and/or error rate) of a network connection, and one or more target quality parameters of the gaming session (e.g., resolution of the output video stream(s), gaming response latency, etc.), and accordingly, associates one of its virtual machines with the real-time interactive session for establishing the session.

In some implementations, processing and encoding capability of gaming data (e.g., to produce output video streams for players and/or spectators) are managed for one or more processing cores (e.g., GPU cores and encoder cores) in the server system that hosts the real-time, online, and interactive gaming environment. For example, in some implementations, the one or more processing cores operate with a plurality of processing slices (e.g., each executing on a core for 16.67 ms), and the server system allocates each of the plurality of processing slices to a subset of a plurality of online gaming sessions to be executed thereon. For one of the processing slices, the server system determines a time-sharing processing schedule, such that a corresponding subset of gaming sessions share a duty cycle of the processing slice, and are executed in parallel according to their respective real-time data processing need. Additionally, to expedite image encoding within a time interval, an encoder of the server system does not need to wait until a GPU has made available all data of an image frame. Rather, in some implementations, a portion of an image frame is encoded as soon as information required for encoding the portion is provided by the GPU, independently of whether other portions of the image frame that are irrelevant to the encoded portion are made available or not by the GPU.

In addition, the server system can dynamically generate a number of frames in response to a user command received from a user who plays an online gaming session. In accordance with a type of the user command, the server system determines an expected response latency, actual communication and processing latencies, and an actual transmission latency. Then, the user command is executed in the online gaming session by generating a set of frames reflecting an effect of the command. The set of frames when transmitted at a predefined frame rate occupy a transmission time corresponding to the actual transmission latency, and can be received at a client device of the user within a time corresponding to the expected response latency.

FIG. 1 is an example online interactive gaming environment 100 in accordance with some implementations. The online interactive gaming environment 100 includes one or more client devices (e.g., client devices 102 and 104). Each of the client devices 102 executes one or more game applications. A game session can be run on a specific game application to allow a user of the client device 102 to play an online interactive game hosted by a server system 114. In some implementations, the client device 102 (e.g., a host client) is configured to invite one or more other client devices 102 to join a game scene of the specific game application. Gaming sessions of these client devices 102 are synchronized to display the same game scene, optionally with distinct perspectives corresponding to their respective users.

Conversely, the server system 114 hosts an online interactive game platform to support the client devices 102 to play the one or more game applications including the specific game application. Specifically, the server system 114 includes a plurality of user accounts associated with the client devices 102, and authenticates the users of the client devices in association with each of the one or more game applications. The server system 114 renders and refreshes a scene of the online interactive game on the client devices 102 that join corresponding gaming sessions associated with the scene. In some implementations, the server system 114 assesses the capabilities of the client devices 102 and/or a quality of the communicative connection between the server system 114 and each of the client devices 102, and adaptively generates synchronous data streams for the gaming sessions associated with the client devices 102. By these means, the server system 114 is configured to facilitate synchronous gaming sessions of an online interactive game on two or more client devices 102 simultaneously and with substantially low latencies.

In some implementations, the server system 114 includes a game server 122 and a media streaming server 124. The game server 122 is configured to provide two or more media streams concurrently for an online interactive game session running on a first client device 102A. The two or more media streams include a low latency stream and a normal latency stream that are provided to the first client device 102A and a reviewer client device 104 via one or more communication network 112, respectively. Optionally, the normal latency stream is provided for instructional purposes. While a user of the first client device 102 plays the game session on the first client device 102A, the game session is recorded and broadcast to one or more spectators via the normal latency stream, i.e., the spectators can review the game session on the reviewer client device 104. The low latency stream corresponds to gameplay of the online interactive game session, and has a faster response rate and lower transmission latency than the normal latency stream that corresponds to an associated review session. For example, the low latency stream has a predefined frame rate of 60 frames per second (fps), and provides at least one frame to the first client device 102A during each time interval of 16.67 ms, and the normal latency stream has a predefined frame rate of 30 fps, and provides at least one frame to the reviewer client device 104 during each time interval of 33.33 ms. In some implementations, the normal latency stream has a lower resolution than that of the low latency stream.

In some implementations, a client device 102 or 104 has a display screen integrated therein for displaying media content. In some implementations, a client device 102 or 104 is coupled to a media device 106 and an output device 108. Specifically, the client device 102 or 104 can be communicatively coupled to the media device 106 directly (e.g., via Bluetooth or other wireless communication links), via a local network 110 (e.g., a Wi-Fi network), or via one or more communication networks 112. In some implementations, the client device (102 or 104) and the media device 106 are local to each other (e.g., in the same room, in the same house, etc.). The media device 106 is further coupled to one or more output devices 108 that can output visual and/or audio content (e.g., a television, a display monitor, a sound system, speakers, etc.). The media device 106 is configured to output content to the output device(s) 108. In some implementations, the media device 106 is a casting device (e.g., CHROMECAST by Google Inc.) or a device that otherwise includes casting functionality.

In some implementations, one or more client devices 102 or 104 are capable of data communication and information sharing with each other, a central server or cloud-computing system (e.g., the server system 114), and/or other devices (e.g., another client device 102 or 104, a media device 106 and an output device 108) that are network-connected. Data communication may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some embodiments, the online interactive gaming environment 100 includes a conventional network device (e.g., a router) via which a set of client devices 102 and 104 and their corresponding media and output devices (if any) are communicatively coupled to each other on a local network 110 (e.g., a local area network), and the local network 110 is communicatively coupled to communication networks 112 (e.g., wide-area networks and the Internet). In some embodiments, each of the client devices 102 and 104 optionally communicates with one or more other client devices, a respective media device 106, or a respective output device 108 using one or more radio communication networks (e.g., ZigBee, Z-Wave, Insteon, Bluetooth, Wi-Fi, and/or other radio communication networks).

In some implementations, the client devices 102 are remote from each other, i.e., they are not located in the same room or even structure. A game may be started by launching a game application (e.g., game application 228, FIG. 2) for execution at each client device 102. In some implementations, for each client device 102, the game application establishes an online gaming session 116 with the server system 114 independently. The online gaming sessions 116 of two or more client devices 102 (e.g., 102A and 102B) are related to each other (e.g., because they are played in the same game domain of the game application), and therefore, share a game scene in the game application. The related online gaming sessions 116 are synchronized with each other, and each online gaming session 116 optionally shows the same game scene with a unique player perspective corresponding to the respective client device 102. A user of each client device 102 can therefore play the game on the respective client device and influence the output from the online gaming sessions 116 on the other client device(s) 102.

Alternatively, in some other implementations, after the game application of a first client device 102A establishes an online gaming session 116, one or more second client devices 102B are invited to join the online gaming session 116 by an invitation message, and for example, a message with the link (e.g., a URL address) to join the online gaming session 116 is sent to each of the second client devices 102B. An appropriate controller configuration is provided to each second client device 102B that is invited to join the online gaming session 116. In this application, when the second clients 102B join an online gaming session 116, the server system 114 creates a separate gaming session 116 for each individual second client device 102B. Each separate gaming session 116 of the respective second client device 102B is synchronized with and shares the same scene with the gaming session 116 of the first client device 102A, but can have a unique player perspective corresponding to the respective second client device 102B. After each second client device 102B has received the appropriate controller configuration and joined the online gaming session 116 (more accurately, started its related online gaming session 116), a user can play the game on the respective second client device 102B and influence the output of the online gaming sessions 116 running on the other client device(s) 102.

The client device 102 is a device that includes, and can run, one or more distinct user applications including the game application. In some implementations, the client device 102 is a smartphone, a tablet device, a laptop computer, a desktop computer, or a multimedia device. In some implementations, the client device 102 is a dedicated game controller including game controls (e.g., one or more buttons, joysticks, touch-screen affordances, motion controls, pressure controls, vision controls, audio controls, and/or other haptic interfaces) configured to control certain aspects of gameplay when activated or otherwise manipulated. In some implementations, the client device 102 includes one or more user applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network) and/or by directing the media device 106 to a remote location (e.g., a URL or other link to a location at a server system) from which the media device 106 can stream or otherwise receive data/content. The media device 106 receives data/content from the application and/or the remote location and outputs visual and/or audio content corresponding to the received data/content to the output device 108. Thus, an online gaming session 116 is established between the game application running on the client device 102, the remote server system 114, and the media device 106.

In some implementations, as part of the process of linking related online game sessions 116, the server system 114 assesses the capabilities of each corresponding client device 102 and/or a quality of the communicative connection between the server system 114 and the client device 102. In some implementations, the server system 114 measures network latency between the client device 102 and the server system 114. If the measured latency is above a threshold and a lower-latency connection is available, the server system 114 can suggest that the client device 102 change to the lower latency connection, or invite a user of the client device 102 to change the client device 102 to the lower latency connection. For example, if the client device 102 is on a cellular wireless connection 118, and a local network is available, the server system 114 can suggest that the client device 102 should connect through the available local network. In some implementations, the latency threshold requirements differ between games. For example, some games (e.g., action games) are best experienced on lower latency connections, and some other games (e.g., online board games or card games) are not as demanding with respect to latency. The server system 114 may make connection recommendations in view of these different requirements associated with different types of games.

In some implementations, as part of the client device 102 starting or joining the gaming session 116, the server system 114 communicates with the client device 102 to set up a controller (e.g., a gaming controller configuration and/or interface) on the client device 102. In some implementations, this includes the server system 114 assessing whether the client device 102 has the needed resources and communication capability for the controller. Depending on available resources at the client device 102, connection quality, and requirements for the game, the controller may be implemented differently at the client device 102. In some implementations, a game can be played with a webpage-based controller interface. For example, a controller interface for the game may be embedded in a webpage, and the webpage is rendered in a web browser on the client device 102. Alternatively, in some implementations, a standardized controller is implemented in a predefined application not specific to the game or directly associated with the game (e.g., a casting device application, such as CHROMECAST or GOOGLE CAST by Google Inc., or other media device application), or in the operating system of the client device 102. For example, the device operating system or a predefined application on the client device 102 may have a controller sub-module. The controller sub-module includes one or more standardized controller configurations, templates, or the like. Each of the standardized controller configurations configures the controller sub-module to utilize input devices and/or sensors on the client device 102 in some way to implement a virtual controller. The standardized controller configuration is used may vary with the game and/or with the type of client device.

Further, in some implementations, a game has a specific controller configuration that may be implemented on the controller sub-module. Such a configuration may be stored at the server system 114 and transmitted to the client devices 102, as part of the process of the client devices 102 joining or starting the online gaming session 116. In some implementations, a specific controller configuration can be an entirely custom controller or a mix of standard controller and a custom controller. Additionally, in some implementations, a game requires a specific application associated with the game. For example, a game may require a controller application associated specifically with the game. In some implementations, the client device 102 may be directed to download the specific application or the predefined application as part of starting or joining the session 116. For example, if the client device 102 does not already have the predefined application (with the controller sub-module) or the specific application associated with game, and such an application is required for play, the server system 114 instructs the client device 102 to prompt its user that a download is needed and to ask the user for permission to proceed.

In some implementations, the server system 114 stores user information associated with user accounts of each of one or more game applications (e.g., game application 228, FIG. 2) that are hosted on the server system 114. Examples of the user information include, but are not limited to, user account information (e.g., identification and passwords), membership type, preference, and activity history. In some implementations, the server system 114 stores session data associated with the online gaming sessions that are played on the client devices 102. Examples of the session data for each online gaming session 116 include, but are not limited to, a frame rate, a rendering specification, a normal latency requirement, information of GPU allocation, information of encoder allocation, identifications of related sessions, and latest status information.

In some implementations, the server system 114 provides a gaming API and cloud platform to enable efficient, portable, low latency hosting of third party gaming content used in the online gaming session 116. In some implementations, the gaming API and cloud platform are enabled by a server system 114 that further includes one or more of: a frontend server 134, a media streaming server 124, a game server 122, and one or more third party content servers 136. In some implementations, the gaming API platform is created by and/or hosted by the game server 122 and enables the gaming session 116 in conjunction with a frontend server 134 and content server(s) 136. The frontend server 134 is configured to provide service to a user of the gaming session 116, and to manage accounts for users. Optionally, users subscribe to a gaming service via the frontend server 134. The content servers 136 provide gaming content related to the gaming session 116.

In some implementations, the frontend server 134 manages user accounts associated with the client devices 102 and 104, e.g., subscriptions to membership of one or more online interactive games by a user account. After the client devices 102 log onto their respective user accounts and join their online gaming sessions 116, the game server 122 sets up the game sessions 116, and manages each specific gaming session 116 for a respective client device 102 by obtaining game contents from the content servers 136, sending the game contents to the game applications executed on the client devices 102, identifying user requests or actions, rendering gameplay outputs for the client devices 102 in response to the user requests or actions, and storing game state data during the respective gaming session 116. The game server 122 includes one or more processing units (e.g., CPU(s) 138, GPU(s) 140 and encoder 142), memory 146, and a data buffer 144 that temporarily stores multimedia content generated by the GPU 140 and provides the multimedia content to the encoder 142 for further encoding (e.g., standardization or compression). The data buffer 144 is optionally integrated in or independent of the memory 146.

In some implementations, the game server 122 dynamically allocates cloud gaming hardware resources (e.g., GPU 140 and encoder 142) and monitors and utilizes network bandwidth available to individual end users to provide an optimal cloud gaming experience. In some implementations, the game server 122 provides multiple performance tiers, including a tier that supports high performance, real-time gaming sessions with high definition video/media streams. In some implementations, the game server 122 supports different subscription models and/or are configured to provide one or more concurrent real-time gameplay and/or review media streams that correspond with little or no latency to one or more actual gaming streams (e.g., a video stream output to a client device of a user participating in an online/cloud gaming session via either a mobile app or a browser-based program). Specifically, the game server 122 is configured to generate concurrent media streams for gameplay and review videos, and the media streaming server 104 is provided with review videos for concurrent gameplay. Such review videos are provided with little or no latency via a media streaming site, such as YouTube, to one or more users. The media streaming site is optionally managed by the media streaming server 124.

Some implementations enable the hosting of public events in conjunction with gaming competitions. For example, in conjunction with a multi-player gaming event or competition based on a hosted game, a cloud gaming site that is hosted by the game server 122 can broadcast or stream to specific reviewer client devices 104, optionally via the media streaming server 123: (a) one or more concurrent ancillary or supplemental media streams, including associated commentary tracks/streams, (b) gaming streams from different competitor points of view, a highlights stream showing particularly compelling gaming action based on cloud server analysis and/or scoring of multiple gaming sessions associated with the gaming event, (c) one or more game point of view streams reflecting gameplay sessions 116 of one or more active gamers, and/or (d) instructional tracks from one or more active gamers and/or commentators, possibly including real-time picture-in-picture (PIP) video sent by the active gamers to the cloud gaming server system 114 along with their corresponding gameplay responses.

In accordance with some implementations, examples of third party content that can be effectively hosted by the content servers 136 include, without limitation, sports games, racing games, role playing games (RPG) and first person shooter (FPS) games. Different instances of these games may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

In some implementations, the frontend server 134 provides account management APIs and/or software modules that monitor gameplay activity and related requests of subscribers (e.g., requests by end users to invite other players to participate in a gaming session, upgrade their in-game tools, and/or gaming performance) and transmit or make available by APIs associated information to the third party content servers 136 to enable content providers to track settings (including but not limited to billing information, in-game credits, subscription level, etc.) of their subscribers and/or followers. In some implementations, a content provider of hosted content can provide via the same hosting platform one or more different subscription models for the hosted content. In some implementations, a user (e.g., a subscriber to a gaming service) is granted unlimited access and gameplay to all games offered by the content provider on the hosting platform. In some implementations, a user is granted unlimited access and gameplay to one or more specific gaming franchises (e.g., a specific football or first person shooter franchise) offered by the content provider on the hosting platform. In some implementations, the subscriptions are for limited participation by a user—where the participation can be limited based on gameplay time, level of hardware resources committed to the end user, or end user device type/location. In some implementations, the account APIs and modules configure and monitor gameplay sessions, and enable the content providers to track gaming activity of respective subscribers in accordance with their most current subscription information—even during active gameplay.

The server system 114 enables cloud features that allow a user to move around, e.g., suspending a first game stream of a first gaming session executed on a first client device 102, and restarting the first game stream on a second gaming session of a second client device 102 to continue the first game session. The server system 114 also supports multiple players on a massive scale, and provides richer, more persistent cloud-based worlds. The server system 114 uses a cloud-based system to store session data related to different gaming sessions 116 of the same user, or different gaming sessions 116 of different users.

The server system 114 renders gaming content on a plurality of client devices 102 and 104, including but not limited to, mobile phones, tablet computers, desktop computers, and televisions. Optionally, the gaming content is dynamically adjusted to comply with the specifications of these client devices 102 and 104. In some implementations, the client devices 102 and 104 have a limited or no storage capability, because the gaming API platform provides instant access and requires no or little user device storage (e.g., a user can start playing in 5 seconds and save 250 GB of console hard drive space).

In addition to gaming content, the server system 114 also streams to the client devices 102 and 104 add-on content, e.g., new league rosters, statistics, and preview access to early titles, which is optionally updated regularly (e.g., readily updated, upgraded every day or every hour). In some implementations, the add-on content includes a search result of an internet search or a database search.

In some implementations, the server system 114 supports a live online community associated with a game application. Users (e.g., subscribers of a service) participate in live events, tournaments or activities on the corresponding gaming API platform throughout the day. Examples of the live events, tournaments or activities include spectating live gaming sessions played by other users, posting accomplishments to a public domain (e.g., YouTube), and getting live tips and coaching videos. For example, in response to a user action, the game server 122 provides two or more live streams 130 and 132. While keeping a first gaming stream 130 on a first gaming session 116 of the first client device 102A for a game player, the server system 114 also broadcasts a second live review stream 132 (e.g., YouTube streams) to one or more other client devices 104 (e.g., of subscribers). The second live review stream 132 allows the user to share his or her gaming experience with an audience. Optionally, the second live stream is a reproduction of a screen of the first client device 102A of the player. The server system 114 may obtain an audio stream in which the player explains the first gaming session 116, or a video stream of the player playing and explaining the first gaming session 116. The audio stream is optionally played for the audience while the second live review stream 132 is played for the audience. The video stream is optionally played in an embedded window in the second live review stream 132.

Some implementations provide on-the-go gaming, allowing the user to take—to any location or client device—his or her desired games. For example, a user can start an online gaming session 116 on a mobile device 102A on his or her commute, then seamlessly resume the gaming session 116 at his or her destination on a laptop computer 102B. Also, in some implementations, based on the different client device resources available to a user as the gaming session 116 is handed off between different devices 102, the server system 114 (specifically, the game server 122) can dynamically deploy a different set of hardware resources (e.g., GPU 140 and encoder 142) to optimize the user's gaming experience based on the different end user current device resources (e.g., client hardware capability and network bandwidth).

In the server system 114, the frontend server 134 and the game server 122 can have a respective user account system. In an example, the user account system for the frontend server 134 is used to manage subscriptions to specific gaming content and service, and the user account system for the game server 122 (e.g., a YouTube or Google account) is used for managing gaming experience (e.g., rendering gaming content to satisfy specific gaming criteria) and many other purposes. In some implementations, these two user account systems share customer and usage data (e.g., social, friends, presence, authentication, account information, billing information). Also, the content frontend server 134 provides a service layer that sits on top of a technology layer enabled by the game server 122. In some implementations, gaming content server(s) manage additional user account systems for accessing their content. Optionally, the additional user account systems for gaming content are integrated with the user account system for the frontend server 134 that manages user subscriptions.

Figure 2:
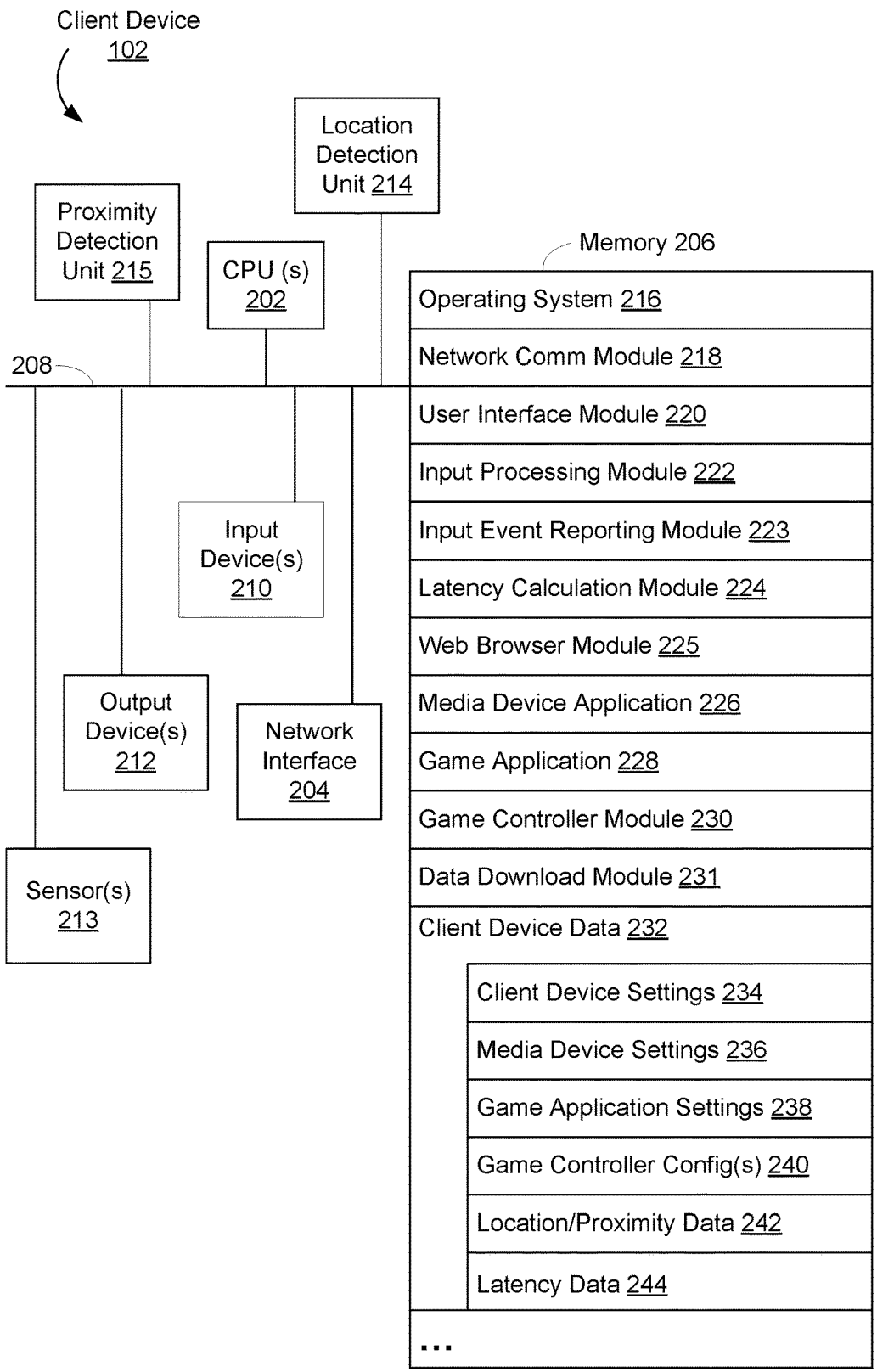
FIG. 2 is a block diagram illustrating an example client device of the gaming environment in accordance with some implementations.

FIG. 2 is a block diagram illustrating an example client device 102 of the gaming environment 100 in accordance with some implementations. Throughout this application, unless specified otherwise, reference to a client device 102 corresponds to one or more of the client devices 102A, 102B, and 104 described with reference to FIG. 1. Examples of the client device 102 include, but are not limited to, a mobile phone, a tablet computer, a laptop computer, a desktop computer, and a wearable personal device. In some implementations, the client device 102 is a dedicated game controller including game control inputs 210 (e.g., one or more buttons, joysticks, touch-screen elements, motion controls, pressure controls, vision controls, audio controls, and/or other haptic interface elements configured to control certain aspects of gameplay when activated). The client device 102 includes one or more processing units (CPUs) 202, one or more network interfaces 204, memory 206, and one or more communication buses 208 for interconnecting these components (sometimes called a chipset). The client device 102 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, some client devices 102 may use a microphone and voice recognition or a camera and gesture recognition to supplement or replace interfaces requiring contact (e.g., keyboard and buttons). In some implementations, the client device 102 includes one or more cameras, scanners, or photo sensor units for capturing images, for example, of graphic series codes printed on electronic devices. In some implementations, the client device 102 includes one or more output devices 212 that enable presentation of user interfaces and display content, including one or more speakers and/or one or more visual displays. Optionally, the client device 102 includes a location detection device 214, such as a GPS (global positioning satellite) or other geo-location receiver, for determining the location of the client device 102. The client device 102 may also include a proximity detection device 215, e.g., an IR sensor, for determining a proximity of a media device 106 and/or of other client devices 102. The client device 102 may also include one or more sensors 213 (e.g., accelerometer, gyroscope, etc.) for sensing motion, orientation, and other parameters of the client device 102, which may be used as input (e.g., for inputs 210 described above).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 216 including procedures for handling various basic system services and for performing hardware dependent tasks;

Network communication module 218 for connecting the client device 102 to other devices (e.g., the server system 114, the media device 106, and other client devices 102) via one or more network interfaces 204 (wired or wireless) and one or more networks 110 and/or 112, such as the Internet, other wide area networks, local area networks, metropolitan area networks, and so on;

User interface module 220 for enabling presentation of information (e.g., a graphical user interface for presenting applications, widgets, websites and web pages thereof, and/or games, audio and/or video content, text, etc.) at the client device 102 via one or more output devices 212 (e.g., displays, speakers, etc.);

Input processing module 222 for detecting one or more user inputs or interactions from one of the one or more input devices 210 and interpreting the detected input or interaction;

Input event reporting module 223 for reporting input identification and/or timestamp information to the server system 114 for use in latency calculations;

Web browser module 225 for navigating, requesting (e.g., via HTTP), and displaying websites and web pages thereof, including a web interface for joining the session 116;

Media device application 226 for interacting with a media device 106, including logging into a user account associated with the media device 106, controlling the media device 106 if associated with the user account, and editing and reviewing settings and data associated with the media device 106;

Game application(s) 228 for providing game(s) on the client device 102, including facilitating corresponding gameplay and facilitating invitation of additional players;

Game controller module 230 for providing a gameplay input interface to the game application(s) 228;

Data download module 231 for downloading data (e.g., game controller configurations 456 (FIG. 4), game applications 228 and other applications, updates to modules and applications and data in memory 206) from server system 114 and other content hosts and providers; and Client device data 232 storing at least data associated with the game application 228 and other applications/modules, including:

Client device settings 234 for storing information associated with the client device 102 itself, including common device settings (e.g., service tier, device model, storage capacity, processing capabilities, communication capabilities, etc.);

Media device settings 236 for storing information associated with user accounts of the media device application 226, including one or more of account access information, and information for device settings (e.g., service tier, device model, storage capacity, processing capabilities, communication capabilities, etc.);

Game application(s) settings 238 for storing information associated with user accounts of the game application(s) 228, including one or more of account access information, in-game user preferences, gameplay history data, and information on other players;

Game controller configuration(s) 240 for storing information associated with configurations (e.g., received configurations from game controller configurations 456, FIG. 4) of game controller module 230 for game application(s) 228; and Location/proximity data 242 including information associated with the presence, proximity or location of any of the client device 102 and the media device 106.

In some implementations, the game controller module 230 is a part (e.g., a sub-module) of the media device application 226 or another application in memory 206. In some implementations, the game controller module 230 is a part of the operating system 216. In some implementations, the game controller module 230 is a distinct module or application.

In some implementations of the client device 102, the media device application 226 (and corresponding media device settings 236) and game application 228 (and corresponding game application settings 238) are optional. Depending on the particular game to which the client device 102 is invited to join, the media device application 226 and the game application 228 are not required to play. If any of these applications are needed for playing the game (e.g., the game uses a game controller module 230 within the media device application 226), and the application is not in memory 206, the client device 102 may be prompted to download the application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
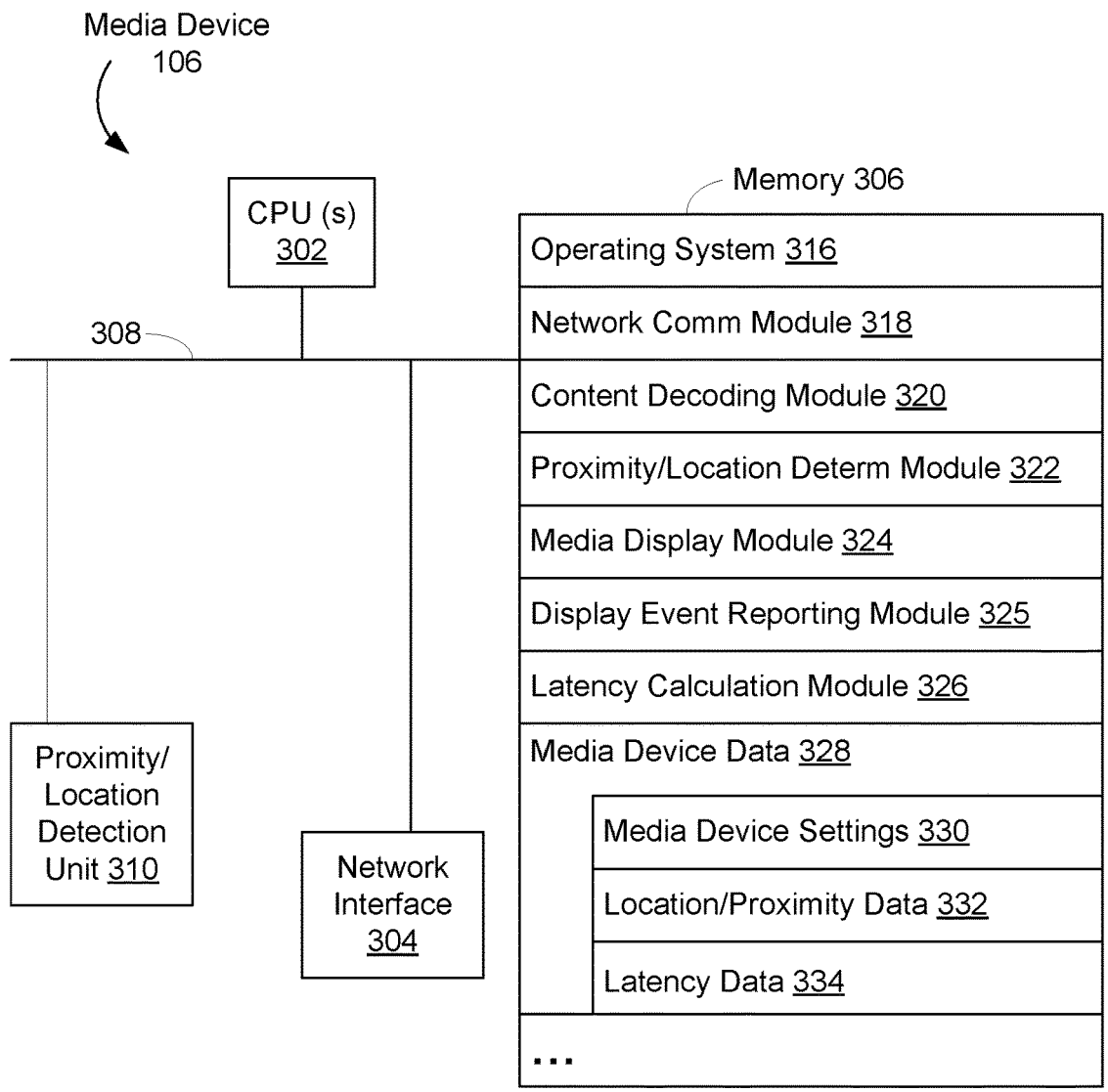
FIG. 3 is a block diagram illustrating an example media device of the gaming environment in accordance with some implementations.

FIG. 3 is a block diagram illustrating an example media device 106 of the gaming environment 100 in accordance with some implementations. The media device 106, typically, includes one or more processing units (CPUs) 302, one or more network interfaces 304, memory 306, and one or more communication buses 308 for interconnecting these components (sometimes called a chipset). Optionally, the media device 106 includes a proximity/location detection unit 310, such as an IR sensor, for determining the proximity of a client device 102.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the media device 106 to other computers or systems (e.g., the server system 114, and the client device 102) via one or more network interfaces 304 (wired or wireless) and one or more networks 110 and/or 112, such as the Internet, other wide area networks, local area networks, metropolitan area networks, cable television systems, satellite television systems, IPTV systems, and so on;

Content Decoding Module 320 for decoding content signals received from one or more content sources (e.g., server system 114 for output from the game session 116) and outputting the content in the decoded signals to an output device 108 coupled to the media device 106;

Proximity/location determination module 322 for determining the proximity of the client device 102 based on proximity related information that is detected by the proximity detection unit 310 or provided by the server system 114;

Media display module 324 for controlling media display; and

Display event reporting module 325 for reporting display event identification and/or timestamp information to the server system 114 for use in latency calculations;

Latency calculation module 326 for calculating latency values based on latency data 334 reported by other components in the gaming environment;

Media device data 328 storing at least data including:
  Media device settings 330 for storing information associated with user accounts of a media device application, including one or more of account access information and information for device settings (e.g., service tier, device model, storage capacity, processing capabilities, communication capabilities, etc.);
  Location/proximity data 332 including information associated with the presence, proximity or location of any of the client devices 102 and the media device 106; and
  Latency data 334 including information (e.g., timestamps) necessary for the latency calculation module 326 to calculate latency values.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
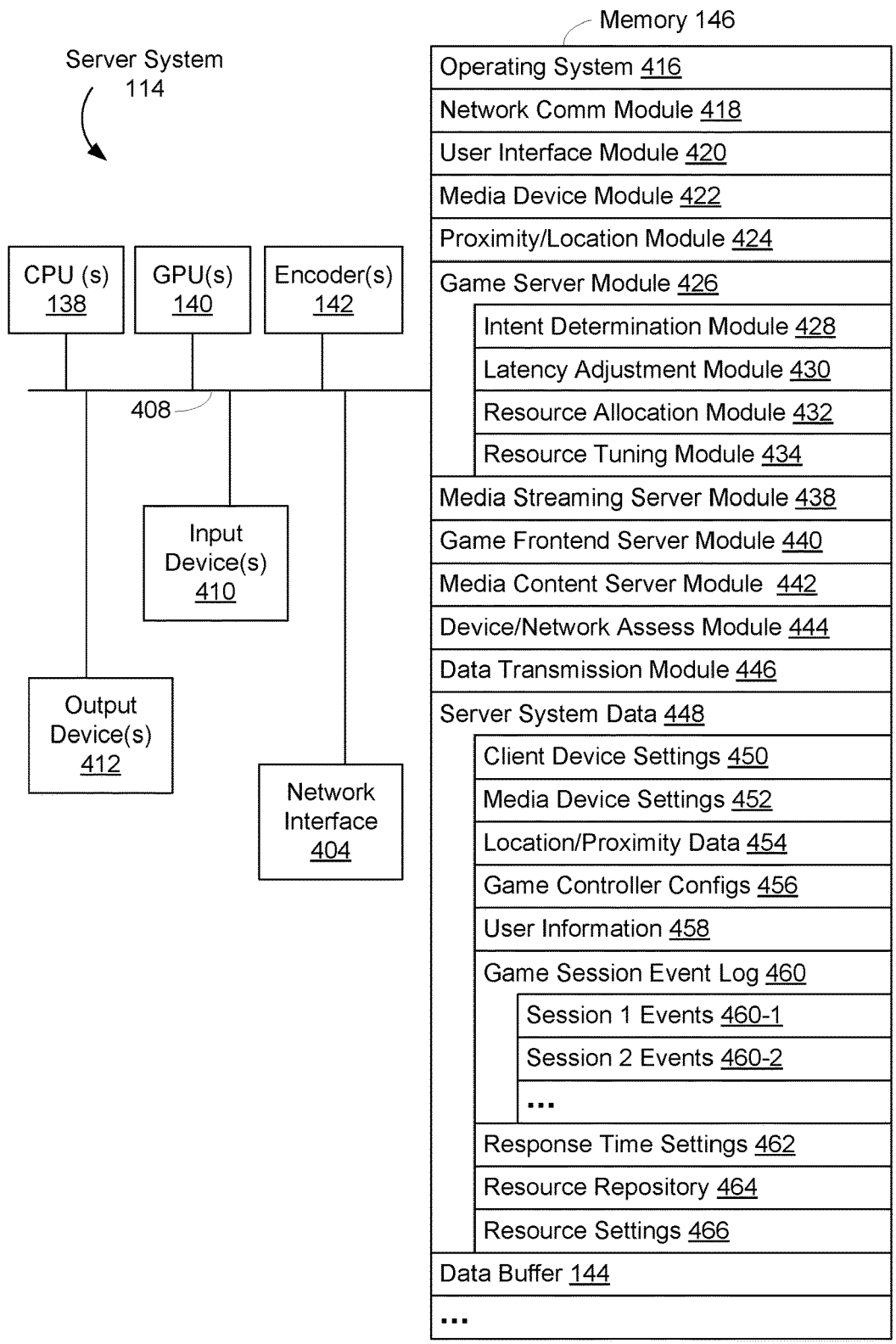
FIG. 4 is a block diagram illustrating an example server of the gaming environment in accordance with some implementations.

FIG. 4 is a block diagram illustrating an example server in the server system 114 of the gaming environment 100 in accordance with some implementations. The server system 114, typically, includes one or more processing units (e.g., CPU(s) 138, GPU(s) 140 and encoder 142), one or more network interfaces 404, memory 146, and one or more communication buses 408 for interconnecting these components (sometimes called a chipset). The server system 114 may optionally include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 412 that enable presentation of user interfaces and display content, including one or more speakers and/or one or more visual displays.

Memory 146 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 146, optionally, includes one or more storage devices remotely located from one or more processing units. Memory 146, or alternatively the non-volatile memory within memory 146, includes a non-transitory computer readable storage medium. In some implementations, memory 146, or the non-transitory computer readable storage medium of memory 146, stores the following programs, modules, and data structures, or a subset or superset thereof:

Operating system 416 including procedures for handling various basic system services and for performing hardware dependent tasks;

Network communication module 418 for connecting the server system 114 to other devices (e.g., various servers in the server system 114, client device(s) 102, and media device(s) 106) via one or more network interfaces 404 (wired or wireless) and one or more networks 110 and/or 112, such as the Internet, other wide area networks, local area networks, metropolitan area networks, and so on;

User interface module 420 for enabling presentation of information (e.g., a graphical user interface for presenting application(s), widgets, websites and web pages thereof, and/or games, audio and/or video content, text, etc.) at client device(s) 102;

A media device module 422 (optional) that is executed to provide server-side functionalities for device provisioning, device control, and user account management associated with media device(s) 106;

Proximity/location determination module 424 for determining the proximity of client device(s) 102 to the media device 106 based on location information of any of the client device 102 and the media device 106;

Game server module 426 for providing server-side functionalities associated with games (e.g., game application(s) 228), including but not limited to setting up game sessions, storing session state data and other game-related data, processing gameplay inputs from client device(s) 102, and rendering gameplay outputs in response to the gameplay inputs;

Media streaming server module 438 for hosting a media streaming site, receiving concurrent ancillary or supplemental media streams associated with an online gaming session, and providing the concurrent media streams to a client device 104 for concurrent display with the online gaming session that is being executed on the game applications 228 of the same client device 104 or a distinct client device 102;

Frontend server module 440 for managing user accounts associated with the client devices 102, e.g., subscriptions to membership of one or more online interactive games by a user account, enabling service to subscribers for forwarding subscriber requests to the game server module 426, and monitoring gameplay activity and related requests of subscribers;

Media content server module 442 for providing access to gaming content hosted by one or more third party content providers;

Device/network assessment module 444 for assessing device and network capabilities of client device(s) 102, including but not limited to assessing network bandwidth of the connection to the client device 102 and assessing whether the client device 102 has the needed module or application to play a game;

Data transmission module 446 for providing data (e.g., game controller configurations 456, software updates, etc.) to client devices 102; and Server system data 448 including:
  Client device settings 450 for storing information associated with the client device(s) 102, including common device settings (e.g., service tier, device model, storage capacity, processing capabilities, communication capabilities, etc.);
  Media device settings 452 (optional) for storing information associated with user accounts of the media device application 422, including one or more of account access information and information for device settings (e.g., service tier, device model, storage capacity, processing capabilities, communication capabilities, etc.);
  Location/proximity data 454 including information associated with the presence, proximity or location of any of the client device 102 and the media device 106;
  Game controller configurations 456 for storing controller configurations for various games;
  User information 458 for storing information associated with user accounts of each of one or more game applications (e.g., game application 228, FIG. 2) that are hosted on the server system 114, including for example user account information (e.g., identification and passwords), membership type, preference, and activity history;
  Game session event log 460 for storing event data associated with game sessions (e.g., game state data, input events, display events, other game-related data), including for example data 460-1 for a first game session and data 460-2 for a second game session, where the session data 460 for each game session includes, but is not limited to a frame rate, a rendering specification, a normal latency requirement, information of GPU allocation, information of encoder allocation, identifications of related sessions, latest status information associated with the respective game session, a log of input events, and a log of display events;

Response time settings 462 for storing expected latency values for various user command types;

Resource repository 464 for storing virtual machine resource profiles and container images; and Resource settings 466 for storing configurations of available resources based on user tolerance levels; and Data buffer 144 for temporarily storing gameplay multimedia content generated by the GPU 140 in association with one or more output media streams.

In some implementations, the game server module 426 includes the following programs, modules, or a subset or superset thereof:

Intent determination module 428 for comparing user input transit times (e.g., between the client device 102 and the server system 114) with display transit times (e.g., between the media device 106 and the server system 114), and determining the user's intent behind particular inputs by matching input events with respective trigger frames;

Latency adjustment module 430 for determining a number of intermediate frames for the GPU 140 to insert between (i) a current frame being processed at the time a user input is received and (ii) a response frame showing a result of the received input;

Resource allocation module 432 (optionally referred to herein as a "session orchestrator") for receiving session requests from endpoints (e.g., controllers 102) and determining which resources to assign to the session; and Resource tuning module 434 for determining latency tolerances for particular users.

In some implementations, the memory 146 further includes a data buffer 144 configured to couple the encoder 142 to the GPU 140. Specifically, the data buffer 144 temporarily stores gameplay multimedia content generated by the GPU 140 in association with one or more output media streams, such that the encoder 142 can retrieve the gameplay multimedia content from the data buffer 144 and encode the retrieved content to the one or more media streams, e.g., for standardization, speed or compression.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 146, optionally, stores a subset of the modules and data structures identified above. Furthermore, memory 146, optionally, stores additional modules and data structures not described above.

Detecting and Compensating for Display Lag

The various implementations of cloud-based gaming platforms described above provide many benefits (e.g., portability, scalability, efficiency, ease of access and control, and so forth). However, the cloud-based nature of these gaming platforms come with various challenges, such as variability in network and processing resources, which may negatively affect the gameplay experience if not proper accounted for. Such challenges can potentially create an uneven gaming experience due to variable latencies introduced in the networks 110/112 between players devices 102 and the server system 114. The following disclosure describes various implementations which detect and compensate for different types of latency that may exist in real-time interactive cloud-based gaming environments. By compensating for these latencies, the implementations described herein provide a smooth and uniform gaming experience for each player, regardless of the network and processing resources available.

Figure 5A:
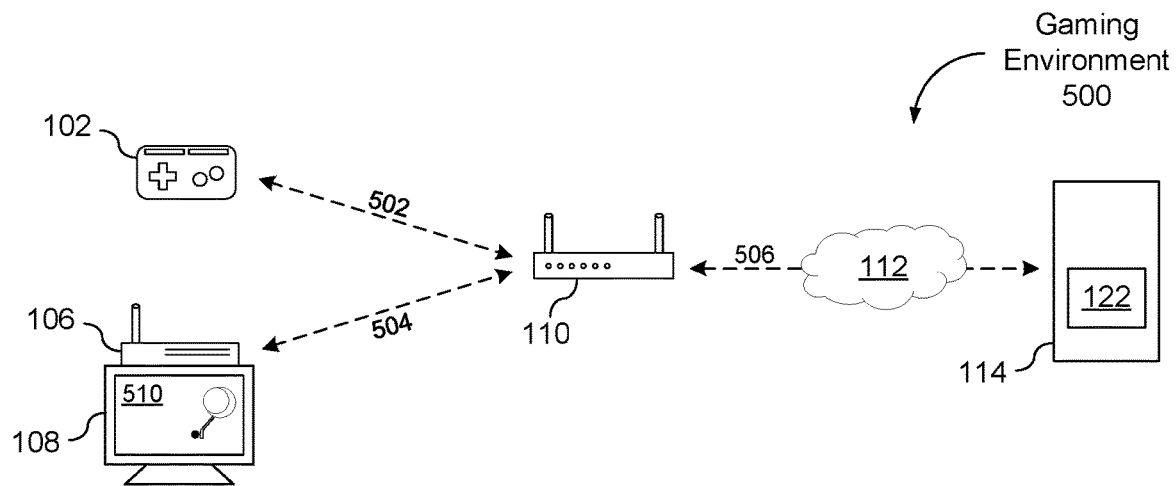
FIG. 5A depicts an example gaming environment in accordance with some implementations.

FIG. 5A depicts an example gaming environment 500, from which several sources of latency will be described. Gaming environment 500 is an example implementation of gaming environment 100 (FIG. 1), with corresponding components similarly labeled. The gaming environment 500 includes a client device 102 (also referred to herein as a "game controller" or "controller"), which a player (or "user") uses to control various aspects of the game (or "gameplay") by, for example, activating or manipulating inputs 210 (FIG. 2). The gaming environment 500 also includes a media device 106 (e.g., a set-top box) and an output device 108 (e.g., a television or other output display). The controller 102 and the media device 106 are communicatively coupled to a local network 110 (depicted, in this example, as a wireless router) via local communication links 502 and 504, respectively (e.g., through WiFi). The local network 110 is communicatively coupled through a communication link 506 to a server system 114 via communication network(s) 112 (e.g., the internet). The server system 114 includes a game server 122 (FIG. 1).

While the gaming environment 500 depicted in the figure only includes a single local network 110 with a single controller 102, some implementations of the gaming environment 500 may include a plurality of local networks 110, with some of the local networks 110 including more than one controller 102 (e.g., for multiplayer games sharing the same gaming session, as described with reference to FIGS. 1-4 above).

Several elements that are present in the gaming environment 500 can introduce latency that is both appreciable (e.g., impacting at least one frame) and time-varying. For instance, the local network 110 (e.g., WiFi) can introduce various amounts of latency in communication links 502 and 504. Average latency can be very low (e.g., <1 ms) if there is no contention on the channel. However, in busy environments such as apartment buildings with overlapping WiFi networks or gameplay environments with multiple wireless client devices, average amounts of latency in the 10-50 ms range are more common, with 200+ms outliers.

Further, the communication network(s) 112 (e.g., the internet) can introduce latency in communication link 506. This latency may be less highly variable than WiFi for most users; however, in peak gaming hours (early evening), media sharing (e.g. on Cable modems) as well as network saturation can result in delayed or dropped packets. The average latency will depend on distance from the local network 110 to an edge server of the server system 114, with example amounts of latency in the 20-30 ms range.

The network-introduced latencies described above may vary based on the direction of traffic flow (e.g., from controller 102 to server 122, vs. from server 122 to media device 106), due to asymmetry of network demand and link capacity. Accordingly, latency on link 506 from the router to the server may not match latency from the server back to the router, and so forth.

Further, the game server 122 can introduce latency. There is latency from the arrival of an input event at the GPU 140 to the output of a frame from the encoder 142. However, in some implementations, this latency is fully traceable, and as a result, is known by the game server 122.

Lastly, there is latency between arrival of a frame at the output device 108 (e.g., the television) and display of that frame. This can depend on the nature of processing in the output device, including the display mode (e.g. game mode vs. a non-game mode). For example, a televisions may have as little as 15-30 ms of display lag, or as much as 50-60 ms of display lag. A bad television can have 120+ms of display lag.

Figure 5B:
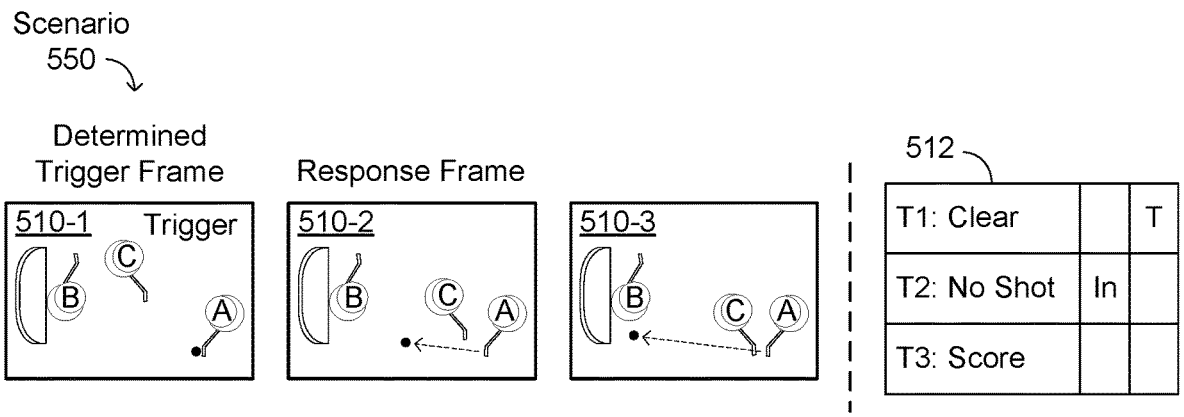
FIGS. 5B and 5C depict example gaming scenarios in accordance with some implementations.
Figure 5C:
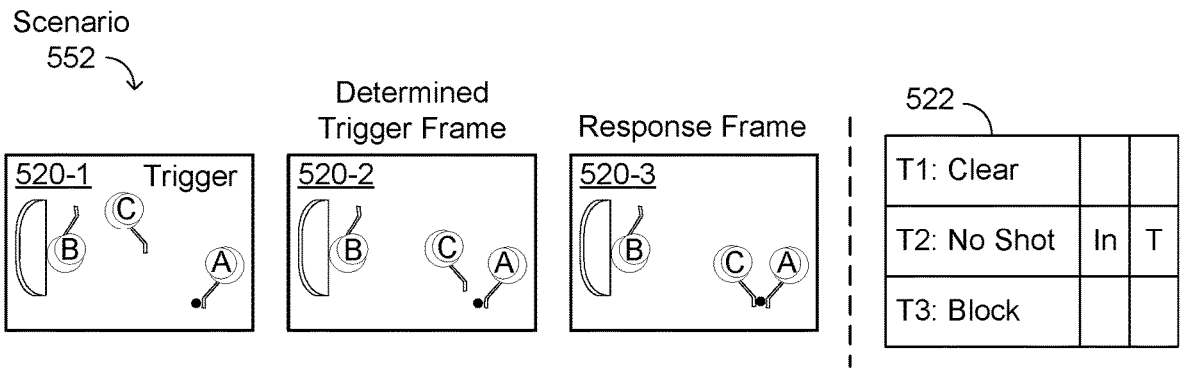

The different types of latency described above may have significant effects on the gameplay experience. FIGS. 5B and 5C show two example gameplay experiences which include the same user input but result in entirely different outputs due to different levels of latency. Before describing these examples in detail, however, it is first necessary to describe an example gameplay process.

Latency Compensation

Figure 6:
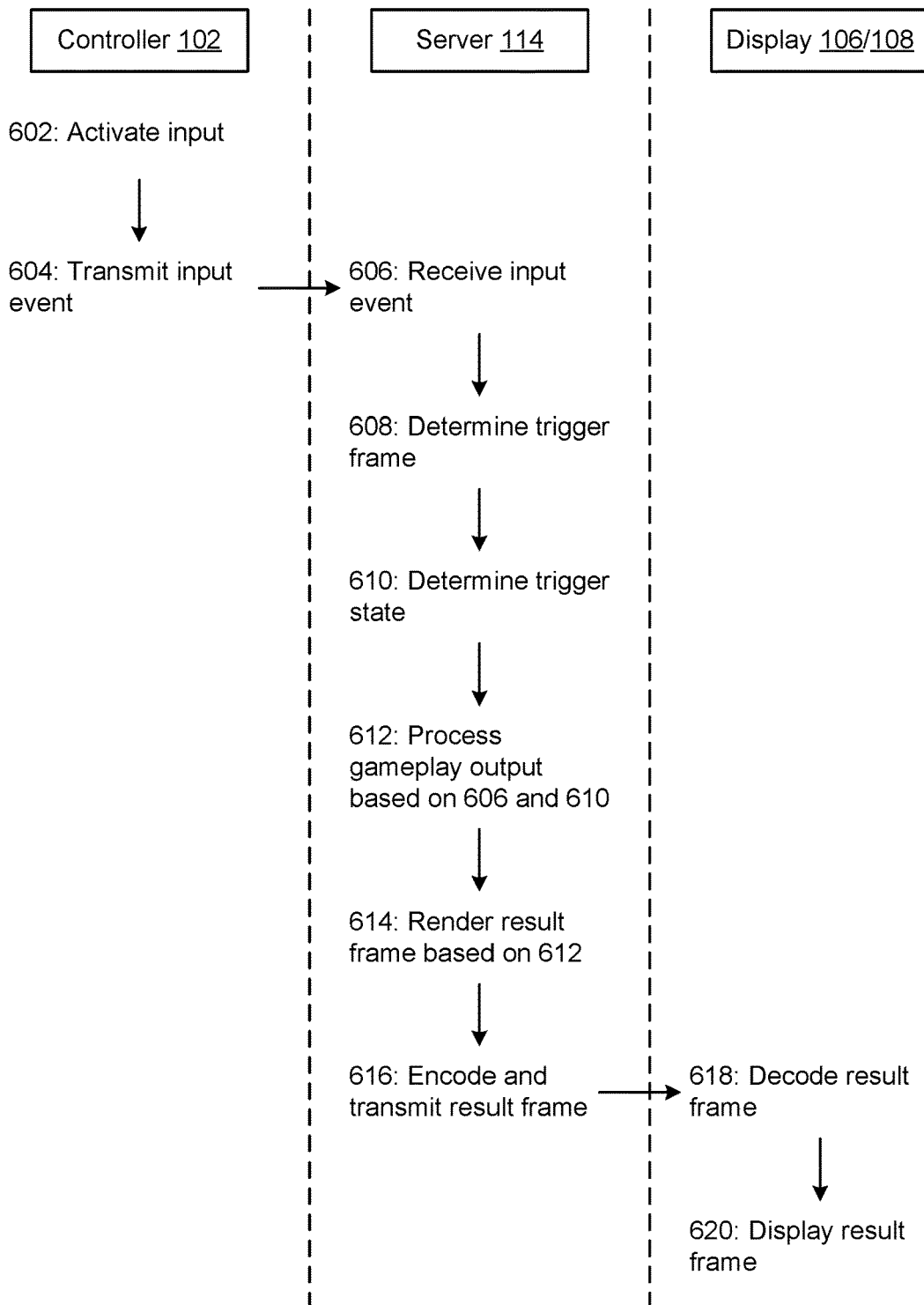
FIG. 6 is a flow diagram of a gameplay process in accordance with some implementations.

FIG. 6 is a flow diagram of a gameplay process 600 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors; a media device (e.g., media device 106) having one or more processors (e.g., CPU 302) and memory (e.g., memory 306) storing one or more programs for execution by the one or more processors; and/or a user device (e.g., controller 102) having one or more processors (e.g., CPU 202) and memory (e.g., memory 206) storing one or more programs for execution by the one or more processors. In some implementations, the server, media device, and user device include one or more programs and memory storing one or more respective programs for execution by the one or more respective processors, and the one or more programs include instructions for performing the process 600. In some implementations, respective non-transitory computer readable storage media store one or more respective programs, the one or more respective programs including instructions, which, when executed by an electronic server, the media device, and the user device, with one or more respective processors, causes the electronic server, the media device, and the user device to perform the process 600.

A user of controller 102 (also referred to herein as a "player") uses the controller 102 to influence events in the game, which are depicted by video frames (e.g., 510) displayed on the output device 108 (see FIG. 5A). When the player decides to influence gameplay (e.g., by moving a virtual player, shooting a hockey puck, and so forth), the player activates (602) or otherwise manipulates an input 210 on the controller 102 (e.g., presses a button). The activation or manipulation of an input 210 on the controller 102 is sometimes referred to herein as an "input event" or a "command." The input event is communicated (604), via communication links 502 and 506 (over networks 110 and 112) to the server system 114 (e.g., to an event log 460 associated with the game session).

Upon receipt (606) of the input event, the server system 114 (e.g., intent determination module 428 of game server 122) determines (608) which frame was displayed on the output device 108 at the time the user activated the input associated with the received input event. The frame that was displayed to the user at the time the user activated the input is referred to herein as the "trigger frame," because it triggered the user to respond by activating the input. For example, in a hockey game, if a frame displays an open shot, this triggers the player to respond by activating an input control that is mapped to a "shoot puck" function. The trigger frame is the frame 510 showing the open shot (e.g., frame 510-1, FIG. 5B), and the input event is the user's activation of the "shoot puck" control on the controller 102, in response to having seen the trigger frame 510.

Upon determining the trigger frame, the game server 122 (e.g., intent determination module 428) determines (610) the state of the game at the time the trigger frame was displayed to the user (referred to herein as the "trigger state"). In some implementations, the intent determination module 428 determines the trigger state by consulting a log of game states maintained in an event log 460 (FIG. 4). In some implementations, the event log 460 includes a log of game states that is indexed by frame fingerprints, frame IDs, and/or game time data (e.g., timestamps or clock data). In some implementations, the intent determination module 428 determines the trigger state by determining a game time index associated with the trigger frame, and consulting the event log 460 to determine the state of the game that existed at the time of the game time index associated with the trigger frame. Depending on how much time passed between the displaying of the trigger frame on output device 108 and the receiving of the input event at the game server 122, the trigger state may be in the past, relative to a current state being processed at the game server 122.

Going back to the previous example, if the trigger frame (showing an open shot on the goal) is associated with game time index T1, the state of the game at time index T1 includes a virtual shooter, a virtual defender, a virtual puck, a virtual goal, and the location of each of these objects. According to the state of the game at time index T1, or more specifically, the location of each of the aforementioned virtual objects at time index T1, a clear path exists between the puck and the goal. Stated another way, one or more algorithms controlling rules of gameplay would have allowed, at the moment in time during display of the trigger frame (time index T1), a virtual puck to travel from the virtual player shooting the puck to the virtual goal without being stopped by any other virtual players between the shooter and the goal. However, in some scenarios, when an input event (e.g., "shoot puck") arrives at the server, the server is currently processing gameplay at a subsequent state T2, which may include an advanced state of gameplay in which the virtual puck no longer has a clear path to the goal. In these scenarios, if the server correctly determines the trigger state to be T1, then the trigger state is a past state, relative to the state T2 that server is currently processing.

Having determined the trigger state, the game server 122 (e.g., GPU 140) processes (612) a subsequent game state (sometimes referred to herein as a "gameplay output") in accordance with (i) the input event (e.g., "shoot puck"), and (ii) the trigger state (e.g., including a clear path from the puck to the goal). In some implementations, processing a gameplay output comprises inputting the input event into an algorithm or game engine that determines gameplay outputs based on input events and corresponding game states. For example, a game engine may determine the next game state based on the state/location of each player and the puck in relation to the goal during the current game state, as well as any input commands received with respect to the virtual players (e.g., "move," "shoot," or "block") during the current game state. In some implementations, processing the subsequent game state (the gameplay output) in accordance with the input event and the trigger state includes processing the input event as if it had been available to the server at the time the server was processing a game state proximate to the trigger state (e.g., the next state after the trigger state, or a state closely following the trigger state).

Upon processing the gameplay output, the game server 122 renders (614) a frame or a series of frames depicting the processed gameplay output. The frame (or the first of the series of frames) depicting the gameplay output is referred to herein as the "response frame(s)." For example, if the input event and trigger state result in a gameplay output including movement of a particular virtual player, the response frame is a frame that depicts the particular virtual player in a modified spatial location with respect to other objects in the frame, consistent with the direction specified by the user input. Alternatively, if the input event and the trigger state result in a gameplay output of a particular virtual player shooting a puck, the response frame is the first of a series of frames that depict the particular virtual player shooting the hockey puck (e.g., frame 510-3, FIG. 5B). In some implementations, rendering the response frame comprises introducing a new virtual object, modifying an existing virtual object, or modifying any other aspect of gameplay in accordance with the processed gameplay output, and including the new virtual object, the modified existing virtual object, or any other aspect of the modified gameplay in the response frame.

The server system 114 proceeds to encode the response frame (e.g., using encoder 142) and transmit (616) the encoded response frame to the media device 106. Upon receiving the encoded response frame from the server system 114, the media device 106 decodes (e.g., using content decoding module 320) the response frame, and causes the decoded response frame to be displayed (620) to the user (e.g., using output device 108).

Returning to FIGS. 5B and 5C, two sequences of video frames (510 and 520) are depicted showing the same input event (shooting a puck) but different response frames (successful shot 510-2 vs. blocked shot 520-3) due to different amounts of latency present in the gaming environment 500. These sequences are examples of the gameplay process 600 applied to the gaming environment 500.

FIG. 5B depicts a first scenario 550, including a sequence of video frames 510 showing three virtual players (A, B, and C) playing a hockey game, as well as a table 512 of game states T1-T3 (e.g., stored in log 460, FIG. 4). Player A is controlled by the user of controller 102, and Players B and C are controlled by other users of other controllers, by computer-controlled algorithms, or by a combination thereof. At state T1, Player A has a clear shot on the goal (denoted as "Clear" in table 512); accordingly, the game server transmits a frame 510-1 to the user's display 108 denoting this state. When the user controlling Player A views frame 510-1 on the display 108, the user sees that Player A has a clear shot on the goal, and therefore decides to command Player A to shoot the puck. In other words, frame 510-1 triggers the user to input a "shoot" command. The "shoot" command is sent as an input event to the game server 122. When the game server 122 receives the "shoot" input (denoted as "In" in table 512), the game server is currently processing state T2, at which Player A no longer has a clear shot (denoted as "No Shot" in table 512). However, the game server 122 correctly determines that the trigger frame (denoted as "T" in table 512) was frame 510-1. According to the state of the game when frame 510-1 was displayed (the trigger state T1), Player A still had a clear shot on the goal; therefore, the game server 122 processes a subsequent state T3 according to the "shoot" command and the T1 state (clear shot). According to the game engine, if a player shoots while the player has a clear shot, the subsequent state includes a successful shot sequence, and this sequence is processed at state T3 (denoted as "Score" in table 512). As such, the game server renders a response frame 510-2 depicting Player A shooting the puck past Player C and transmits the response frame to the user. From the user's perspective, the response frame depicts the actions that the user intended at the time of the input event. As such, by correctly determining the trigger state corresponding to the user's input, the game server processes gameplay based on the user's intent.

FIG. 5C depicts a second scenario 552, including a sequence of video frames 520 showing the same game and players as in scenario 550, as well as a table 522 of game states T1-T3 (e.g., stored in log 460, FIG. 4). Like the previous scenario, at state T1, Player A has a clear shot on the goal (denoted as "Clear" in table 522); accordingly, the game server transmits a frame 520-1 to the user's display 108 denoting this state. When the user views frame 520-1 on the screen 108, the user sees that Player A has a clear shot on the goal, and therefore decides to command Player A to shoot the puck. The "shoot" command is sent as an input event to the game server 122. Like the previous scenario, when the game server 122 receives the "shoot" input (denoted as "In" in table 522), the game server is currently processing state T2, at which Player A no longer has a clear shot (denoted as "No Shot" in table 522). However, unlike the previous scenario, the game server 122 does not correctly determine the trigger frame (denoted as "T" in table 522). Instead, the game server assumes that the trigger frame was the last frame to be rendered in accordance with the current state T2, which, in this example, is frame 520-2. Alternatively, the game server may not have even attempted to determine a trigger frame, and instead processes a gameplay output based on the current state T2 (no shot). In either case, the game server processes a subsequent state T3 according to the "shoot" command and the T2 state (no shot). According to the game engine, if a player shoots while the player does not have a clear shot, the subsequent state includes a blocked shot sequence, and this sequence is processed at state T3 (denoted as "Block" in table 522). As such, the game server renders a response frame 520-3 depicting Player A attempting to shoot the puck but being blocked by Player C, and transmits the response frame to the user. From the user's perspective, the response frame depicts actions that the user did not intend at the time of the input event. Specifically, the user intended to have Player A shoot while Player C was not in the way; instead, Player A did not shoot as quickly as the user intended and the shot was blocked as a result. As such, by failing to correctly determine the trigger state corresponding to the user's input, the game server may process gameplay events contrary to the user's intent, which may potentially cause the user (and many other users) to lose interest in playing the game and/or using gaming environment 500.

In each of the two scenarios described above, the input event occurs at the same time; however, depending on how long it takes for the input event to reach the game server, the response frame depicts two very different outcomes. This is because if the server receives the user's input while processing a game state that is later in time (e.g., T2) than the game state that triggered the user to make the input (e.g., T1), the server may incorrectly process a gaming output based on incorrect information about the timing of the user input. Since it is paramount for the gaming platform to avoid this kind of inconsistency, it is important for the gaming platform to detect and compensate for the various latencies introduced in the gaming environment that cause these delays. By detecting the various latencies, the gameplay platform can more accurately correlate input events with the actual trigger states (as in scenario 550). By making these correlations, the gaming platform reduces the impact of uncontrollable and/or undetectable latency by processing each input event in a way that is consistent with the user's intent. As such, the various implementations described herein are an improvement over gaming platforms that do not attempt to determine, or incorrectly determine, accurate trigger states that correspond with user inputs.

In certain scenarios, depending on how much time has passed between the trigger state and a current state being processed by the game server, a particular gameplay output may contradict what has already been displayed to one or more users. For example, in FIG. 5C, frame 520-3 depicts a blocked shot. However, if game server determines, during state T3, that the trigger state was T1, in some implementations, the game server attempts to retroactively reconcile the user's intent with the current state of the game. In other words, the user's intent was to shoot the puck while Player A had a clear shot, while the current state of the game (T3) is displaying player C between Player A and the goal. In order to reconcile the user's intent (puck moving toward goal) with the current state (Player C in the puck's way), the game server may render a sequence of response frames with the puck moving toward the goal, despite Player C being in the way (e.g., frame 510-3, FIG. 5B). The response frames may appear to be inconsistent with the current game state; however, they are consistent with the user's intent during the past (trigger) game state. Game developers may plan for these contingencies in advance by, for example, designing animations that reconcile inconsistent game states. Example reconciliation animations include immediately shifting a virtual character or object to an intended position (even if this may appear to violate the in-game physics), or advancing the game state in the intended manner without showing the correct animation (e.g., updating the score without showing the puck arrive at the goal, or classifying a monster as having sustained a wound even though the monster appeared to have moved out of the way before being shot). In some implementations, reconciling a current game state with a game state intended by the user at the time of the user interaction (the intended game state) comprises modifying a frame depicting the current game state to create a subsequent frame depicting the intended game state.

Latency Detection

The following discussion describes various approaches, in accordance with some implementations, to detecting various latencies in the gaming environment. Latency detection is a necessary step for enabling the game server to accurately determine the trigger frame for a particular user input (step 608, FIG. 6), thereby enabling the game server to determine the trigger state and, by extension, the user's intent behind the input as discussed above. With knowledge of the correct trigger frame (and by extension, the trigger state), the game server 122 can process an output that more accurately reflects the user's intent, by considering the gameplay state closer to the time the user enters the input (e.g., pushes the button), instead of the gameplay state at the time the input arrives at the server (which may correspond to a later gameplay state).

What follows is a brief discussion of latency from the game server's perspective (e.g., server 122), including certain latency values the server may have access to in some implementations, as well as certain latency values the server may not have access to in some implementations. For latency values the server does not have access to, several implementations for detecting or approximating those values will be described in reference to FIGS. 7-12.

In some implementations, the game server 122 has access to information necessary to calculate processing latency, which is the amount of time it takes to process an input event and transmit a resulting response frame. In some implementations, processing latencies vary on a per-event basis. In some implementations, processing latencies vary according to game state complexity (e.g., the number of gameplay events that are being processed at the same time). In some implementations, in order to calculate processing latency for a particular input event, the server system 114 records a first timestamp corresponding to the time that the input event arrives at the server system 114 (e.g., at an edge server), as well as a second timestamp corresponding to the time that an encoded response frame leaves the server system 114. From these two timestamps, the server system 114 calculates a processing latency associated with the input event (e.g., by subtracting the first timestamp from the second timestamp).

In some implementations, the game server 122 also has access to information necessary to calculate the average round-trip time (RTT) between the server system 114 and the controller 102. In some implementations, the server system 114 calculates this RTT value by sending one or more test packets (e.g., pings) to the controller 102, receiving corresponding responses, and calculating one or more average response times. In some implementations, the game server 122 also has access to information necessary to calculate the RTT between the server 114 and the media device 106. In some implementations, the server system 114 calculates this RTT value by sending one or more test packets (e.g., pings) to the media device 106, receiving corresponding responses, and calculating one or more average response times. However, due to asymmetric network latencies, as discussed above, average RTT information alone may not be adequate to determine accurate one-way transit times from the controller 102 to the server system 114, or from the media device 106 to the server system 114. If the server system 114 cannot directly calculate the aforementioned one-way transit times, the server system 114 may not be able to accurately determine the trigger frame.

With access to the RTT values described above, the server system 114 (e.g., intent determination module 428) can approximate the trigger frame by assuming an average RTT value for each input event, dividing the RTT values in half, and adding in an assumed amount of output device display lag (e.g., television display lag). Even though delays between two network nodes are often asymmetric (forward and reverse delays are not equal), half the RTT value is the average of the forward and reverse delays; as such, half the RTT value may be used as an approximation to the one-way delay (also referred to herein as "one-way transit time" and "one-way latency").

In some implementations, the intent determination module 428 uses one-way latency values (i) between the controller and server, (ii) between the media device and server, or (iii) a combination thereof, to more accurately determine the trigger frame. The following discussion describes several implementations, with reference to FIGS. 7-12, for measuring, or more accurately approximating, one-way transit times in order to more accurately determine the trigger frame for a particular input event.

FIGS. 7-12 are flow diagrams of a trigger frame determination processes 700-1200 in accordance with some implementations. The processes may be performed at an electronic server (e.g., server system 114, or more specifically, game server 122) having one or more processors (e.g., CPU 138 and/or GPU 140) and memory (e.g., memory 146) storing one or more programs for execution by the one or more processors; a media device (e.g., media device 106, also referred to as a "display" when combined with or otherwise coupled to an output display device 108) having one or more processors (e.g., CPU 302) and memory (e.g., memory 306) storing one or more programs for execution by the one or more processors; and/or a user device (e.g., controller 102) having one or more processors (e.g., CPU 202) and memory (e.g., memory 206) storing one or more programs for execution by the one or more processors. In some implementations, the server, media device, and user device include one or more programs and memory storing one or more respective programs for execution by the one or more respective processors, and the one or more programs include instructions for performing the respective processes. In some implementations, respective non-transitory computer readable storage media store one or more respective programs, the one or more respective programs including instructions, which, when executed by an electronic server, the media device, and the user device, with one or more respective processors, causes the electronic server, the media device, and the user device to perform one or more of the methods 700-1200.

Figure 7:
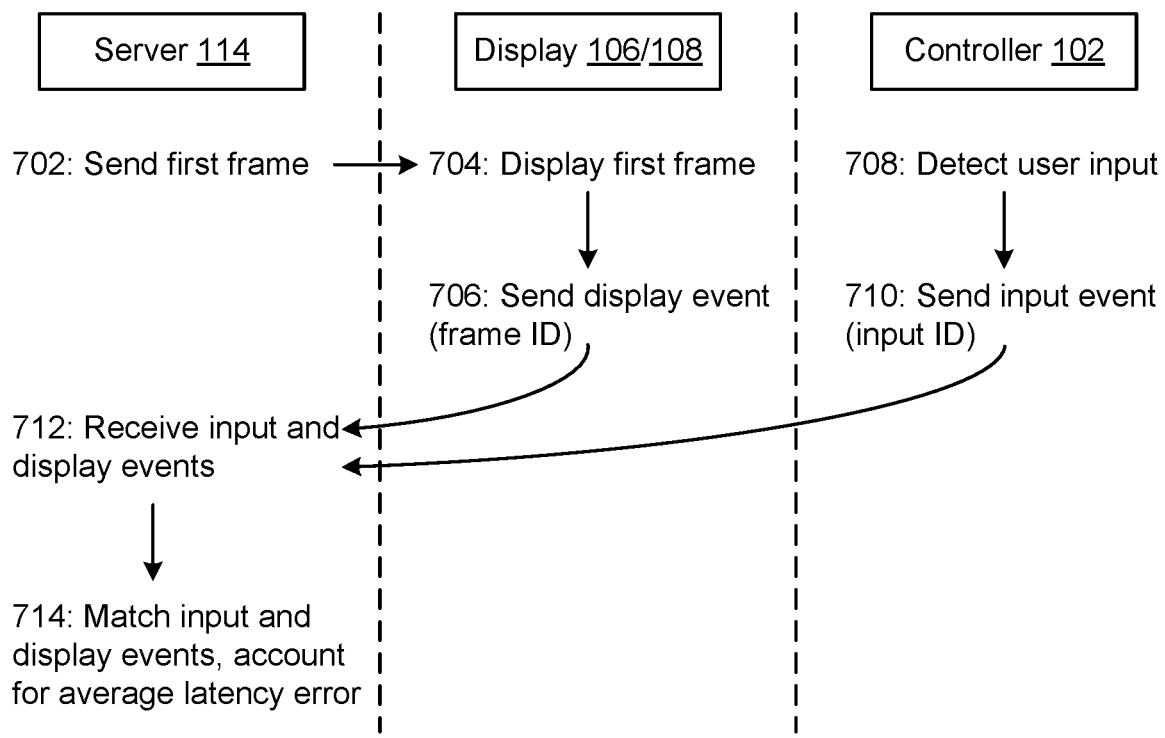
FIGS. 7-12 are flow diagrams of a various trigger frame determination processes in accordance with some implementations.

FIG. 7 describes a trigger frame determination process 700 in accordance with some implementations. In process 700, the server 114, the media device 106, and the controller 102 are independent components using unsynchronized clocks. As such, an analysis of timestamps sent from the controller to the server and/or from the media device to the server would not provide an accurate assessment of latencies between the respective components. In some implementations, one or more of the clocks are synchronized. However, the server may use process 700 to determine a trigger frame regardless of whether any of the aforementioned clocks are synchronized.

Process 700 begins with the server 114 sending (702) a first of a series of frames to the media device 106 for display on output device 108 to a user. When the media device 106 causes the first frame to be displayed (704) to the user, the media device 106 communicates (706) to the server 114 (e.g., to an event log 460 associated with the game session) that the first frame has just been displayed. This communication is referred to herein as a "display event," and in some implementations, is reported by display event reporting module 325 of the media device 106. Each time the media device 106 causes a frame to be displayed, the media device 106 (e.g., reporting module 325) sends a corresponding display event back to the server. In some implementations, the display event includes a frame ID corresponding to the frame that has just been displayed. Meanwhile, the user, upon observing the first frame and deciding to manipulate the controller in order to influence gameplay, activates an input. The controller 102 detects (708) the user's input and communicates (710) the user's input to the server 114. This communication is referred to herein as an "input event," and in some implementations, is reported by input event reporting module 223 of the controller 102. Each time the controller 102 detects a user input, the controller 102 sends a corresponding input event to the server. In some implementations, the input event includes an input ID corresponding to the particular input activated by the user.

Meanwhile, the server, which is continuously rendering and sending frames for display to the user, continuously receives (712) display events corresponding to the rendered frames sent (e.g., during step 702) to the user. Upon receiving (712) an input event (e.g., from step 710), the intent determination module 428 matches (714) the input event with the closest received display event. Assuming similar one-way latencies between the controller and server, and between the media device and server, input events and their corresponding display events should arrive roughly at the same time. As such, by matching an input event with the display events received closest in time to the time the input event was received, the intent determination module 428 approximates the user's input event intent by classifying the frame associated with the matched display event as the trigger frame.

Inaccuracies may arise from differences in the upstream connections associated with the controller 102 and the media device 106, due to variabilities in the upstream links (e.g., links 502 and 504, FIG. 5A). For example, the media device 106 may be using a wired connection while the controller 102 may be using a wireless connection with added latency. In some implementations, the intent determination module 428 accounts for these variabilities by averaging the difference in latencies between the two links (e.g., by comparing an average server-media device RTT with an average server-controller RTT).

Figure 8:
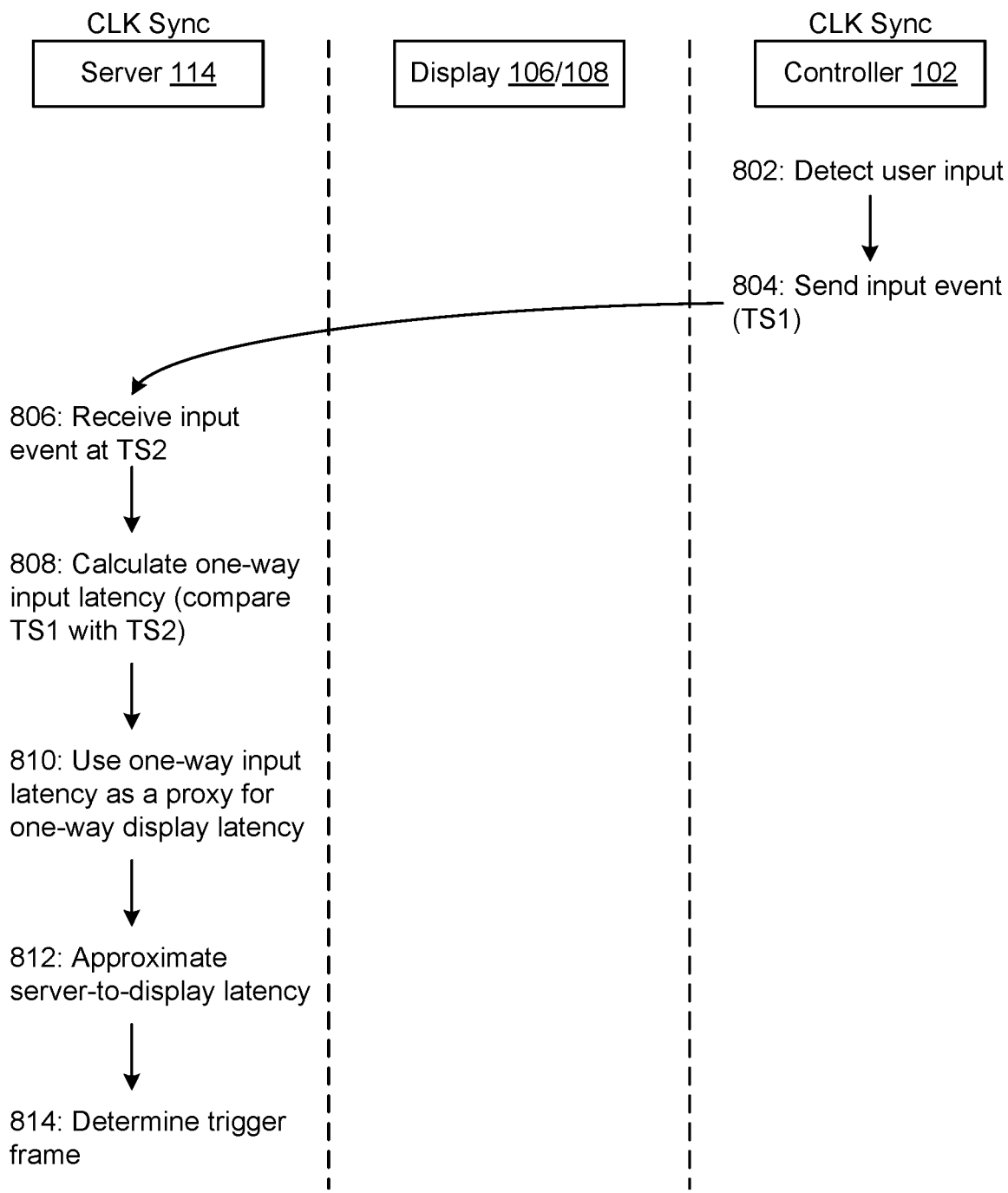

FIG. 8 depicts a trigger frame determination process 800 in accordance with some implementations. In process 800, the server 114 and the controller 102 have synchronized clocks. In this process and others involving clock synchronization (e.g., processes 900-1200 discussed below), some implementations accomplish the synchronization via a Network Time Protocol (NTP) server. In some implementations, one or more of the aforementioned clocks are periodically re-synchronized due to clock drift.

Process 800 begins with the controller 102 detecting (802) a user input and the reporting module 223 sending (804) a corresponding input event to the server 114, as described in process 700 above. However, in process 800, the input event additionally includes a timestamp (e.g., TS1). The server 114 receives (806) the input event at time TS2, and calculates (808) the one-way input-to-display latency by comparing TS1 with TS2 (e.g., by taking the absolute value of the difference between each time stamp). The server 114 (e.g., intent determination module 428) then approximates (810) the one-way display-to-server latency by using the one-way input-to-server latency as a proxy (e.g., setting the one-way display-to-server latency equal to the one-way input-to-display latency).

The intent determination module 428 then approximates (812) the one-way server-to-display latency. In some implementations, the server-to-display latency is approximated by using a time-averaged or sliding window of the display-to-server latency as a proxy (e.g., setting the server-to-display latency equal to the display-to-server latency). Alternatively, the server-to-display latency is approximated by using a recently measured server-display RTT (e.g., by dividing the RTT in half), and optionally adding an assumed display lag (as described above with reference to output device 108 latencies).

Upon determining a value for the one-way server-to-display latency (e.g., D ms), the intent determination module 428 determines (814) the trigger frame to be the frame that was transmitted to the media device D ms before TS1.

Figure 9:
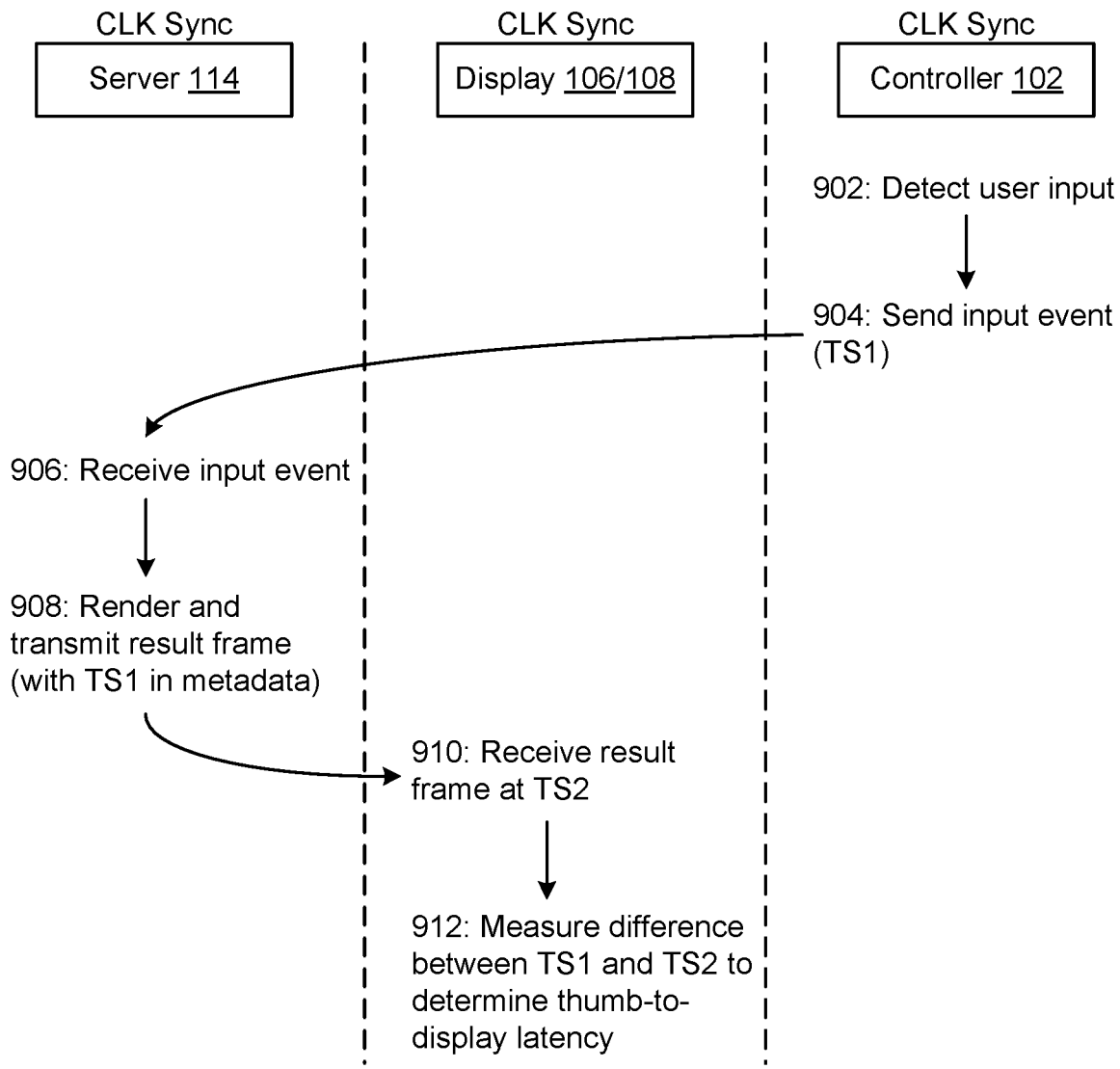

FIG. 9 depicts a trigger frame determination process 900 in accordance with some implementations. In process 900, the media device 106 and the controller 102 have synchronized clocks. In some implementations, the server 114 also has a clock that is synchronized to the media device's clock, the controller's clock, or both.

Process 900 begins with the controller 102 detecting (902) a user input and the reporting module 223 sending (904) a corresponding input event with a timestamp TS1 as described in process 800 above. The server 114 receives (906) the input event and renders (908) a response frame, assuming a current game state triggered the input event, or assuming a past game state triggered the input event (e.g., offset by a predetermined amount). The server 114 includes the timestamp TS1 with the response frame (e.g., in metadata of the frame), and transmits it to the media device 106. The media device 106 receives (910) the response frame and causes the response frame to be displayed to the user at a second timestamp (e.g., TS2). The media device 106 (e.g., latency calculation module 326) measures (912) the difference between the two timestamps to determine the amount of delay between the time the user entered the input on the controller 102 to the time the user saw the corresponding response on the display 108 (referred to herein as "thumb-to-display latency"). In some implementations, the media device 106 stores the timestamp data as latency data 334, and the latency calculation module 326 accesses the stored timestamp data in order to calculate the various latencies described above. In some implementations, the latency calculation module 326 combines the thumb-to-display latency with other known latencies (e.g., from one or more processes 700-1200) to better approximate the trigger frame.

Figure 10:
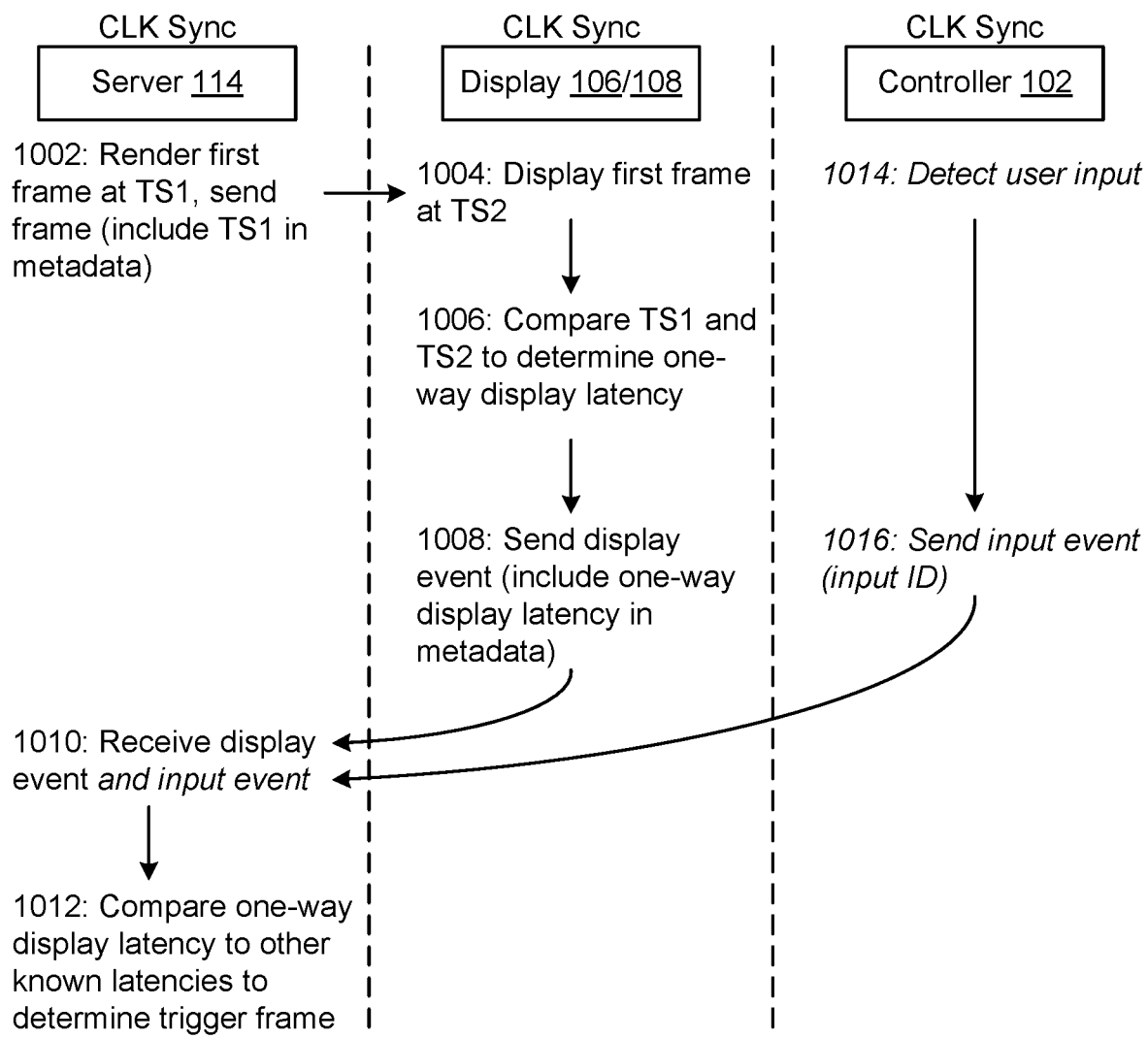

FIG. 10 depicts a trigger frame determination process 1000 in accordance with some implementations. In process 1000, the media device 106 and the controller 102 have synchronized clocks. In some implementations, the server 114 also has a clock that is synchronized to the media device's clock, the controller's clock, or both.

Process 1000 begins with the server 114 rendering (1002) a first frame at timestamp TS1, and sending the frame to the media device 106 with the timestamp TS1 included with the frame (e.g., included in metadata of the frame). The media device 106 receives (1004) the frame and causes the frame to be displayed at timestamp TS2. The media device (e.g., latency calculation module 326) compares (1006) the two timestamps TS1 and TS2 to directly determine the one-way server-to-media device latency, and the reporting module 325 reports (1008) the determined one-way server-to-media device latency to the server 114. In some implementations, the report is included in a display event corresponding with the first frame. The server 114 receives the server-to-media device latency and intent determination module 428 compares (1012) it with other known latencies (e.g., from one or more processes 700-1200, such as data on recent media device-to-server latency) to better approximate the trigger frame. In some implementations, since display events can be assumed to arrive at a time proximate to corresponding input events, the process 1000 further includes the controller 102 detecting (1014) a user input and the controller's reporting module 223 sending (1016) an input event including an input ID of the detected user input to the server 114. The server's intent determination module 428 optionally matches the input event with the nearest display event, as described in process 700 above, in order to better approximate the trigger frame.

Figure 11:
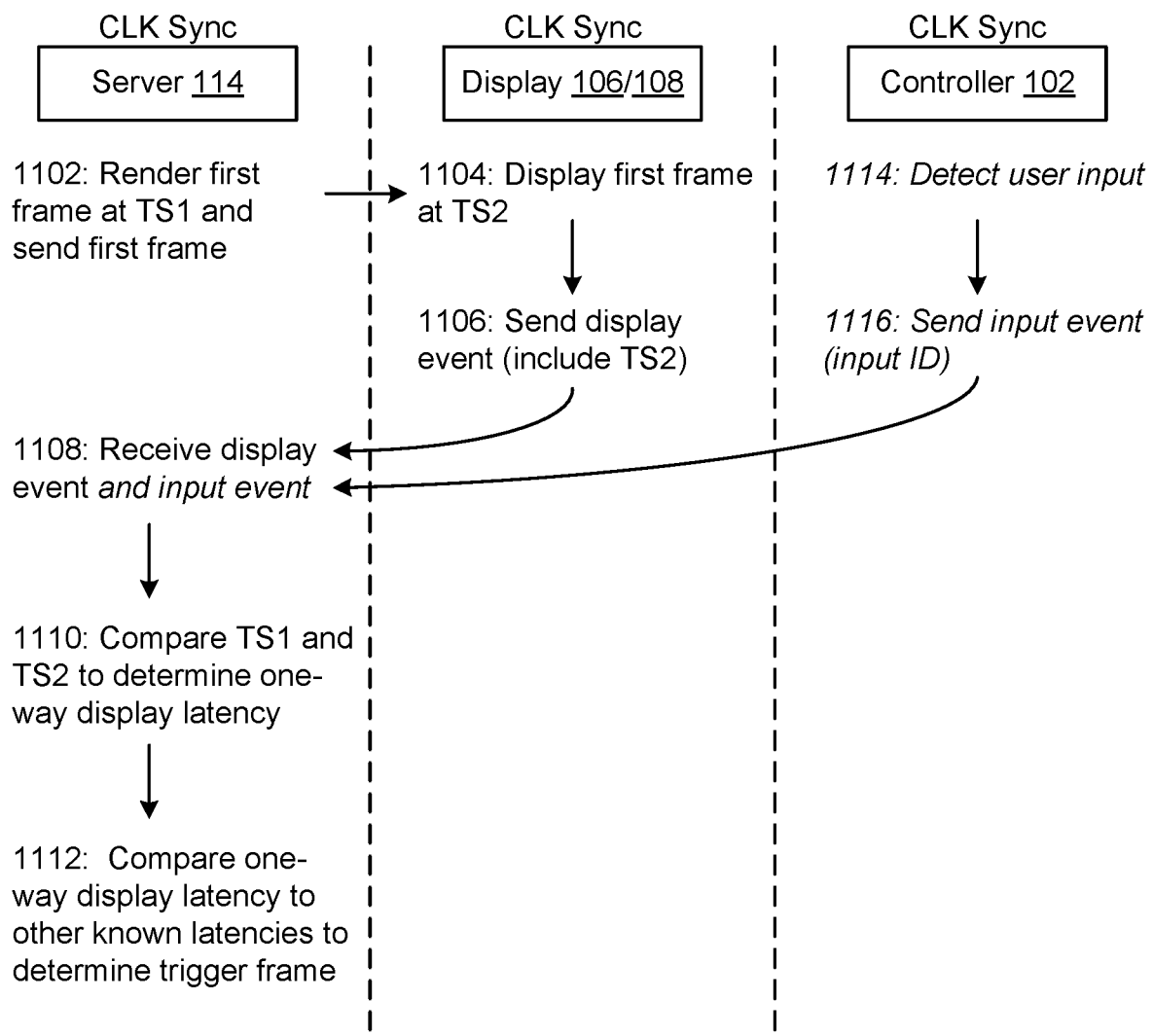

FIG. 11 depicts a trigger frame determination process 1100 in accordance with some implementations. In process 1100, the media device 106 and the controller 102 have synchronized clocks. In some implementations, the server 114 also has a clock that is synchronized to the media device's clock, the controller's clock, or both.

Process 1100 begins with the server 114 rendering (1102) a first frame at timestamp TS1, just as in process 1000. However, in process 1100, the server 114 may not be capable of including the timestamp in the transmission of the frame. As such, the server 114 sends the first frame without the time stamp TS1. The media device 106 receives (1104) the first frame and causes the first frame to be displayed at timestamp TS2. The media device 106 (e.g., reporting module 325) then reports (1106) the timestamp TS2, either alone or with a display event transmission as described above, to the server 114. The server 114 receives (1108) the timestamp TS2 and the server's intent determination module 428 compares (1110) the timestamp TS2 with the timestamp TS1 in order to directly measure the server-to-media device latency. In some implementations, the intent determination module 428 compares (1112) the server-to-media device latency with other known latencies (e.g., from one or more processes 700-1200, such as data on recent media device-to-server latency) to better approximate the trigger frame. In some implementations, since display events can be assumed to arrive at a time proximate to corresponding input events, the process 1100 further includes the controller 102 detecting (1114) a user input and the controller's reporting module 223 sending (1116) an input event including an input ID of the detected user input to the server 114. The server's intent determination module 428 optionally matches the input event with the nearest display event, as described in process 700 above, in order to better approximate the trigger frame.

Figure 12:
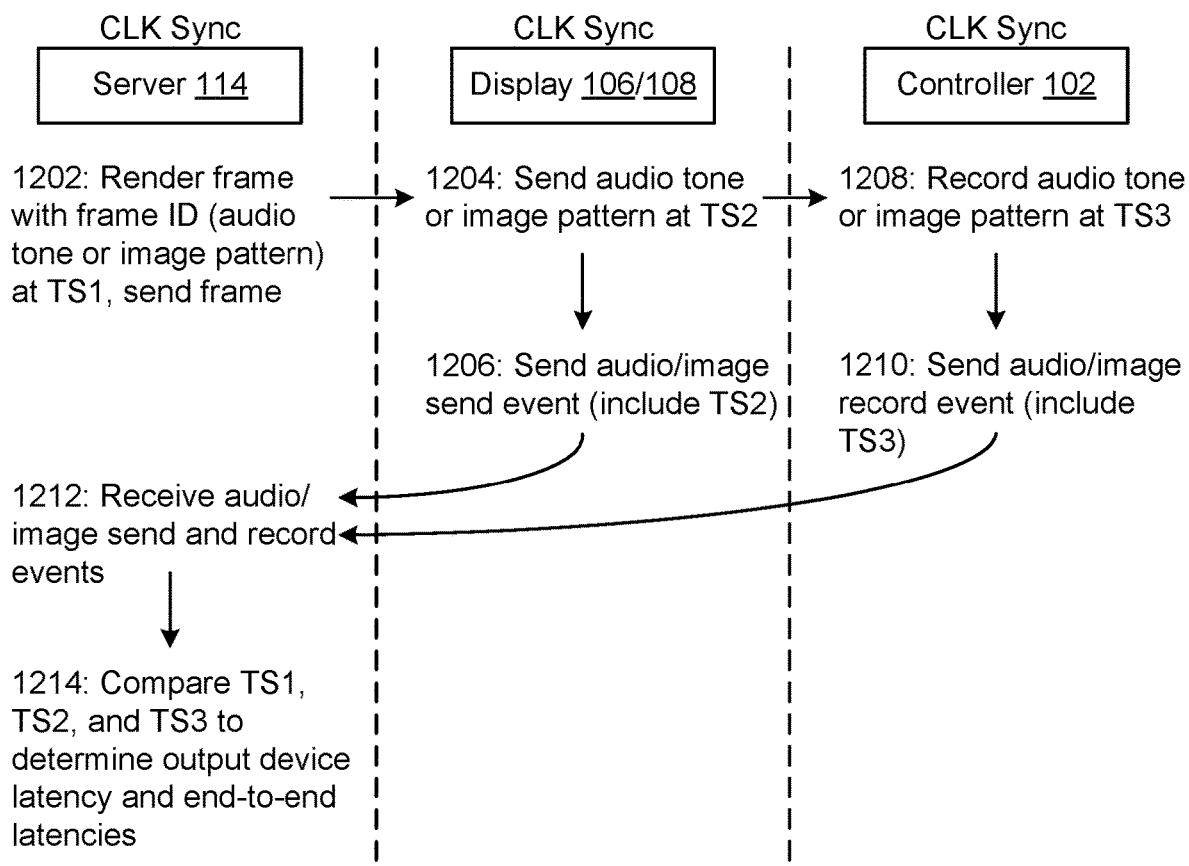

FIG. 12 depicts a trigger frame determination process 1200 in accordance with some implementations. In process 1200, the media device 106 and the controller 102 have synchronized clocks. In some implementations, the server 114 also has a clock that is synchronized to the media device's clock, the controller's clock, or both.

Process 1200 takes advantage of the assumption that if most televisions are good at lip-sync (delaying an audio signal to match the television's image latency, and coordinating with a receiver via, for example, HDMI 1.3b), then an audio signal can be used to measure the media device-to-eyeball delay. In some implementations, the server 114 sends (1202) a distinct audio tone at initialization (e.g., during a login or setup process) to the media device 106 at a first timestamp (e.g., TS1), and the media device 106 causes (1204) the audio tone to be played on the output device 108 at a second timestamp (e.g., TS2). Alternatively, the media device 106 independently plays (1204) a distinct audio tone at initialization (at TS2) without being prompted by the server 114. Upon playing the audio tone, the media device (e.g., reporting module 325) sends (1206) a report including the second timestamp TS2 to the server 114. When the audio tone arrives at the controller 102, the controller 102 detects (1208) the audio tone (e.g., with an embedded microphone) at a third timestamp (e.g., TS3), and sends (1210) a report including the third timestamp TS3 to the server 114.

The server 114 receives (1212) the "audio send" report including TS2 from the media device 105 and the "audio detect" report including TS3 from the controller 102, and the intent determination module 428 compares the timestamps TS2 and TS3 to determine the output device-to-controller latency. Since the user can be assumed to be in close proximity to the controller 102, the output device-to-controller latency can be assumed to be equivalent to the output device-to-ear latency. In some implementations, the intent determination module 428 assumes a predetermined typical seated distance (e.g., 10 ft.) or a user-programmed seated distance from the speakers of the display device 108 in order to account for the propagation time of the sound wave. In some implementations, the intent determination module 428 does not re-measure the display device-to-ear latency due to an assumption that the display lag is fixed throughout the session. In some implementations, the intent determination module 428 also compares TS1 to TS2 and/or TS3 to determine respective end-to-end latencies in order to better approximate the trigger frame.

In some implementations, the audio signal includes an encoded frame ID and/or an encoded timestamp TS1, and the server 114 periodically sends the audio signal via, for instance, a high-frequency audio modem (e.g., whisper), and the controller 102 listens for the audio signals as described above. Alternatively, the media device 106 receives the frame ID and/or timestamp TS1 (e.g., via either of processes 1000 or 1100) and locally synthesizes the audio tone for propagation from the output device 108. In this implementation, the controller directly receives identification information (e.g., the frame ID and/or timestamp TS1) of the trigger frame itself and proceeds to directly report the identified trigger frame to the server 114. In some implementations, a correction is implemented in order to account for audio modem delays.

In some implementations, instead of an audio tone, the server 114 renders (1202) a frame with an image pattern identifying the frame and/or the timestamp TS1, and a camera or photodetector on the controller 102 detects (1208) the image pattern on the display device 108. The rest of the steps are similar to those described above. In some implementations, the image pattern includes variations of intensity (e.g., compared to a measured baseline of intensity).

Figure 13:
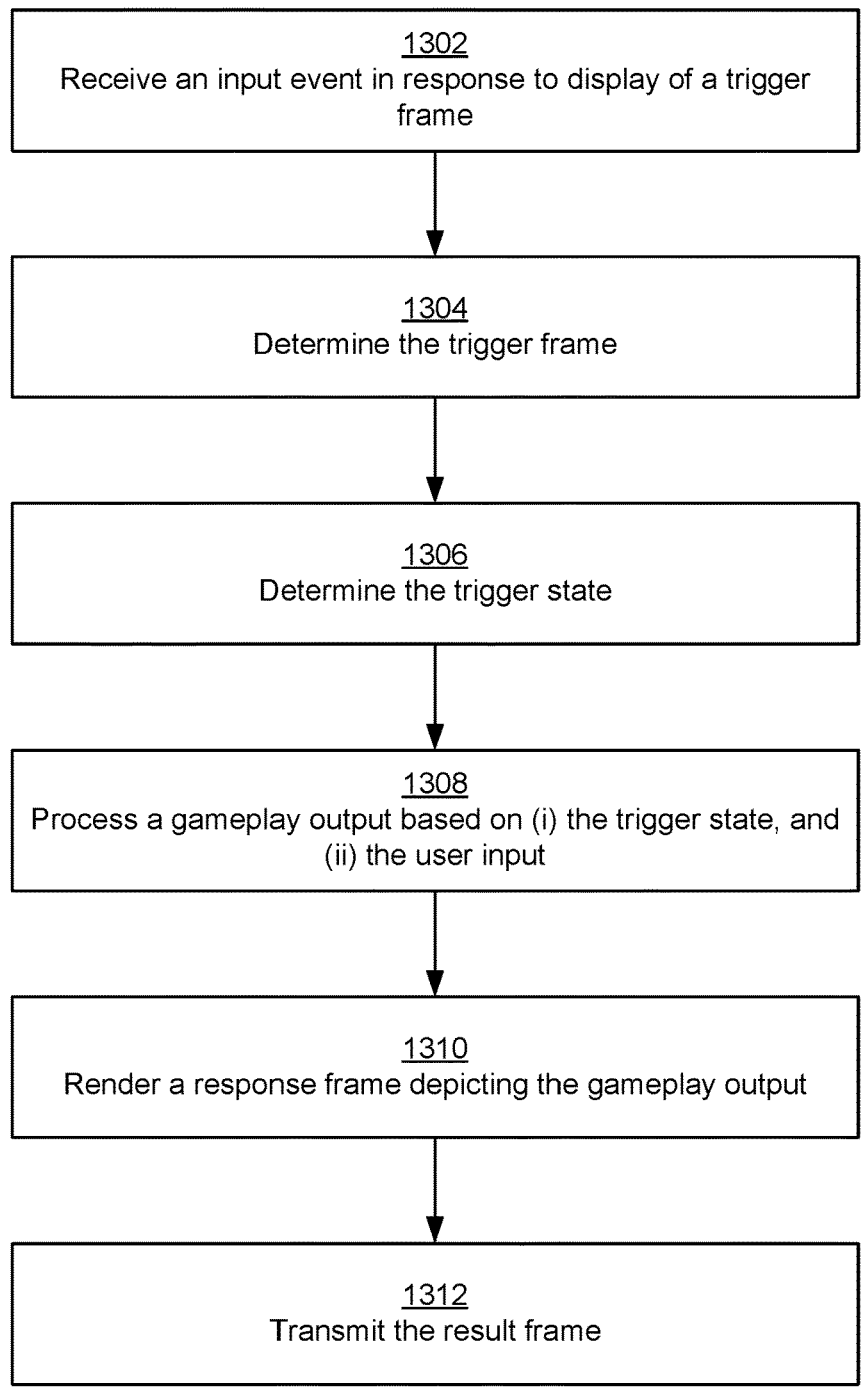
FIG. 13 is a flow diagram of a latency detection and compensation process in accordance with some implementations.

FIG. 13 is a flow diagram of a latency detection and compensation process 1300 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors. In some implementations, the server includes one or more programs and memory storing one or more programs for execution by the one or more processors, and the one or more programs include instructions for performing the process 1300. In some implementations, a non-transitory computer readable storage medium stores one or more respective programs, the one or more respective programs including instructions, which, when executed by the server with one or more processors, causes the server to perform the process 1300.

Process 1300 begins when the server 114 receives an input event from a game controller 102 located at a remote site (e.g., local network 110, FIGS. 1 and 5A) in response to display of a trigger frame at the remote site, as described with reference to FIG. 6, step 606 above. In some implementations, the server receives the input event during a game session operating in a current game state (e.g., state T2, FIG. 5B). The input event includes a user command generated by a user interaction (e.g., an activation or manipulation of a control) with the game controller during the game session.

It is important to note that while the input event is generated by the controller in response to a previously transmitted frame having been displayed to a user at the remote site (the "trigger frame"), the input event may not necessarily identify which of the previously transmitted frames was the triggered frame. Therefore, the process continues with the server determining (1304) the trigger frame, as described with reference to FIG. 6, step 608 above.

More specifically, the server (e.g., intent determination module 428) determines which of a plurality of previously transmitted was the frame that was displayed at the remote site during the user interaction (e.g., 510-1, FIG. 5B), wherein the plurality of previously transmitted frames were sent by the server to a media device 106 during the game session prior to the server receiving the input event. In various implementations, the server determines the trigger frame by executing one or more of the processes described with reference to FIGS. 7-12 above.

The process continues with the server using the determined trigger frame to determine (1306) a game state (the "trigger state") associated with the trigger frame, as described with reference to FIG. 6, step 610 above. In some implementations, depending on how long it takes for the input event to reach the server, the current game state may have already advanced past the trigger state; therefore, the trigger state (e.g., state T1, FIG. 5B) would be a game state prior to the current game state (e.g., state T2, FIG. 5B).

Upon determining the trigger state, the game server processes (1308) a gameplay output in accordance with (i) the trigger state, and (ii) the user command included in or described by the input event, as described with reference to FIG. 6, step 612 above. Specifically, for each input event the server receives, the server matches respective user commands described in the input events with respective trigger states, in order to more accurately process each command in the context of the game state that triggered the user to initiate the command, thereby adhering to, satisfying, and/or fulfilling the user's intent behind each command. In some implementations, in order to process the gameplay output, the game server must reconcile a current game state with the trigger state, especially if the two states are inconsistent, as described above.

The server renders (1310) a response frame depicting the gameplay output, as described with reference to FIG. 6, step 614 above, and transmits (1312) the result frame for display to the user at the remote site, as described with reference to FIG. 6, step 616 above.

Latency Adjustment to Gameplay Tuning

Response time is an important aspect of online gaming that directly affects the user experience. One way to describe response time is the amount of time that passes between the moment at which the user performs an action (e.g., pressing a "jump" button on a gaming controller), and the moment at which a result of that action is displayed to the user (e.g., a digitally rendered player jumps on the screen). Response times may be affected by any of the various sources of latency discussed above. Most sources of latency fall into two categories: processing latency and network latency.

Processing latency is a result of the amount and quality of processing resources dedicated to a particular game or online gaming session, and may be affected by the number, speed, and efficiency of processors or processing cores assigned to process user inputs and render corresponding responses. Processing latency may further be affected by the complexity of user inputs, or by the number and complexity of concurrent inputs being processed by other users in the gaming session.

Network latency is a result of the quality of the communication network(s) (e.g., 110 and/or 112) being used to support the online gaming session, and may be affected by any number of external factors, such as interference, or internal factors, such as varying levels of traffic and available bandwidth. As the distance between a user (e.g., 102)

and a particular game server system (e.g., 114) increases, the amount of physical network elements required to support the gaming session increases, which adds the potential for more network latency to be introduced. For example, a first user (e.g., 102A) located many miles away from a data center housing a particular gaming server may experience more latency during an online session hosted by the gaming server than a second user (e.g., 102B) taking part in the same session, but located across the street from the data center.

While processing latency and network latency are often outside of the realm of influence of game developers, a further type of latency may be purposely added and tuned by developers in order to optimize the user experience. By tuning the developer-added latency, a properly equipped game server can counteract many of the negative effects introduced by the uncontrollable types of latency (e.g., processing and network latency).

Further, latency tuning serves to optimize the user experience by modeling gaming action on real life action. For instance, like a computer mouse that is too responsive to the slightest movements of the hand, certain user inputs in a gaming context are more susceptible to varying amounts of latency than others. For example, in an ice hockey game, response times for inputs associated with movement should be carefully tuned so they are sensitive enough to ensure competitive response times (e.g., to avoid being checked by an opponent), but not so sensitive so as to prevent accurate movements (e.g., lining up a shot without overcompensating). In addition, different types of inputs may warrant different amounts of response time. For example, latency values associated with inputs for shooting and blocking a puck may be tuned for faster response times than those associated with inputs for controlling movements of the players, since more accuracy may be required for moving a player into position and lining up a shot than, for instance, deciding exactly when to take the shot.

Game developers may tune response times for various inputs or types of inputs. In some implementations, response time values for a particular game vary by platform, but for each platform, the response times are stable. For implementations involving online streaming, response times vary based on network conditions and speed of light constraints. Further, the various types of processing and network latencies discussed above make response time tuning more complicated, because the amount of time that passes between input and response is not consistent for each user, or even for a single user over time.

Various implementations of methods and systems are discussed below for adjusting latency in the context of gameplay tuning. The various implementations described herein serve to make variability in performance based on network conditions less apparent to users, resulting in a better user experience. In some implementations, on a game streaming system where the game is hosted and runs off of a computer in a geographically distant server (e.g., 114) and is displayed on a local client (e.g., 102A), the game dynamically shifts the number of frames which are rendered between registering an input event and displaying a corresponding response to the player. For a particular game, developers define for each type of input event (e.g., movement, action, button press, controller orientation change, etc.) an ideal or intended number of frames or the amount of time (e.g., milliseconds) between the input and the response. In some implementations, the gaming system provides an API that, for each frame, reports either the existing input latency conditions or a recent time band that is representative of what users see. In some implementations, one or more users play the game on respective game controllers (also referred to herein as "client devices" or "controllers") under variable input latency conditions. In some implementations, users generate input events by manipulating a joystick, pressing a button, selecting an affordance, moving, or otherwise manipulating an input device such as a gaming controller. Upon generating an input event, the controller associated with the user sends this input event to the server (e.g., 114) running the game.

In some implementations, the server queries the amount of existing latency (e.g., by querying the streamer API), either the most recent value or a timebanded recent estimate of input latency (e.g., network latency). The server either reduces or increases the number of frames (referred to herein as "intermediate frames") that will pass before it generates a frame (referred to herein as a "response frame") that reflects the response corresponding with the input event. The server sends the intermediate frames followed by the response frame through the network to the media device. Upon sending the response frame to the media device, the media device displays the response frame (e.g., on output device 108) to the user. In some implementations, the delta in frames (e.g., the number of intermediate frames) either added or subtracted from time-to-render is calculated based on the frame rate (e.g., in frames per second) being displayed in the current session. Changes in the delta either reduce or increase the amount of time that passes between the input and the response, which brings the response time as close as possible to the ideal or intended response time for the particular type of input. It is important to note that since different input events might require different amounts of adjustment to meet ideal response times, the implementations disclosed herein do not require global delays or buffering of frames. Rather, aspects of the implementations disclosed herein focus on a per-event increase or decrease in the number of frames between inputs and corresponding responses.

As described above, game developers may define for different types of input events an ideal or intended number of frames or the amount of time between the respective inputs and respective responses. In some implementations, these relationships are defined in response time settings 462 stored in the server system 114 (see FIG. 4). FIGS. 14A and 14B are example response time settings 462 for relating user inputs (also referred to herein as "commands") with ideal or intended response times (also referred to herein as "expected latency values" or "target latency values"). In some implementations, an index of commands for a particular game is stored in a table (e.g., 1412) along with corresponding command types (also referred to as "expected latency types" or "latency categories"). For example, "duck" and "shoot" commands belong to a first category or command type (e.g., "type 1"), "walk" and "jump" belong to a second category or command type, and so forth. In some implementations, an index of command types is stored in a table (e.g., 1414) along with corresponding expected latency values. For example, "type 1" commands are associated with an expected (e.g., ideal or intended) latency of 16 ms, "type 2" commands are associated with an expected latency of 40 ms, and so forth. Alternatively, one table (e.g., 1416) is used to directly relate commands with expected latencies. For example, "duck" and "shoot" commands are associated with an expected latency of 20 ms, "move" and "jump" commands are associated with an expected latency of 40 ms, and so forth. In some implementations, tables 1412, 1414, and/or 1416 are stored in memory 146 (e.g., response time settings 462) of the server system 114.

FIG. 14C is an example implementation of a device/network assessment module 444 of the server system 114. The device/network assessment module 444 obtains network latency information 1420 for each user/controller participating a particular game session. In some implementations, the network latency information is round-trip timing (RTT) information, associated with an amount of time it takes for a user input to be transmitted from the controller to the server, combined with the amount of time it takes for a corresponding response frame to be transmitted from the server to the media device. In some implementations, the RTT information additionally includes an amount of time it takes for the server to process the user input and generate the corresponding response frame. Additionally or alternatively, the network latency information is any of the latency values described with respect to FIGS. 5-12 above. For example, in some implementations, if RTT information is not readily available to the network assessment module 444, various one-way transit times are determined as described above, and the network assessment module 444 combines the determined transit times (e.g., one-way controller-to-server latency and one-way server-to-media device latency) to determine the unknown latency information (e.g., controller-to-server-to-media device latency).

Figure 15:
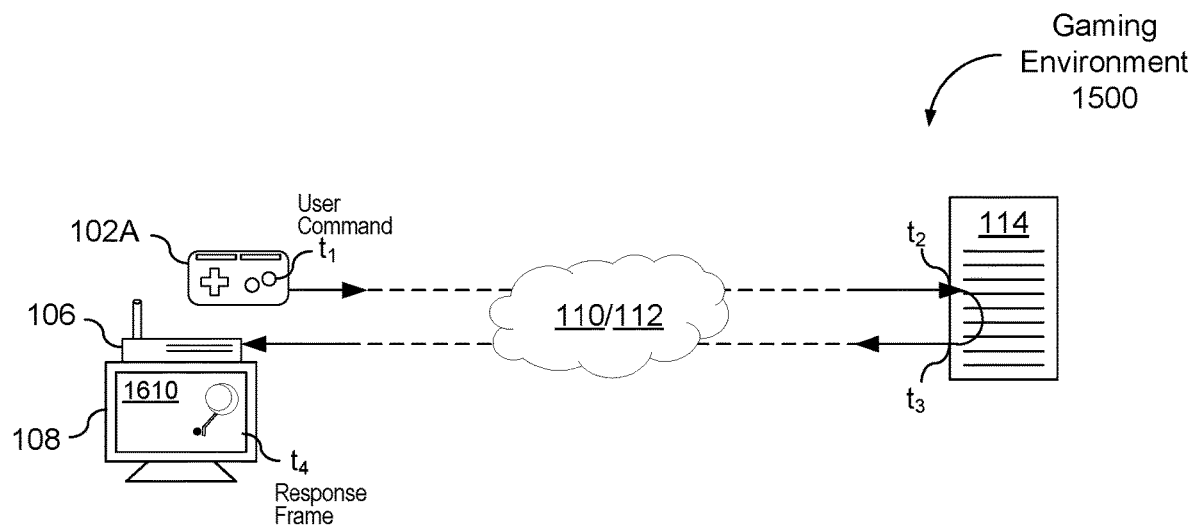
FIG. 15 is an example online interactive gaming environment in accordance with some implementations.

FIG. 15 is an example online interactive gaming environment 1500 in accordance with some implementations. Gaming environment 1500 is similar to gaming environments 100 (FIG. 1) and 500 (FIG. 5A), with corresponding components similarly numbered.

At time $t_1$, the controller 102A transmits a user command associated with an input (e.g., a command from table 1412) to the server 114 through a network (e.g., one or more local and/or non-local communication networks 110/112). In some implementations, the user command is the result of a user manipulating a control on a gaming controller (e.g., pressing a button, moving a joystick, rotating the controller itself, and so forth) or otherwise interacting with a gaming controller. The user's motivation for manipulating the gaming controller to issue a user command (in other words, the "trigger") is based on the particular game being played. For example, if the user is playing an online ice hockey game, the user may decide to take advantage of an opening in the goal and press a "shoot" button in order to shoot the puck into the goal. In some implementations, the trigger (e.g., the opening in the goal) is caused by an image communicated from the server 114 and rendered on an output device (e.g., 108) being used by the user of controller 102A to view gameplay. Therefore, upon viewing the image (e.g., an image frame depicting the opening in the goal), the user is motivated to respond by issuing a relevant command (e.g., shoot the puck).

At time t2, the server 114 receives the command. The amount of time between $t_1$ and $t_2$ is a function of various factors related to network latency as discussed above. Upon receiving the command, the server processes the command by updating the current game state in accordance with the command and generating a response frame reflecting the updated game state. In some implementations, processing the command includes determining which command was received, determining a type of the command, determining or updating a network latency value, determining an amount of latency to introduce based on the network latency value and the type of the received command (e.g., by referencing tables to determine an expected latency associated with the command and comparing the expected latency with the network latency), and generating one or more intermediate frames based on the determined amount of introduced latency (e.g., by multiplying a current frame rate by the difference between expected and network latency).

At time $t_3$, the server 114 transmits the intermediate frames (if any) and the response frame to the media device 106 through network(s) 110/112 for display on the output device 108. The amount of time between $t_2$ and $t_3$ is a function of various factors related to processing latency as discussed above. In some implementations, processing latency is affected by the process for generating the response frame. In some implementations, generating the response frame includes (i) processing the response (e.g., determining what the first of a series of image frames depicting a moving puck would look like based on the current position of each player in the game scene and other factors, such as the trajectory of the shot and the player's strength), (ii) rendering the frame reflecting the response (e.g., rendering the first frame of the series of frames depicting the player shooting the puck), (iii) encoding the frame, and (iv) packetizing the frame for streaming across the network. In some implementations, the response frame is one of a sequence of frames that are transmitted at a predefined frame rate. In some implementations, the predefined frame rate is determined according to a network characteristic of the online gaming session (e.g., available bandwidth) by, for example, using a rate control process, and the predefined frame rate is maintained even upon determining that a network latency value has changed. For example, the predefined frame rate at an instance of time before receiving the user command (e.g., before $t_2$) is the same as the predefined frame rate at the instance of time at which the corresponding response frame is transmitted (e.g., $t_3$). In other words, the predefined frame rate remains constant, regardless of how much latency is added (e.g., by inserting more intermediate frames) or subtracted (e.g., by inserted less, or no, intermediate frames). By not altering the overall frame rate for per-event latency adjustments, other aspects of the gameplay (e.g., other gameplay events and interactions, viewing quality, and so forth) may proceed unhindered, due to being unaffected by the latency adjustment.

At time $t_4$, the media device 106 receives the response frame 1610, and causes the response frame to be displayed on the output device 108. The amount of time between $t_3$ and $t_4$ is a function of various factors related to network latency as discussed above. In some implementations, the network path that the response frame travels through is different than the network path that the user command travels through. In various implementations, network latency values are based on one-way controller-to-server transit times (e.g., the difference between $t_1$ and $t_2$), one-way server-to-media device transit times (e.g., the difference between $t_3$ and $t_4$), and/or processing delays (e.g., between $t_2$ and $t_3$).

Figure 16:
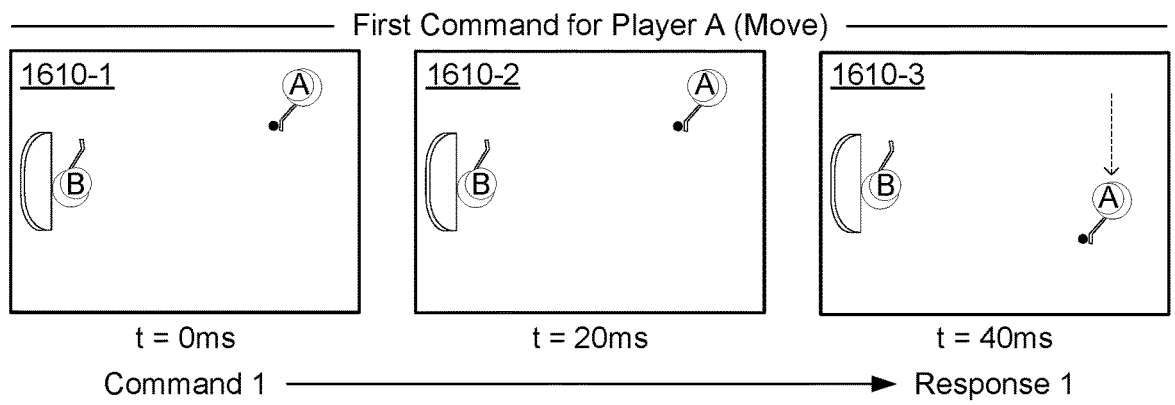
FIG. 16 is an example sequence of frames rendered on a display in accordance with some implementations.
Figure 16:
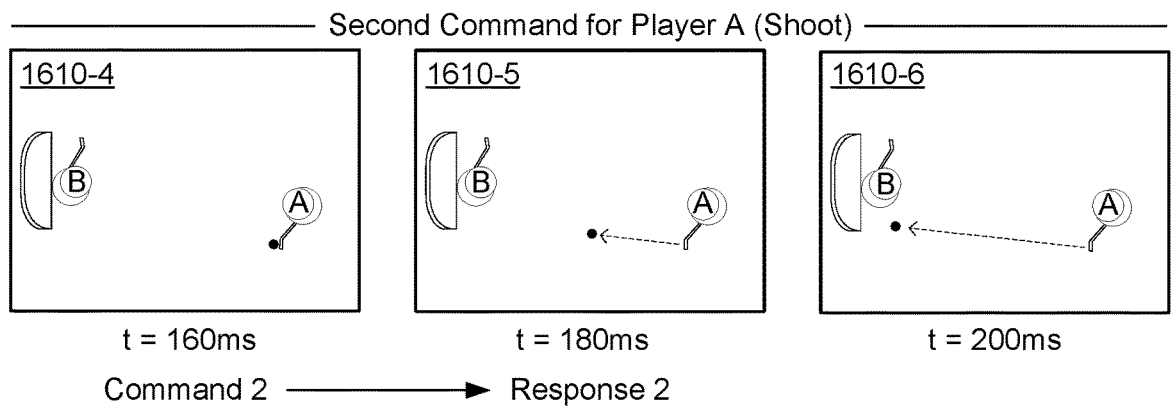

FIG. 16 is an example sequence of frames rendered on a display 108 in accordance with some implementations. In the example, frames 1610-1 through 1610-6 are transmitted and displayed at a predefined frame rate of 50 frames per second (1 frame per 20 ms). Also, for simplicity, network latency is assumed to be negligible. The timestamps shown in FIG. 16 are the times at which each respective frame is generated by the server 114. At t=0 ms, the server generates frame 1610-1, which shows two ice hockey players A and B being controlled by two users and their respective controllers (e.g., 102A and 102B). Player A has the puck, and Player B is in the goal. At this time, the server receives a "move" command from the controller that is controlling Player A. In this particular example, the "move" command also includes a trajectory (to the player's left). Upon receiving the "move" command, the server (e.g., latency adjustment module 430)

determines that the "move" command is a command type associated with an expected latency of 40 ms (e.g., by consulting tables 1412 and 1414, or table 1416). Since the predefined frame rate is 1 frame per 20 ms, and the server must fulfill an expected latency of 40 ms before generating the response frame, the latency adjustment module 430 determines that one intermediate frame should be generated as a placeholder, because 40 ms (expected latency) minus 20 ms (actual latency) equals 20 ms, and 20 ms times 1/20 frames per ms (frame rate) equals 1 frame. As such, the GPU 140 generates (or otherwise causes to be processed, rendered, or encoded) one intermediate frame 1610-2 at t=20 ms, and then generates the response frame 1610-3 at t=40 ms. In some implementations, the encoder 142 encodes one or more intermediate frames as a skip frame or a run of skip frames.

Continuing with the example in FIG. 16, upon seeing Player A move, the user controlling Player A decides to immediately shoot the puck before the user controlling Player B has an opportunity to block the shot. The server receives the "shoot" command concurrent to the generation of frame 1610-4, at t=160 ms. The latency adjustment module 430 determines that the "shoot" command is associated with only a 20 ms expected latency (e.g., by consulting tables 1412 and 1414, or table 1416). Since the predefined frame rate is 1 frame per 20 ms, and the server much fulfill an expected latency of 20 ms before generating the response frame, the latency adjustment module 430 determines that no intermediate frames should be generated, because 20 ms (expected latency) minus 20 ms (actual latency) equals 0 ms, and 0 ms times 1/20 frames per ms (frame rate) equals 0 frames. As such, the GPU 140 generates (or otherwise causes to be processed, rendered, or encoded) the response frame 1610-5 20 ms later, at t=180 ms, without rendering any intermediate frames. The response frame 1610-5 is the first of a series of response frames depicting a result of the "shoot" command, with frame 1610-6 being the second of the series of response frames at t=200 ms.

Figure 17:
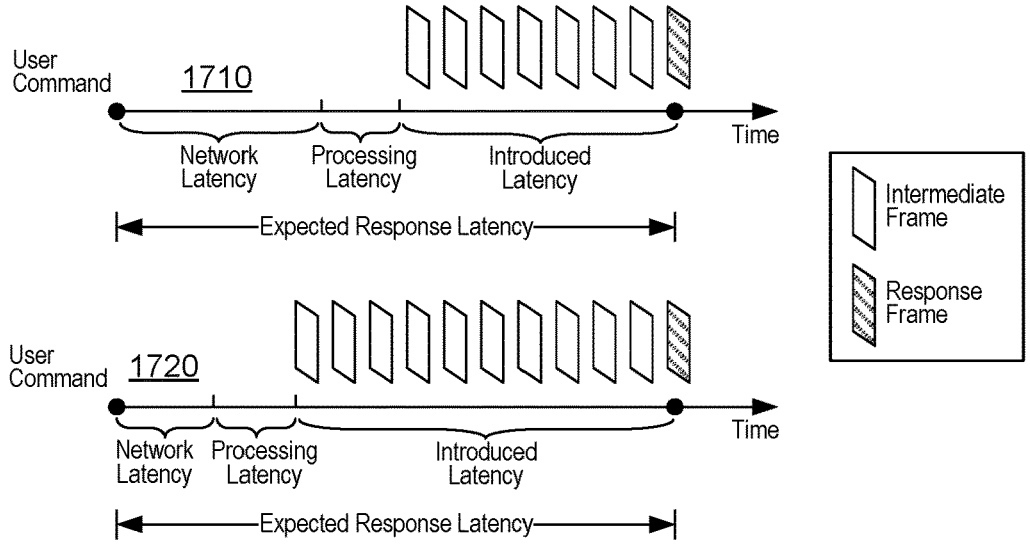
FIGS. 17 and 18 are diagrams depicting introduced latencies in accordance with some implementations.
Figure 18:
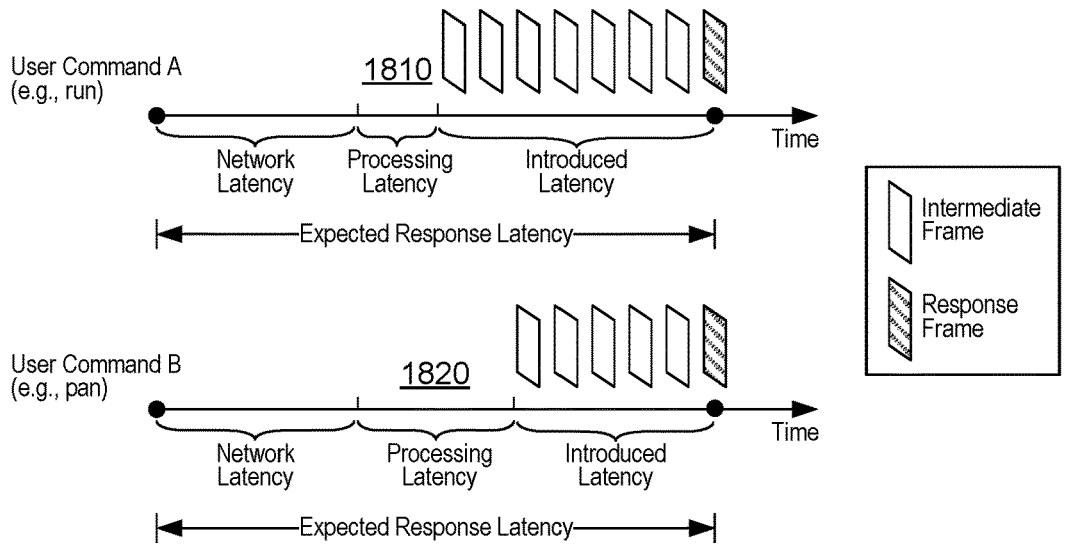

FIGS. 17 and 18 are diagrams depicting example techniques for determining how much latency to introduce. In the figures, intermediate frames are depicted as solid, and response frames are depicted as striped.

In FIG. 17, the server receives the same command over two different networks, or over the same network with two different latency values. Network latency 1720 is lower than network latency 1710. As a result, corresponding response frames would be transmitted back to the media device at different times if not for the introduced latency. By rendering additional intermediate frames in the scenario with the lower network latency 1720, the server ensures that the expected overall latency (e.g., response time) is consistent, regardless of the amount of network latency. Stated from a different perspective, response times are kept consistent by (i) generating more intermediate frames (scenario 1720) with respect to another scenario, (ii) generating fewer intermediate frames (scenario 1710) with respect to another scenario, or (iii) a combination of (i) and (ii).

In FIG. 18, the server receives two different commands requiring different amounts of processing latency. For example, a "run" command requires a first amount 1810 of processing latency, while a more resource intensive "pan" command requires a second amount 1820 of processing latency, greater than the first. If each command is associated with the same expected latency and each command was received at the same time (assuming similar network latency), then the server accounts for the differences in processing latency by (i) generating more intermediate frames (scenario 1810) with respect to the other scenario, (ii) generating fewer intermediate frames (scenario 1820) with respect to the other scenario, or (iii) a combination of (i) and (ii).

In some implementations, the latency adjustment module 430 determines the amount of introduced latency by (i) determining or estimating the amount of actual latency between the user command and the corresponding response frame (e.g., by measuring network latency as described above and optionally accounting for processing latency), (ii) determining the expected latency (e.g., by consulting response time settings 462 as described above), and (iii) determining a difference between the actual and expected latencies. If the actual latency is shorter than the expected (intended) latency, then the server introduces additional latency. Conversely, if the actual latency is longer than the expected (intended) latency, then the server removes additional latency (or does not introduce any at all). In some implementations, in order to account for each of the aforementioned scenarios, the server always adds a default amount of introduced latency so that it is possible to both add and subtract to the introduced latency. Having determined the amount of introduced latency, the latency adjustment module determines the number of intermediate frames to render by multiplying the frame rate by the amount of introduced latency. In some implementations, the latency adjustment module 430 uses the following equation to determine the number of intermediate frames to cause to be rendered: number of intermediate frames=frame rate*(expected latency−actual latency). For scenarios in which the actual latency is higher than the expected latency, the number of intermediate frames is negative. As such, for implementations in which there is always a baseline of intermediate frames, the latency adjustment module 430 would subtract the appropriate number of intermediate frames from the baseline. However, for implementations in which there is no baseline of intermediate frames, the latency adjustment module 430 would simply cause no intermediate frames to be rendered in such a scenario.

In some implementations, the amount of introduced latency is determined based on estimated response frame arrival times. For example, if the response frame is projected to arrive at the media device earlier than an expected or intended arrival time (e.g., based on network and/or processing latency values determined as described above), then the server renders additional intermediate frames as discussed above. Conversely, if the response frame is projected to arrive at the media device later than an expected or intended arrival time, then the server renders fewer intermediate frames as discussed above. In some implementations, the latency adjustment module 430 uses the following equation to determine the number of intermediate frames to cause to be rendered: number of intermediate frames=frame rate*(target arrival time−projected arrival time). For scenarios in which the projected arrival time is later than the target arrival time, the number of intermediate frames is negative. As such, for implementations in which there is always a baseline of intermediate frames, the latency adjustment module 430 would subtract the appropriate number of intermediate frames from the baseline. However, for implementations in which there is no baseline of intermediate frames, the latency adjustment module 430 would simply cause no intermediate frames to be rendered in such a scenario.

Figure 19A:
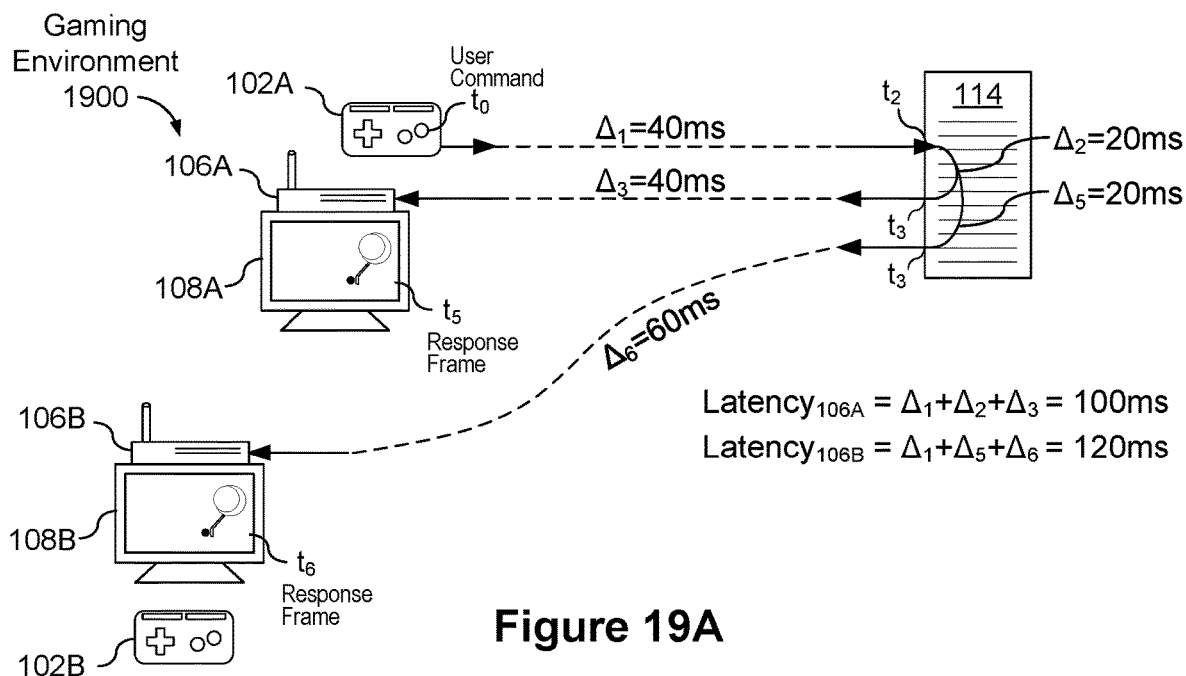
FIG. 19A is an example online interactive gaming environment in accordance with some implementations.

FIG. 19A is an example online interactive gaming environment 1900 in accordance with some implementations.

Gaming environment 1900 is an example implementation corresponding to the gaming environment 1500, with the addition of a second user's controller 102B and media/output device 106B/108B located at a site that is remote from the first user and the server. The first and second user are both playing the same game. In this example, the distance between the second user and the server is farther than the distance between the first user and the server. As such, the second user experiences more network latency. Also, in this example, display lag between respective media devices 106 and displays 108 is assumed to be zero for the sake of simplicity.

At time t₀, the first controller 102A transmits a user command (e.g., "shoot") to the server 114 through network(s) 110/112 (see FIG. 15), and the command takes 40 ms to arrive at the server at time $t_2$. The server takes 20 ms to process the command and transmits a response frame to the first and second media devices 106A and 106B at time $t_3$. The response frame takes 40 ms to arrive at the first media device 106A at time $t_5$, and 60 ms to arrive at the second media device 106B at time $t_6$. As such, the second user (controlling Player B at controller 102B) does not see the response frame on display 108B until 20 ms after the first user (controlling Player A at controller 102A) sees the response frame on display 108A. As a result of the 20 ms delay, the second user's response time may be unfairly delayed. Further, Player A may score, and a subsequent game state may be updated accordingly, before the second user even sees these events unfold on the display 108B.

Figure 19B:
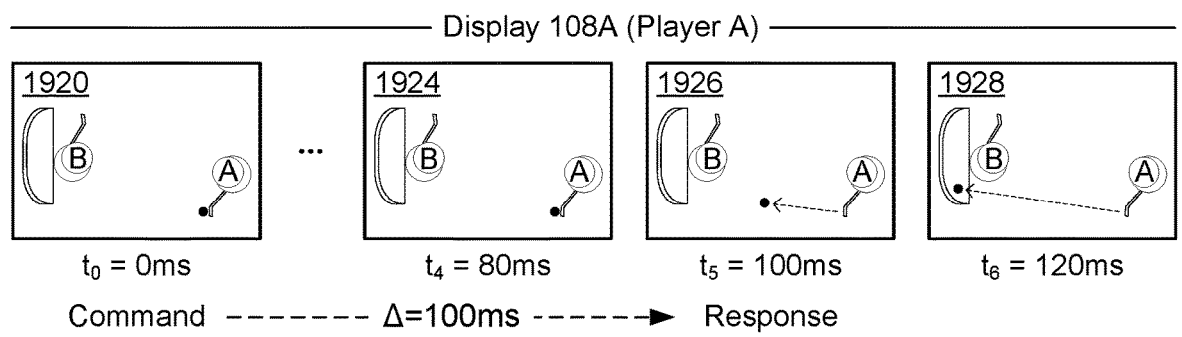
FIG. 19B depicts example screenshots of the online interactive gaming environment in accordance with some implementations.
Figure 19B:
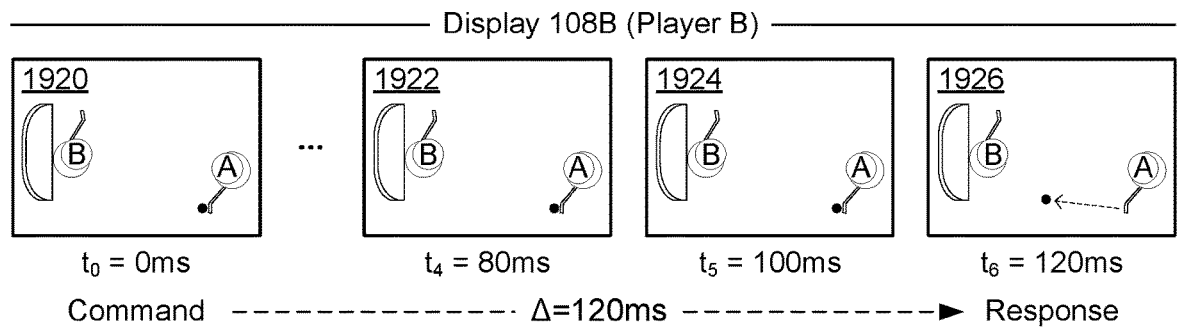

FIG. 19B depicts screenshots 1920-1928 rendered by displays 108A and 108B, with the timestamps corresponding to those in FIG. 19A. Since Player A's response time is 20 ms faster than Player B's response time, Player A sees the response frame 1926 at $t_5$=100 ms, while Player B sees the response frame 1926 20 ms later. As a result, at $t_6$=120 ms, Player A has scored, but from Player B's perspective, there is still time to block Player A's shot, even though the game state has already been updated (e.g., by adding a point to the score for Player A's team) at the server. In some scenarios, Player B may appear to successfully block Player A's shot in a future frame, creating an expected game state that conflicts with the actual game state. These kinds of conflicting game states can be avoided by introducing latency in accordance with various implementations described above.

Figure 20B:
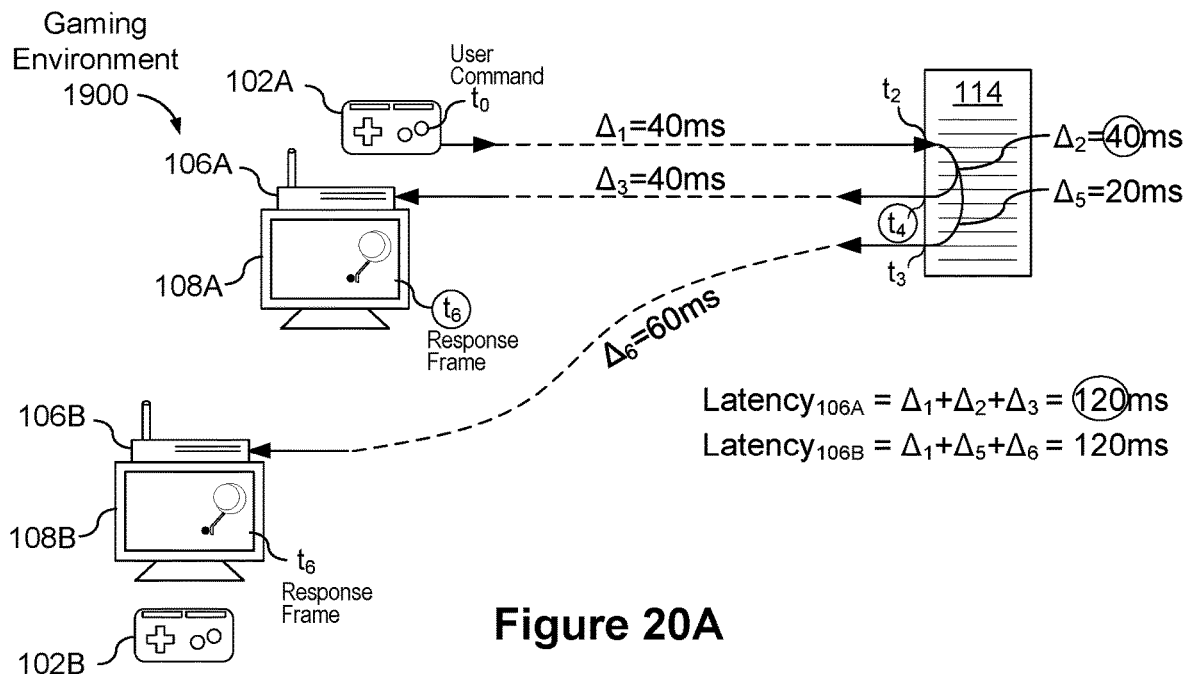
FIG. 20B depicts example screenshots of the online interactive gaming environment in accordance with some implementations.
Figure 20B:
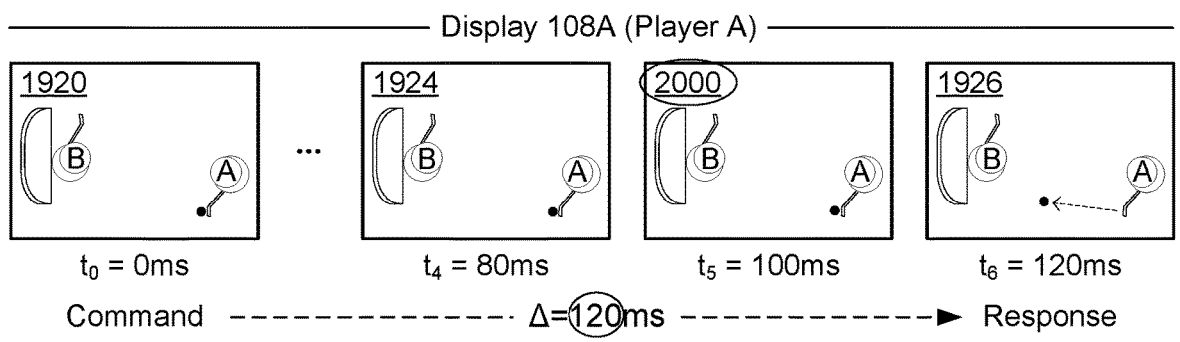
Figure 20B:
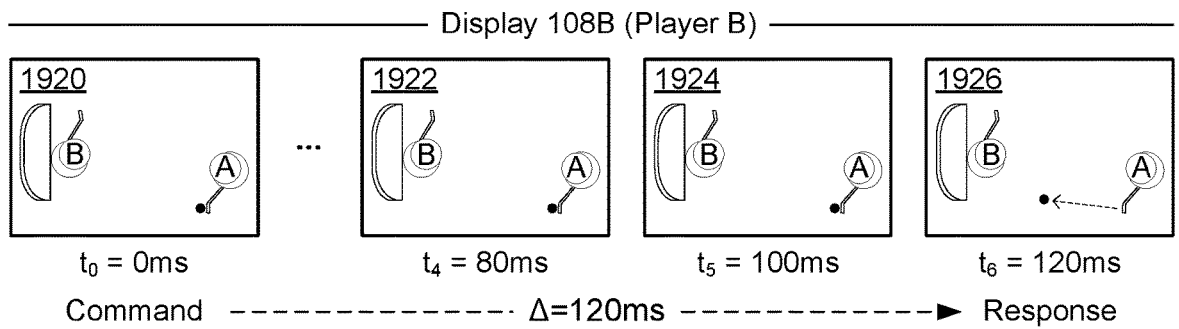

FIGS. 20A and 20B depict the example gaming environment 1900 and corresponding user views, but with the addition of an extra intermediate frame, which has been added in accordance with various implementations described above. FIGS. 20A/20B correspond with FIGS. 19A/19B, with the differences being circled. Specifically, by adding an additional intermediate frame 2000, the server introduces 20 ms of additional latency to Player A's response time, thereby causing the response frame 1926 to arrive at media devices 106A and 106B at the same time.

Figure 21:
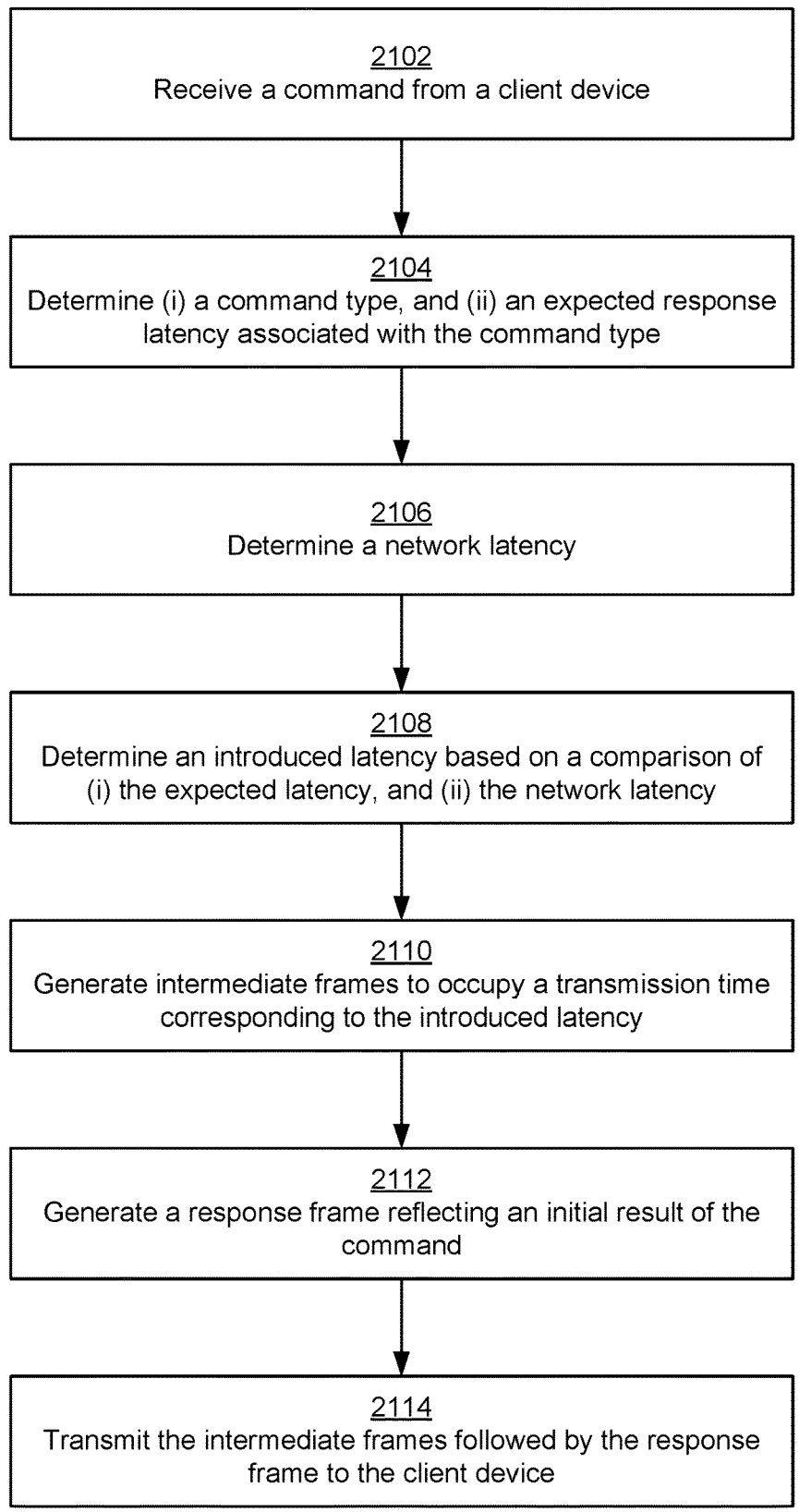
FIG. 21 is a flow diagram of a latency adjustment process in accordance with some implementations.

FIG. 21 is a flow diagram of a latency adjustment process 2100 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors. In some implementations, the server includes one or more programs and memory storing one or more programs for execution by the one or more processors, and the one or more programs include instructions for performing the process 2100. In some implementations, a non-transitory computer readable storage medium stores one or more respective programs, the one or more respective programs including instructions, which, when executed by the server with one or more processors, causes the server to perform the process 2100.

Process 2100 includes receiving (2102) a first command (e.g., "Shoot") from a first client device (e.g., game controller 102A) associated with an online gaming session; determining (2104) a type of the first command (e.g., "Type 1" in table 1412) and a first expected response latency associated with the type of the first command (e.g., "20 ms" in table 1414 or table 1416); determining (2106) a network latency (e.g., by measuring and/or estimating a round-trip time 1420-1 between the first game controller and the server, or by any of the other methods described above with reference to FIGS. 5-12); determining (2108) a first introduced latency (e.g., purposely added and/or tuned latency to compensate for other types of latency such as the determined network latency) based on a comparison of the network latency with the first expected latency; generating (2110) a first number of intermediate frames (e.g., frame 1610-2 in FIG. 16, or frame 2000 in FIG. 20B) which, when transmitted at a predefined frame rate, occupy a transmission time corresponding to the first introduced latency; generating (2112) (or otherwise causing to be processed, rendered, or encoded) a first response frame (e.g., frame 1610-3 in FIG. 16, or frame 1926 in FIG. 20B) reflecting an initial result of the first command; and transmitting (2114), at the predefined frame rate, the first number of intermediate frames followed by the first response frame such that the first response frame is received at a media device (e.g., 106) associated with the first game controller at a time corresponding to the first expected response latency.

By using intermediate frames to regulate response times between commands and corresponding response frames, the server can maintain global aspects of the gaming session (e.g., a predefined frame rate) while tuning specific aspects (e.g., a response time for a particular type of user input). From an online gaming perspective, stable frame rates are optimal for a smooth and high quality user experience. Further, by implementing game tuning on the local level (e.g., for only specific types of inputs), other aspects of the game continue unimpeded, such as noncritical game events which do not influence subsequent game states, but the continuous rendering of which adds to the fluidity and quality of the gameplay experience.

Resolution Based Scaling of Interactive Graphics

Real-time rendering of visual simulations have performance requirements that scale with the rendered resolution (e.g., number of pixels). If the visual simulation of, for instance, a video frame depicting a gameplay scene, is carried to users over a network, the capability of the network and/or display devices of the users may constrain the maximum resolution that can be supported for a given user. With a plurality of users, each with different network and display capabilities, an efficient infrastructure enables performance appropriate to the specific resolution of each user's connection. The following description includes various implementations of efficient, resolution-appropriate virtualization methods and systems of underlying hardware.

Interactive graphics applications such as online video games make use of underlying hardware (e.g., server system 114) to achieve a target image resolution and framerate. For example, if the resulting image frames are streamed to an endpoint (e.g., media device 106) over a network (e.g., network 112), the capabilities of the endpoint and network connection will dictate the maximum resolution that can be sustained.

Various implementations of methods and systems are discussed below for establishing an interactive gaming session and allocating resources to the session. Referring to FIG. 15, in some implementations, a server system 114 receives a request from a client device 102A to establish a session (e.g., a gaming session). The server system (e.g., device/network assessment module 444) determines characteristics of the controller 102A, the media device 106 and/or the display device 108, as well as characteristics of the network(s) 110/112. Based on the device and network characteristics, the server system (e.g., resource assignment module 432) determines one or more target quality parameters for the session, such as resolution, frame rate, and latency. According to the target quality parameters, the server (e.g., resource assignment module 432) assigns a particular virtual machine or container to the session, and establishes the session in accordance with the assignment. Resources are provided to the session in accordance with a resource profile (e.g., stored in resource repository 464) associated with the particular virtual machine or container assigned to the session. By assigning dedicated virtualizations of underlying hardware resources at the server system, the gaming application's consumption of hardware resources (e.g., in a data center) is fitted to the capabilities of both the network and the endpoint, which optimizes efficiency while still achieving desired performance metrics for each session.

Figure 22:
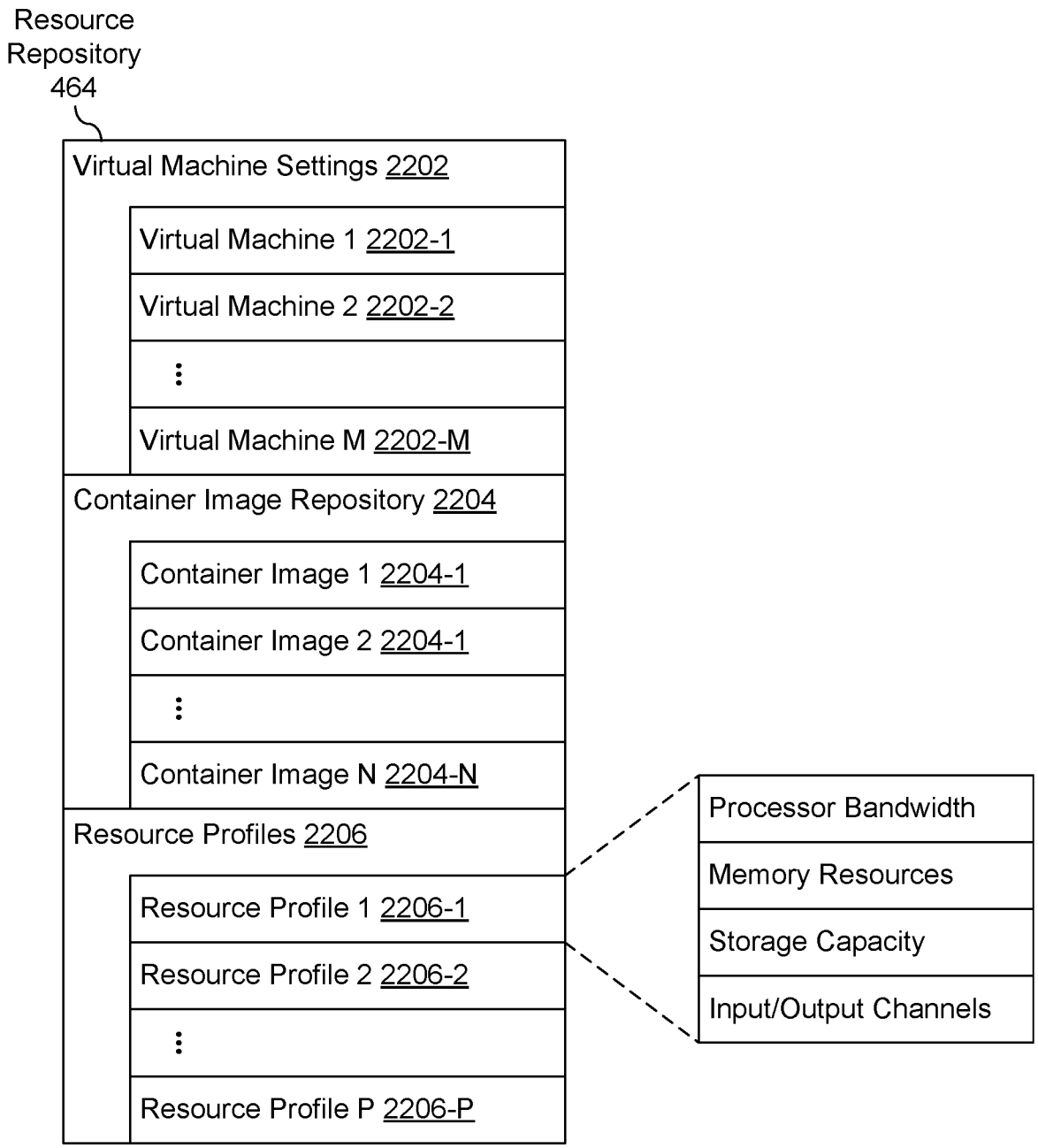
FIG. 22 is an example implementation of a resource repository in accordance with some implementations.

FIG. 22 is an example implementation of a resource repository 464. The repository includes virtual machine settings 2202 (including settings for M virtual machines), container image repository 2204 (including images for N containers), and resource profiles 2206 (including settings for P profiles). A virtual machine is an operating system or application environment installed on software which imitates dedicated hardware, and a container is a virtualized operating system. While there are differences between the two, they both implement the concept of virtualization. As such, unless explicitly stated otherwise, virtual machines and containers are used interchangeably throughout this disclosure.

The virtual machines or containers are provisioned based on target quality parameters. For example, the virtual machines or containers are provided based on target resolutions (e.g., "small", "medium", "large" or 720p, 1080p, 1440p). In this example, virtual machine 2202-1 may be referred to as "small" and used for providing an output stream having a resolution of 720p, virtual machine 2202-2 may be referred to as "medium" and used for providing an output stream having a resolution of 1080p, virtual machine 2202-3 may be referred to as "large" and used for providing an output stream having a resolution of 1440p, and so forth. In some implementations, each virtual machine and/or container is associated with a resource profile 2206. Each resource profile includes settings for specific resources and resource levels which may be allocated to the virtual machine and/or container. These resources are for processing inputs (e.g., input events as described above) and generating outputs (e.g., response frames as described above) within the session. Example resources include one or more of: graphical processor bandwidth at the server system, general processor bandwidth at the server system, graphical memory at the server system, general memory at the server system, storage capacity at the server system, and input/output channels at the server system. When the resource allocation module 432 assigns or otherwise associates a particular virtual machine or container to or with a session, that session is provided with the resources available in accordance with the resource profile 2206 associated with the particular virtual machine or container.

Figure 23:
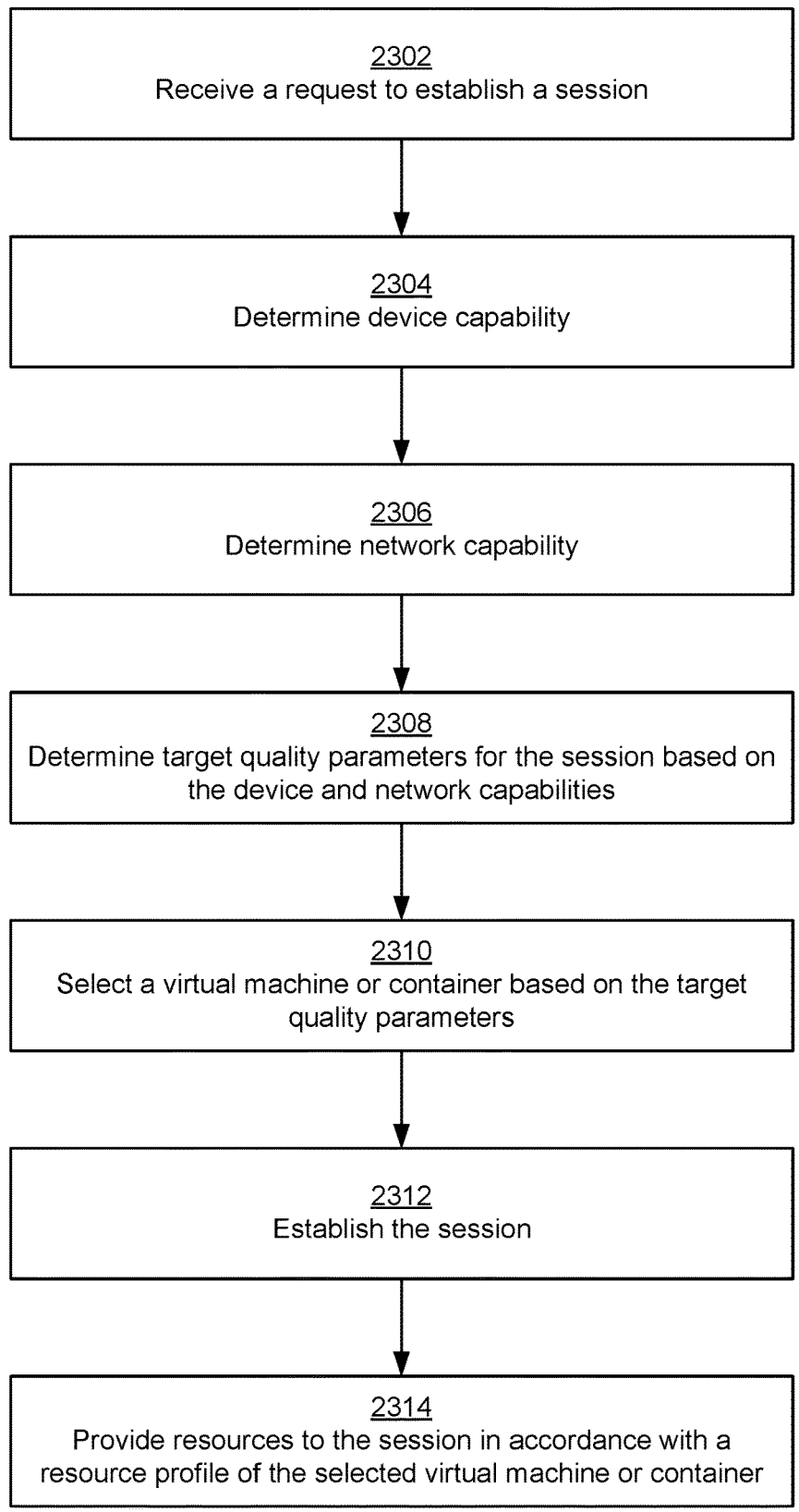
FIG. 23 is a flow diagram of a resource allocation process in accordance with some implementations.

FIG. 23 is a flow diagram of a resource allocation process 2300 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors. In some implementations, the server includes one or more programs and memory storing one or more programs for execution by the one or more processors, and the one or more programs include instructions for performing the process 2300. In some implementations, a non-transitory computer readable storage medium stores one or more respective programs, the one or more respective programs including instructions, which, when executed by the server with one or more processors, causes the server to perform the process 2300.

The process begins when the server 114 receives (2302) a request to from a client device (e.g., controller 102) to establish a session. In some implementations, the client device 102 requests to establish a real-time interactive session, and the request is received through a network connection (e.g., network(s) 110/112) with the client device 102.

Upon receiving the request, the server (e.g., device/network assessment module 444) determines (2304) a device capability of a device associated with the client device 102 (e.g., media device 106, output device 108, and/or the client device 102 itself). In some implementations, the device capability is a maximum resolution of display output at an output device (e.g., 108) associated with the client device, a maximum framerate for display output at an output device (e.g., 108) associated with the client device, or both. In some implementations, the output device itself communicates device capability information, either directly to the server or through the client device. In some implementations, the device capability information is stored locally on the client device, and the client device sends the device capability information with the initial request to establish a session. In some implementations, the client device sends the device capability information in response to a request by the device/network assessment module 444.

In addition, the server (e.g., device/network assessment module 444) determines (2306) a connection capability of the network connection (e.g., network(s) 110/112). In some implementations, the connection capability is a bandwidth of the network connection, and/or one or more latency values associated with the network connection. Example latency values and methods of obtaining them are discussed above with reference to FIGS. 5-12).

Upon assessing the device and network capabilities, the server (e.g., resource assignment module 432) determines (2308) one or more target quality parameters for the real-time interactive session based on the device capability and the network connection capability. In some implementations, the one or more target quality parameters include one or more of a target resolution, a target frame rate, and/or a target latency for content (e.g., response frames) transmitted to the output device.

Having determined target quality parameters, the server (e.g., resource assignment module 432) selects (2310) a virtual machine or container based on the one or more target quality parameters. In some implementations, the resource assignment module 432 selects a virtual machine or container by (i) comparing the one or more target quality parameters to corresponding parameters in the respective resource profiles for the plurality of virtual machines; (ii) determining which resource profile includes parameters which most closely match the one or more target quality parameters; and (iii) selecting, as the first virtual machine, a virtual machine having a resource profile with parameters that most closely match the one or more target quality parameters. For example, if a target frame rate is 120 fps, the resource assignment module 432 compares the target frame rate with parameters in resource profiles 2206 that would support a frame rate of 120 fps, determines that a particular resource profile (e.g., 2206-2) would be able to best support the target frame rate, and selects the virtual machine that is associated with profile 2206-2 (e.g., virtual machine 2).

In some implementations, the resource assignment module 432 selects a virtual machine or container by (i) comparing the one or more target quality parameters to corresponding parameters in the respective resource profiles for the plurality of virtual machines; (ii) selecting, as virtual machine candidates, one or more virtual machines having resource profiles with parameters that are greater than or equal to the one or more target quality parameters; and (iii) selecting, as the first virtual machine, a virtual machine candidate having the least resource-intensive resource profile. For example, if a target frame rate is 120 fps, the resource assignment module 432 compares the target frame rate with parameters in resource profiles 2206 that selects, as candidates, those that have resources that are equal to or greater than those needed to support the target frame rate (e.g., resources that would support target frame rates of 100 fps, 120 fps, 240 fps, and so forth), and selects the candidate with the least resource-intensive resource profile (e.g., a profile that can support 100 fps, but not necessarily 120 fps). By selecting the least resource-intensive resource profile, the server assigns only those resources that are needed, reserving additional resources for other sessions and thereby achieving targeted performance levels while optimizing efficiency at the server.

In some implementations, selecting a virtual machine comprises associating the selected virtual machine with the real-time interactive session, and maintaining the association regardless of any changes in device or network connection capabilities. In some implementations, the association is maintained for a predetermined time period. In some implementations, the resource assignment module 432 reevaluates the association upon detecting a change in device or network connection capabilities. In some implementations, the resource assignment module 432 reevaluates the association based on detected changes in device or network connection capabilities only if the change is greater than a predetermined threshold. By limiting the reassignment of a virtual machine or container, the server achieves the targeted performance levels while optimizing stability, and therefore efficiency, at the server.

With a virtual machine or container selected, the server 114 establishes (2312) the real-time interactive session in accordance with the selected virtual machine or container and provides (2314) to the real-time interactive session, in accordance with the resource profile of the first virtual machine, resources for processing inputs (e.g., input events as described above) and generating outputs (e.g., response frames as described above) within the session within the real-time interactive session. Example resources for processing inputs and generating outputs include one or more of: graphical processor bandwidth at the server system, general processor bandwidth at the server system, graphical memory at the server system, general memory at the server system, storage capacity at the server system, and/or input/output channels at the server system. In some implementations, the resources are provided by assigning respective portions of one or more of the resources to the real-time interactive session. In some implementations, the resources are provided by mapping the resource profile of the selected virtual machine or container to respective portions of one or more of the resources (e.g., to a particular memory partition or to a particular input/output channel).

In some implementations, one or more subsets of virtual machines or containers are made available as different service tiers based on the level of resources offered. For example, users who pay for a higher service tier may receive priority access to the virtual machines or containers having resource profiles offering relatively higher resources (e.g., "large" resolutions, high processor bandwidth allotments, and so forth). In some implementations, users of the online gaming environment 100 gain access to higher service tiers by paying a premium, achieving in-game rewards or a high in-game performance statistic, or taking advantage of a promotional offered by a particular gaming company. In some implementations, users build custom packages based on particular preferences (e.g., high resolution and average frame rate, average resolution and high frame rate, and so forth). In these implementations, different versions of custom packages are associated with one or more virtual machines or containers.

It is important to note that due to the gaming nature of the real-time interactive sessions described above, controller-to-display latency is an issue that must be monitored, in order to maintain a high quality and consistent gameplay experience. As such, provision of virtual machines or containers as described above ensures that resources necessary to ensure minimum latency standards can be met, by ensuring dedicated resources to individual users or groups of users. Further, as use of the gaming sessions scale to games involving a plurality of players (e.g., massively multiplayer online role playing games), the virtual provisioning of resources through virtual machines and containers further ensures high quality gameplay experiences by facilitating a level playing field for each player (e.g., by ensuring minimum latency standards are met for each player). For example, if two players are playing the same online game, a first session between the game server and a first client device may be assigned a virtual machine or container that is different from a virtual machine or container assigned to a second session between the game server and a second client device, even though both the first and second client devices are playing the same game in parallel. By assigning virtual machines or containers on a per-session basis, hardware resources are optimized while ensuring desired gameplay experiences for each user.

In some implementations, applications are designed with a software development kit that accounts for the underlying container sizes and can "right-size" the application's use of hardware and/or virtualized hardware to achieve a desired performance for a given size. In some implementations, Instances of various sizes of containers are made available in locations proximate to endpoints. When an endpoint connects to a resource allocation module 432 to establish a new session, the device/network assessment module 444 assesses the endpoint capability and network capability, and the resource allocation module 432 makes a size determination. Once determined, the session is attached to the virtual machine or container of the corresponding size and content delivery at the corresponding resolution, frame rate, or latency level is initiated. By "right sizing" the application's consumption of hardware resources to the capability of both network and endpoint capabilities, the server achieves desired performance levels while optimizing efficiency.

User-Specific Network Condition Tuning

In an online, interactive, real-time gaming environment, latency is one of the key factors affecting gameplay quality. As discussed above, there are numerous network and processing elements which may introduce varying levels of latency into the gaming environment. Minimizing the negative effects of latency often comes at a cost of processing power and complexity, especially when processing many gameplay inputs from many game session and streaming gameplay output content to many users in parallel. Therefore, it is important for the gaming environment (e.g., server system 114 and/or game servers 122) to allocate processing resources wisely.

One way to allocate processing resources is to account for the needs and experiences of the users of the gaming environment on a per-user basis, and allocate resources accordingly. For example, different users have different levels of tolerance to adverse playability events. Some users may be more sensitive to particular levels of latency than others. For example, some players may object to 20 ms of controller-to-display latency, while others may only observe latency-related problems at 120 ms. Given constrained resources, the ability to determine the tolerance to adverse playability events and conditions makes it possible to make better allocation decisions. Benefits of allocating resources on a user-specific basis include better experiences for all users due to more highly optimized processing efficiency, which leads to the ability to support more users, and lowers the cost of serving content to each user.

Various implementations of methods and systems are discussed below for tuning network conditions (allocating network resources) on a user-specific basis. In some implementations, the game server (e.g., resource tuning module 458, FIG. 4) considers a set of available gameplay statistics for each user (e.g., profiles 2402, FIG. 24B), and determines a window for playability for each user based on each user's gameplay statistics. Example gameplay statistics include in-game performance (e.g., how well the user plays the game), controller interaction (e.g., over compensation for movement, response times, and/or manipulation speed), the type of game the user is playing (e.g., fast paced vs. slow paced), and user preferences (either inferred by the game server or specified by the user). In some implementations, the game server determines the per-user playability based on self reported data. In some implementations, the game server observes the user's behavior in-game to determine how to classify the playing experience, and uses that information to determine from where the stream will be served and how the server messages the experience. In some implementations, the approaches described above are augmented by applying machine learning to determine specific weights for each gameplay statistic into the user's playability classification.

Figure 24A:
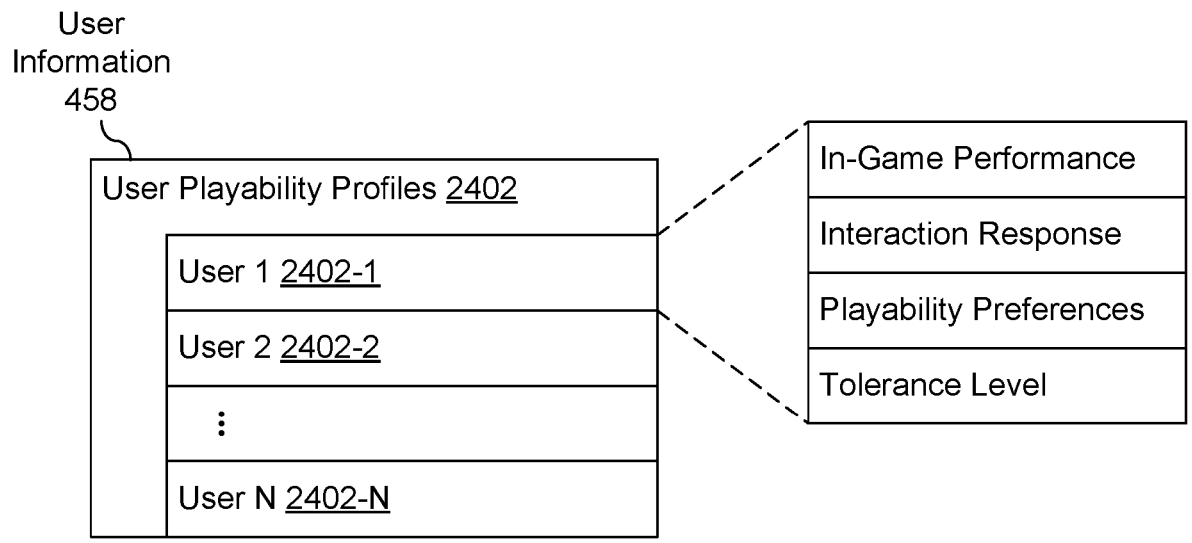
FIG. 24A is an example implementation of a repository for user playability profiles in accordance with some implementations.

FIG. 24A is an example implementation of a repository for user playability profiles 2402. In some implementations, the playabilities profiles (e.g., representing gameplay statistics for N users) are stored as user information 458 in memory 146 (FIG. 4).

In some implementations, gameplay statistics include in-game performance data. Example in-game performance data for a user includes a user's skill level for a particular game (e.g., a measure of how well the user plays the game). In some implementations, the game server (e.g., resource tuning module 458) determines a skill level for the user by comparing the user's activity or accomplishments with certain game-specific benchmarks, such as the amount of time it takes for the user to reach a checkpoint, how many victories the user achieves against a certain opponent or challenge, how many points the user accrues, and so forth. In some implementations, the resource tuning module 458 compares the user's in-game performance data (e.g., skill level) with corresponding performance data of other users, or with an average performance metric representing a plurality of users currently playing or having played the game.

In some implementations, gameplay statistics include controller interaction data, such as data describing a user's interactions with game controller 102. In some implementations, controller interaction data describes user response times, such as an amount of time between (i) a stimulus rendered in an output frame being displayed to the user (e.g., on a display 108), and (ii) the user responding to the stimulus by sending a gameplay input to the server (e.g., by interacting with a control on the game controller 102). For example, referring to FIG. 5B, if a trigger frame 510-1 is displayed at a first gameplay time $t_1$, and the user responds at a second gameplay time $t_2$, the display-to-controller interaction delay is the difference between $t_2$ and $t_1$. Users with quicker reaction times will be associated with controller interaction data representing shorter response times.

In some implementations, gameplay statistics include controller manipulation speed data, such as data describing how quickly the user registers successive inputs (e.g., by serially interacting with two controls, or by interacting with the same control twice in a row). For example, referring to FIG. 16, if a user attempts to score by manipulating a first control to move Player A into position (frame 1610-3) and then manipulating a second control to cause Player A to shoot the puck (frame 1610-5), the user's controller manipulation speed is the amount of time it took between the manipulation of the first control and the manipulation of the second control. Users who can manipulate controls on a game controller 102 more quickly will be associated with controller manipulation data representing shorter manipulation times between successive manipulations or interactions.

In some implementations, gameplay statistics include controller performance data, such as data describing how accurately the user interacts with the controller 102. For example, referring to FIG. 16, when the user moves Player A into position (frame 1610-3), a user with relatively higher skill will interact with the appropriate control (e.g., press and hold the "move" button) just long enough for the virtual player to move to the correct position, whereas a user with relatively less skill may over or undercompensate (e.g., hold the "move" button too long or not long enough), thereby moving the virtual player to the incorrect position and missing the shot. Users who can manipulate controls on a game controller 102 more accurately will be associated with controller performance data representing more accuracy.

In some implementations, playability profiles 2402 include the type of game being played. For example, a high speed hockey game such as the game described in the various examples above may require quicker gameplay and less latency than a more relaxed strategy game which does not require quick decisions or movements. As such, statistics like controller response times and accuracy may have different meanings, or be completely meaningless, in the context of other statistics like performance or skill level, depending on the game type.

In some implementations, playability profiles 2402 include playabilities preferences regarding tolerance levels to certain aspects of gameplay. For example, regardless of how well or poorly a user performs in the game or interacts with the controller, the user may prefer a certain level of resolution, frame rate, and/or latency. For example, if a user is used to or prefers a certain gameplay experience that is associated with a particular level of latency, providing faster response times may be at best unnecessary (since the user prefers the slower response times), and at worst detrimental (since the user may not be able to play the game as well if the user cannot adjust to the faster response times). As a further example, a user may prefer a slower frame rate than what the server system 114 may otherwise be able to provide, due to personal viewing preferences. As a result, the user's preferences are a factor in how the server system 114 allocates resources. In some implementations, the user manually enters these preferences and the server (e.g., resource tuning module 458) stores the user's preferences according to the manually entered settings. Alternatively, the server infers these preferences. In some implementations, the server infers the user's preferences based on the user's gameplay statistics (e.g., in-game behavior and performance data).

Upon determining various gameplay statistics as described above, the resource tuning module 458 assigns a gameplay experience tolerance level to the user in accordance with one or more of the gameplay statistics described above (e.g., in-game performance data). The gameplay experience tolerance level is a metric that describes a level of service that the game server can offer to the user without negatively affecting the user's perceived gameplay experience. The gameplay experience tolerance level can also be described as an adverse latency level, a playability level, a quality expectation level, and/or a minimum service tolerance level. In some implementations, the experience tolerance level represents a particular frame rate, particular resolution, and/or particular latency level determined to have less than a threshold amount of effect on a perceived gameplay experience associated with the user of the first client device.

Figure 24B:
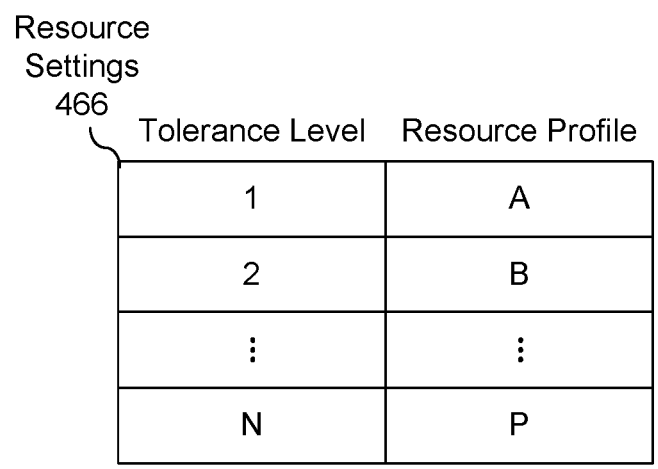
FIG. 24B is an example table of resource settings in accordance with some implementations.

FIG. 24B is an example implementation of a table of resource settings 466. In some implementations, the resource settings 466 are stored in memory 146 (FIG. 4). According to the example resource settings 466, a first tolerance level ("1") is associated with a particular resource profile ("A"). Examples of resource profiles are described above with reference to FIG. 22 (resource profiles 2206). By assigning or allocating a profile of resources (e.g., server processor bandwidth) to a user having a particular gameplay experience tolerance level, the server system 114 provides a desired gameplay experience to the user (e.g., within the user's tolerance) with only the minimal resources necessary to provide that level of gameplay experience.

Figure 25:
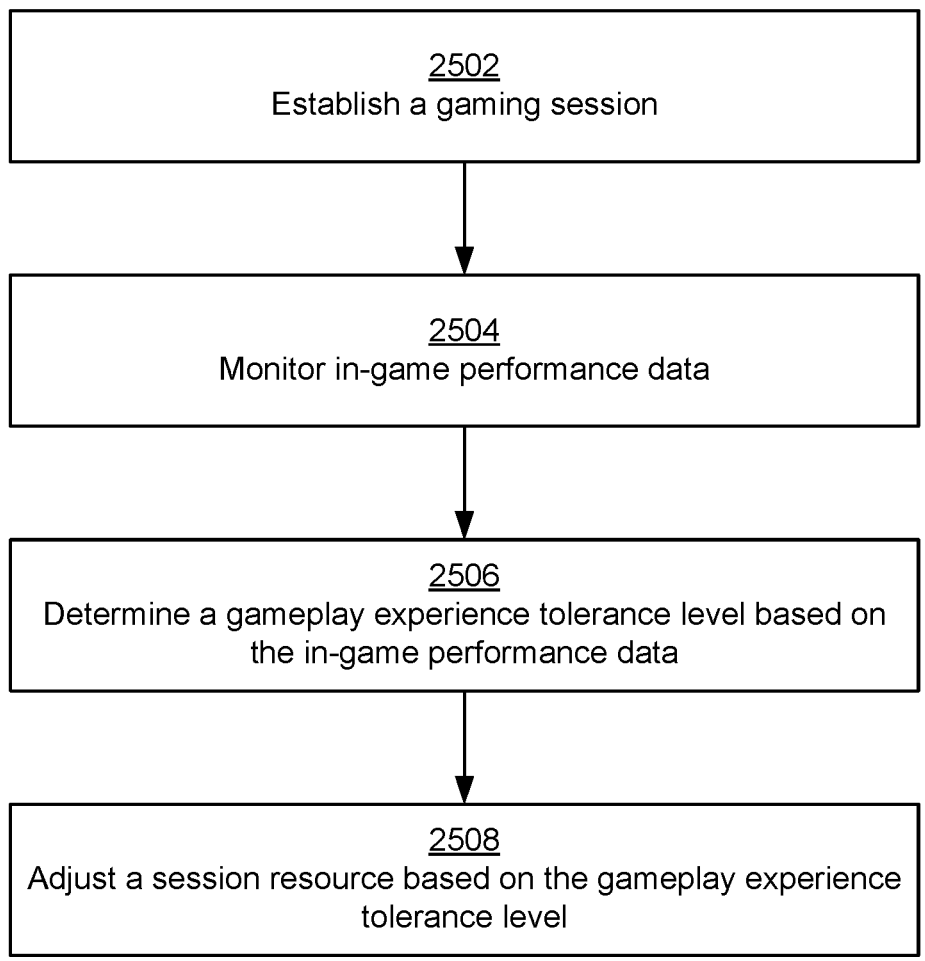
FIG. 25 is a flow diagram of a resource tuning process in accordance with some implementations.

FIG. 25 is a flow diagram of a resource tuning process 2500 in accordance with some implementations. The process may be performed at an electronic server (e.g., server system 114, or more specifically, game server 122) having one or more processors (e.g., CPU 138 and/or GPU 140) and memory (e.g., memory 146) storing one or more programs for execution by the one or more processors. In some implementations, the server includes one or more programs and memory storing one or more programs for execution by the one or more processors, and the one or more programs include instructions for performing the process 2500. In some implementations, a non-transitory computer readable storage medium stores one or more respective programs, the one or more respective programs including instructions, which, when executed by the server with one or more processors, causes the server to perform the process 2500.

The process begins when the server 114 establishes (2502) a real-time interactive gaming session with a first client device (e.g., game controller 102), the gaming session being associated with a particular game type (e.g., a fast-paced role playing game or a slow-paced strategy game). While a user of the gaming controller 102 plays the game by way of the gaming session, the server (e.g., resource tuning module 458) monitors (2504) in-game performance data associated with the user during the gaming session. Example in-game performance data includes gameplay statistics, performance metrics, skill level, controller response times, controller manipulation times, and/or controller accuracy as described above. In some implementations, the in-game performance data is stored in a profile 2402 for the user.

Based on the in-game performance data (e.g., gameplay skill, controller interaction), the game type, and/or a user preference, the resource tuning module 458 determines (2506) a gameplay experience tolerance level for the user. For example, if the user has a relatively high skill level, quicker responses (shorter controller response times), faster game control abilities (shorter controller manipulation times), and/or higher controller accuracy, the tuning module 458 assigns a tolerance level corresponding with a higher resource profile (e.g., allocating more resources to the user's game session) and/or a tolerance level corresponding to a higher quality gameplay experience (e.g., higher frame rate, higher resolution, and/or lower latency). On the other hand, if the user has a relatively low skill level, slower responses (longer controller response times), slower game control abilities (longer controller manipulation times), and/or lower controller accuracy, the tuning module 458 assigns a tolerance level corresponding with a lower resource profile (e.g., allocating more resources to the user's game session) and/or a tolerance level corresponding to a lower quality gameplay experience (e.g., lower frame rate, lower resolution, and/or higher latency). In some implementations, the tolerance level is stored in the user's playability profile 2402 with the other gameplay statistics.

The resource tuning module 458 adjusts (2508), based on the gameplay experience tolerance level, a server resource for the user's gaming session. Example session resources include graphical processor bandwidth at the server system, general processor bandwidth at the server system, graphical memory at the server system, general memory at the server system, storage capacity at the server system, input/output channels at the server system, and/or streaming source. In some implementations, the resource tuning module 458 allocates resources to the game session by assigning a virtual machine or container as described above with respect to FIGS. 22-23. By adjusting an allocation of a session resource, the game server affects one or more of a frame rate, resolution, or latency level associated with a gameplay output stream (e.g., video stream depicting gameplay output). Alternatively or additionally, in some implementations, the resource tuning module 458 directly adjusts the frame rate, resolution, and/or latency level associated with the gameplay output stream.

In some implementations, the resource tuning module 458 determines the gameplay experience tolerance level for a particular user by initially setting the tolerance level to a predetermined starting point (e.g., determined to be higher than necessary to ensure a positive gameplay experience for a majority of users), and then incrementally adjusts the tolerance level until one or more of the user's gameplay statistics are negatively affected. The level just before the user's gameplay statistics are negatively affected is determined to be the user's gameplay experience tolerance level. For example, when a user establishes a gaming session, the game server sets an initial bandwidth allocation at a level known or assumed to be high enough to avoid adversely affecting the user's ability to excel at the game. The resource tuning module 458 then incrementally decreases the bandwidth allocation for the session until the user's gameplay experience starts to show signs of being adversely affected (e.g., due to the user's in-game performance starting to decrease below a threshold). The lowest bandwidth level at which the user's gameplay is unaffected, or not affected by more than a threshold, is then recorded as part of the user's gameplay experience tolerance level.

In some implementations, the user has access to the user's gaming experience tolerance level. For example, the gaming server provides the user with information in the user's playability profile 2402. By providing the optional for the user to view playability profile information, the user may use the associated gameplay statistics as a metric to keep track of the user's gameplay progress (e.g., whether the user is improving in in-game performance), and/or compare certain gameplay statistics with those of other users.

The various implementations described herein efficiently utilize bandwidth and computing resources to provide optimum gameplay experiences for users based on their own unique capabilities as determined by monitoring gameplay performance for each user. By tuning server resources on a per-user basis in accordance with each user's specific playing style, skill, needs, and/or preferences, the various implementations described herein provide better experiences for all users due to more highly optimized processing efficiency, which leads to the ability to support more users, and lowers the cost of serving content to each user.

Notes Regarding the Disclosure

Reference have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
    at a server system comprising a plurality of virtual machines, each of the virtual machines having a respective resource profile:
        receiving a request from a client device to establish a real-time interactive gaming session, wherein the request is received through a network connection with the client device;
        determining a device capability of an output device associated with the client device;
        determining a connection capability of the network connection;
        determining one or more target quality parameters for the real-time interactive gaming session based on the device capability and the connection capability;
        selecting a first virtual machine of the plurality of virtual machines based on the one or more target quality parameters, wherein selecting the first virtual machine comprises associating the first virtual machine with the real-time interactive gaming session;
        establishing the real-time interactive gaming session with the client device;
        providing to the real-time interactive gaming session, in accordance with the resource profile of the first virtual machine, resources for processing inputs from the client device and generating gameplay outputs in accordance with the processed inputs within the real-time interactive gaming session; and maintaining association of the first virtual machine with the real-time interactive gaming session regardless of changes, if any, in device or network connection characteristics.

2. The method of claim 1, wherein the device capability of the output device comprises one or more of: a maximum resolution of display output at the output device, and a maximum framerate of display output at the output device.

3. The method of claim 1, wherein the connection capability of the network connection comprises one or more of: a bandwidth of the network connection, and a latency of the network connection.

4. The method of claim 1, wherein the one or more target quality parameters comprises one or more of: a target resolution for content transmitted to the output device, a target frame rate for content transmitted to the output device, and a target latency for content transmitted to the output device.

5. The method of claim 1, wherein the resources for processing inputs and generating outputs comprise one or more of: graphical processor bandwidth at the server system, general processor bandwidth at the server system, graphical memory at the server system, general memory at the server system, storage capacity at the server system, and input/output channels at the server system.

6. The method of claim 5, wherein providing resources for processing inputs and generating outputs within the real-time interactive gaming session comprises assigning respective portions of one or more of the resources to the real-time interactive gaming session.

7. The method of claim 5, wherein providing resources for processing inputs and generating outputs within the real-time interactive gaming session comprises mapping the resource profile of the first virtual machine to respective portions of one or more of the resources.

8. The method of claim 1, wherein selecting the first virtual machine comprises:
comparing the one or more target quality parameters to corresponding parameters in the respective resource profiles for the plurality of virtual machines;
determining which resource profile includes parameters which most closely match the one or more target quality parameters; and
selecting, as the first virtual machine, a virtual machine having a resource profile with parameters that most closely match the one or more target quality parameters.

9. The method of claim 1, wherein selecting the first virtual machine comprises:
comparing the one or more target quality parameters to corresponding parameters in the respective resource profiles for the plurality of virtual machines;
selecting, as virtual machine candidates, one or more virtual machines having resource profiles with parameters that are greater than or equal to the one or more target quality parameters; and
selecting, as the first virtual machine, a virtual machine candidate having the least resource-intensive resource profile.

10. The method of claim 1, wherein establishing the real-time interactive gaming session comprises assigning resources to the real-time interactive gaming session in accordance with the resource profile of the first virtual machine.

11. The method of claim 10, further comprising maintaining association of the first virtual machine with the real-time interactive gaming session for a predetermined time period.

12. The method of claim 10, further comprising reevaluating selection of the first virtual machine after a predetermined time period, and/or upon detection of a change, over a predetermined threshold, in a network connection characteristic.

13. An electronic server system, comprising:
a plurality of virtual machines, each of the virtual machines having a respective resource profile;
one or more processors; and
memory storing one or more programs for execution by the one or more processors, the one or more programs including instructions for:
receiving a request from a client device to establish a real-time interactive gaming session, wherein the request is received through a network connection with the client device;
determining a device capability of an output device associated with the client device;
determining a connection capability of the network connection;
determining one or more target quality parameters for the real-time interactive gaming session based on the device capability and the connection capability;
selecting a first virtual machine of the plurality of virtual machines based on the one or more target quality parameters, wherein selecting the first virtual machine comprises associating the first virtual machine with the real-time interactive gaming session;
establishing the real-time interactive gaming session with the client device; and
providing to the real-time interactive gaming session, in accordance with the resource profile of the first virtual machine, resources for processing inputs from the client device and generating gameplay outputs in accordance with the processed inputs within the real-time interactive gaming session; and
maintaining association of the first virtual machine with the real-time interactive gaming session regardless of changes, if any, in device or network connection characteristics.

14. A non-transitory computer readable storage medium storing one or more programs configured for execution by a server system including a plurality of virtual machines, each of the virtual machines having a respective resource profile, the one or more programs including instructions for:
receiving a request from a client device to establish a real-time interactive gaming session, wherein the request is received through a network connection with the client device;
determining a device capability of an output device associated with the client device;
determining a connection capability of the network connection;
determining one or more target quality parameters for the real-time interactive gaming session based on the device capability and the connection capability;
selecting a first virtual machine of the plurality of virtual machines based on the one or more target quality parameters, wherein selecting the first virtual machine comprises associating the first virtual machine with the real-time interactive gaming session;

establishing the real-time interactive gaming session with the client device; and providing to the real-time interactive gaming session, in accordance with the resource profile of the first virtual machine, resources for processing inputs from the client device and generating gameplay outputs in accordance with the processed inputs within the real-time interactive gaming session; and maintaining association of the first virtual machine with the real-time interactive gaming session regardless of changes, if any, in device or network connection characteristics.

\* \* \* \* \*